(12) United States Patent
Kinzer

(10) Patent No.: US 7,735,293 B2
(45) Date of Patent: Jun. 15, 2010

(54) METHOD OF CONSTRUCTING A MODULAR LOAD-BEARING STRUCTURAL COLUMN

(76) Inventor: Dwight Eric Kinzer, P.O. Box 277, Circle Pines, MN (US) 55014-0277

( * ) Notice: Subject to any disclaimer, the term of this patent is extended or adjusted under 35 U.S.C. 154(b) by 21 days.

(21) Appl. No.: 12/151,777

(22) Filed: May 10, 2008

(65) Prior Publication Data
US 2008/0209848 A1 Sep. 4, 2008

Related U.S. Application Data

(62) Division of application No. 10/765,028, filed on Jan. 26, 2004, now Pat. No. 7,392,624.

(60) Provisional application No. 60/445,760, filed on Feb. 5, 2003.

(51) Int. Cl.
*E04H 7/22* (2006.01)
(52) U.S. Cl. .............. 52/745.17; 52/745.15; 52/745.04; 52/192; 52/193; 52/194
(58) Field of Classification Search .......... 52/192, 52/193, 195, 651.07, 831, 836, 846, 847, 52/848, 851, 852, 855, 745.17, 745.18, 745.04, 52/745.03, 632; 405/231; 182/189; D25/128
See application file for complete search history.

(56) References Cited

U.S. PATENT DOCUMENTS

| 281,214 A | 7/1883 | Watson |
| 521,951 A | 6/1894 | Fallis |
| 597,879 A | 1/1898 | Graver |
| 638,280 A | 12/1899 | Robinson and Toltz |
| 686,816 A | 11/1901 | MacPhail |
| 699,439 A | 5/1902 | Ballou |
| 704,805 A | 7/1902 | Alexander |
| 738,163 A | 9/1903 | Clutter |
| 897,709 A | 9/1908 | Boll |
| 1,037,099 A | 8/1912 | York |
| 1,202,402 A | 10/1916 | Meaden |
| 1,261,454 A | 4/1918 | Stafford |
| 1,576,940 A | 3/1926 | Wagner |

(Continued)

OTHER PUBLICATIONS

Smyth, S., and Phillips P.W.B., Product Differentiation Alternatives: Identity Preservation, Segregation, and Traceability. AgBio Forum, 5(2): 30-42, 2002.

(Continued)

*Primary Examiner*—Phi D. A

(57) ABSTRACT

A practical method of manufacturing, assembling, and constructing a single silo or building or a cluster of polygonal storage silos using a column comprising horizontally-arrayed structural column panels. A structure built with these columns can be constructed using a cost-effective and relatively safe method of lifting. In addition, three or more of these structural columns can be connected together with wall panels or beams to fashion a polygonal compartment or multiple polygonal compartments, to serve as structural support for heavy loads, as a process tower for supporting equipment, a multi-story building for human occupancy (such as an apartment complex), or as bulk storage silo(s). The column can join standard and customized beams and wall panels. Columns can be attached to wall panels of round structures, to serve as stiffeners, or to the sides of polygonal structures, to serve as side-wall supports.

21 Claims, 28 Drawing Sheets

U.S. PATENT DOCUMENTS

| | | | |
|---|---|---|---|
| 1,605,513 A | 11/1926 | Connery | |
| 1,768,742 A | 7/1930 | Brogden | |
| 1,784,568 A | 12/1930 | Bale | |
| 1,842,735 A | 1/1932 | Spence | |
| 2,281,740 A | 5/1942 | Blickhan | |
| 2,282,756 A | 5/1942 | Curran | |
| 2,596,854 A * | 5/1952 | Jack et al. | 425/65 |
| 2,691,959 A | 10/1954 | Dueringer | |
| 2,740,613 A | 4/1956 | Berliner | |
| 2,745,520 A | 5/1956 | Boutard | |
| 2,959,256 A | 11/1960 | Dean | |
| 3,038,566 A | 6/1962 | Parsons | |
| 3,092,216 A * | 6/1963 | Tye, Jr. | 52/247 |
| 3,144,881 A | 8/1964 | Sproull | |
| 3,279,140 A | 10/1966 | Oliver | |
| 3,311,333 A | 3/1967 | Galloway | |
| 3,327,870 A | 6/1967 | Fairchild | |
| 3,373,536 A | 3/1968 | Reimbert | |
| 3,375,631 A | 4/1968 | Oliver | |
| 3,382,633 A | 5/1968 | Wilson | |
| 3,396,944 A * | 8/1968 | Jansz | 254/89 H |
| 3,594,965 A * | 7/1971 | Saether | 52/125.1 |
| 3,706,169 A | 12/1972 | Rensch | |
| 3,804,369 A * | 4/1974 | Sutton | 254/105 |
| 3,948,056 A * | 4/1976 | Sumner | 405/207 |
| 3,971,180 A | 7/1976 | Frederick | |
| 3,977,541 A | 8/1976 | Watson | |
| 4,008,553 A | 2/1977 | Oliver | |
| 4,009,789 A * | 3/1977 | Runyan et al. | 414/788 |
| 4,040,218 A | 8/1977 | Stanelle | |
| 4,112,634 A | 9/1978 | Bissinger | |
| 4,112,639 A | 9/1978 | Zimmerman | |
| 4,136,495 A | 1/1979 | Frederick | |
| RE30,108 E | 10/1979 | Oliver | |
| 4,218,859 A | 8/1980 | Sams | |
| 4,281,490 A | 8/1981 | Foody | |
| 4,450,657 A | 5/1984 | Driedger | |
| 4,563,844 A | 1/1986 | Driedger | |
| 4,757,592 A * | 7/1988 | Reed | 29/429 |
| 4,893,445 A | 1/1990 | Hefer | |
| 5,015,146 A * | 5/1991 | Barnes et al. | 414/639 |
| 5,149,241 A * | 9/1992 | Haymore et al. | 414/279 |
| 5,150,550 A | 9/1992 | Rionde | |
| 5,235,787 A | 8/1993 | Bloxsom | |
| 5,426,900 A | 6/1995 | Springer | |
| D378,136 S | 2/1997 | Miller, Jr. | |
| 5,704,755 A * | 1/1998 | Jesperson | 414/11 |
| 5,900,203 A | 5/1999 | Needham | |
| 6,575,212 B2 * | 6/2003 | Terpstra et al. | 144/286.5 |
| 7,004,737 B2 * | 2/2006 | Russell | 425/63 |
| 7,311,487 B1 * | 12/2007 | Crossley et al. | 414/331.06 |
| 2003/0033772 A1 * | 2/2003 | Russell | 52/292 |

OTHER PUBLICATIONS

Reichart, H., and Vachal K., Identity Preserved Grain—Logistical Overview. Symp: "Product Differentiation and Market Segmentation in Grain and Oilseeds: . . . " Jan. 27-28, 2003.

Sporleder, T.L. and Goldsmith, P.D., Differentiation within the grain and oilseeds sectors: . . . Symp: "Product Differentiation and Market Segmentation . . . " Jan. 27-28, 2003.

Sonka, S. Forces Driving Industrialization of Agriculture: . . . Symp: "Product Differentiation and Market Segmentation in Grain and Oilseeds: Implications . . . " Jan. 27-28, 2003.

Hurburgh, C.R., certification and Source Verification in the Grain Handling Industry. Symp: "Product Differentiation and Market Segmentation in Grain . . . " Jan. 27-28, 2003.

Clause, R., Supply Chains, Quality Assurance and Traceability Using ISO 9000-2000 In Agriculture. Symp: "Product Differentiation and Market Segmentation . . . " Jan. 27-28, 2003.

Wilson, W., and Dahl, B., The Logistical Costs of Marketing Identity Preserved GM Wheat. Symp: "Product Differentiation and Market Segmentation . . . " Jan. 27-28, 2003.

Farm Foundation and USDA's Economic Research Service. Symposium: Product Differentation and Market Segmentation in the Grains and Oilseeds Industry. Jan. 2003.

McVey, M.J., Baumel, C.P., Hurburgh, C.R., Jr., Efficient Distribution of Grain to Meet the Quality Needs of End-Users.

Blades, C. Managing White Wheat Segregation in Merchandising Channels. http://www.css.orst.edu/nawg/2000/blades.htm.

Economic Research Service. Biotechnology: U.S. Grain Handlers Look Ahead. Agricultural Outlook, Apr. 2000, pp. 29-34.

Qasmi, B., and Wilhelm, C.J. Grain Production and Handling Trends in South Dakota and Their Implications. Ninth South Dakota Internat'l Business Conf. Oct. 2-5, 2002.

Krejci, D. Feasibility and Cost OD Marketing Identity-Preserved Crops. Agricultural Outlook Forum 2002, Presented Feb. 21, 2002, Case studuay—hex, round, & Square silos—Cost Compariosn, PPA.

* cited by examiner

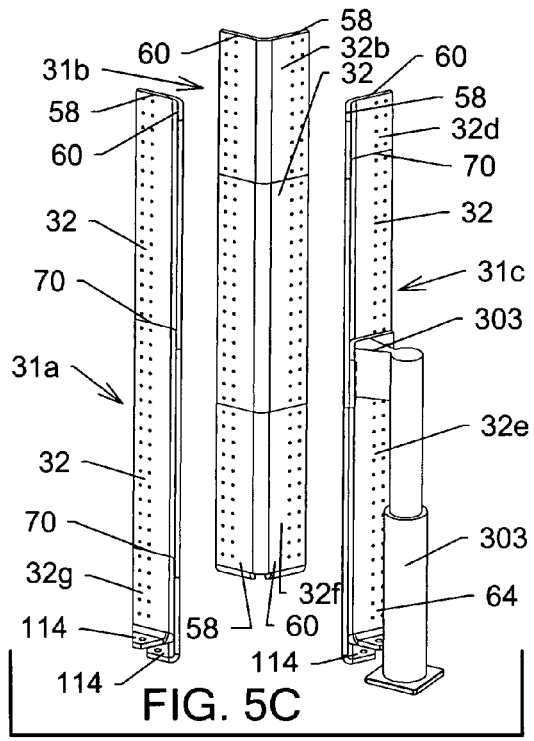
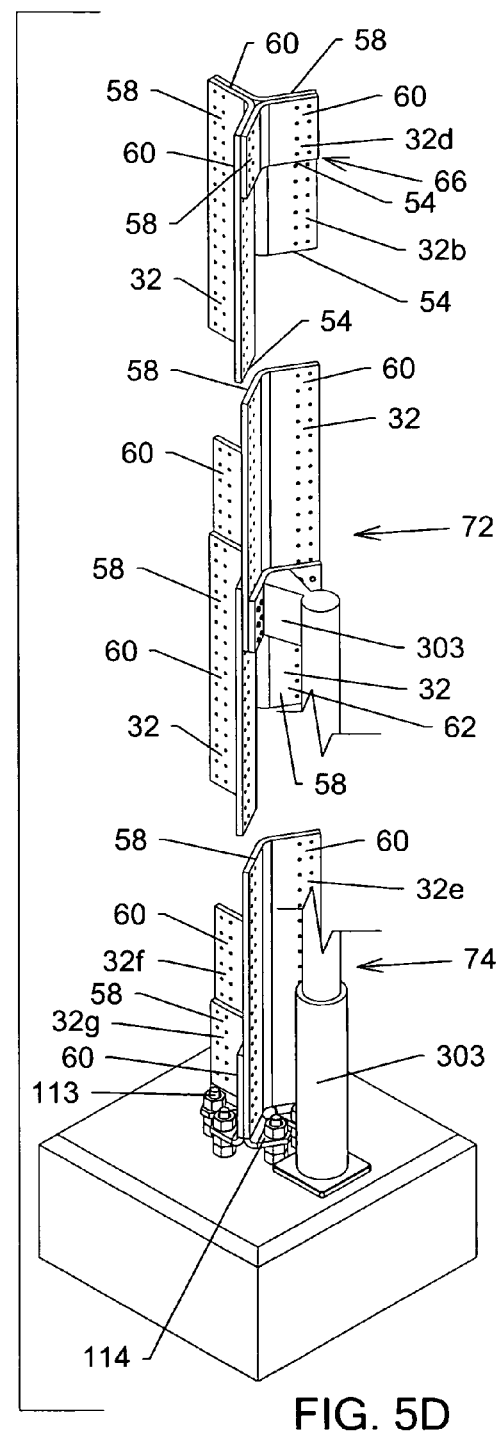
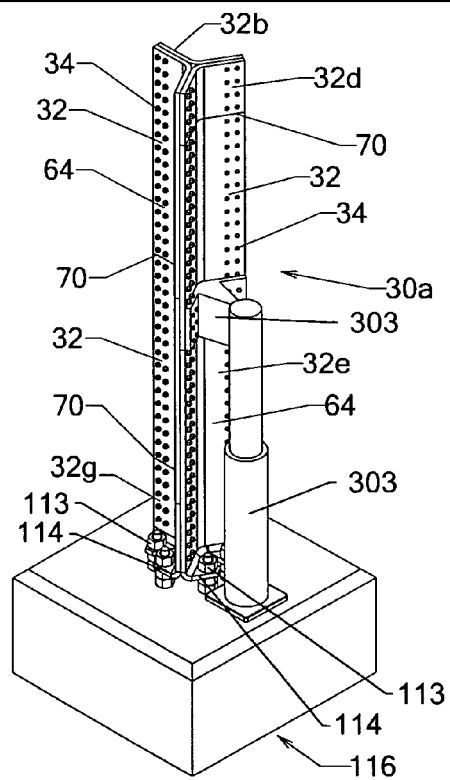

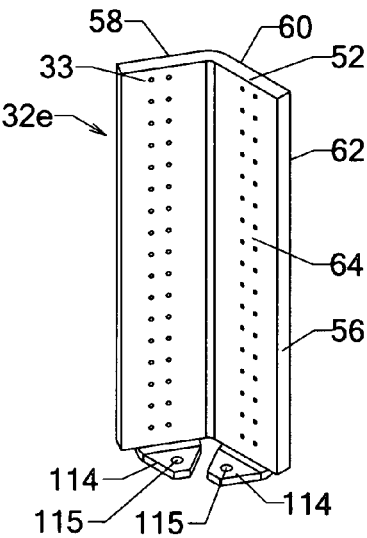
FIG.5B6
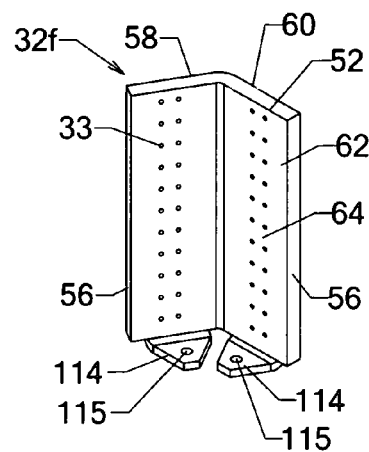
FIG.5B7
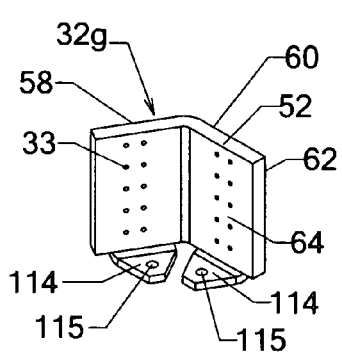
FIG.5B8
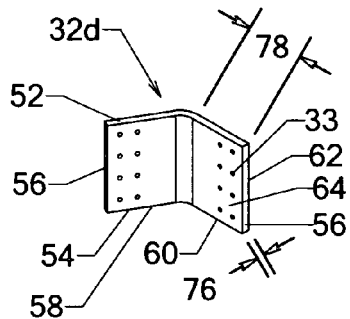
FIG.5B5
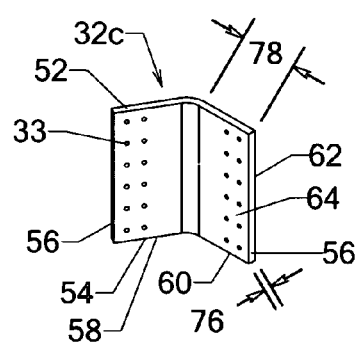
FIG.5B4
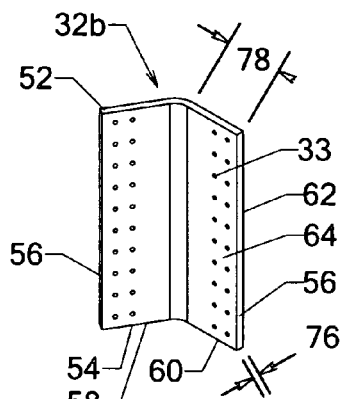
FIG.5B3
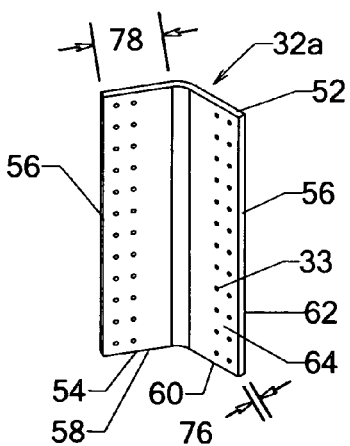
FIG.5B2
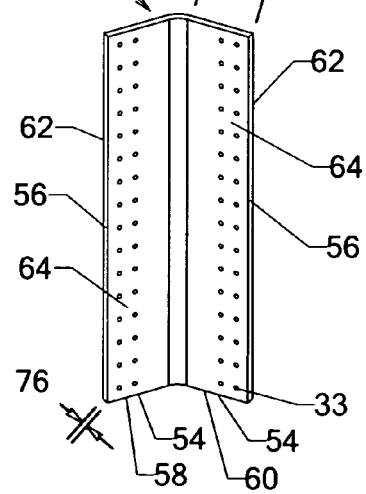
FIG.5B1

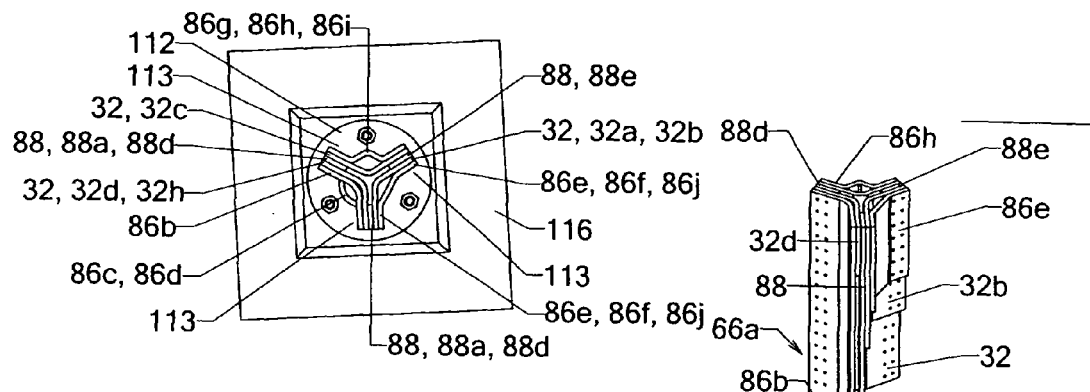
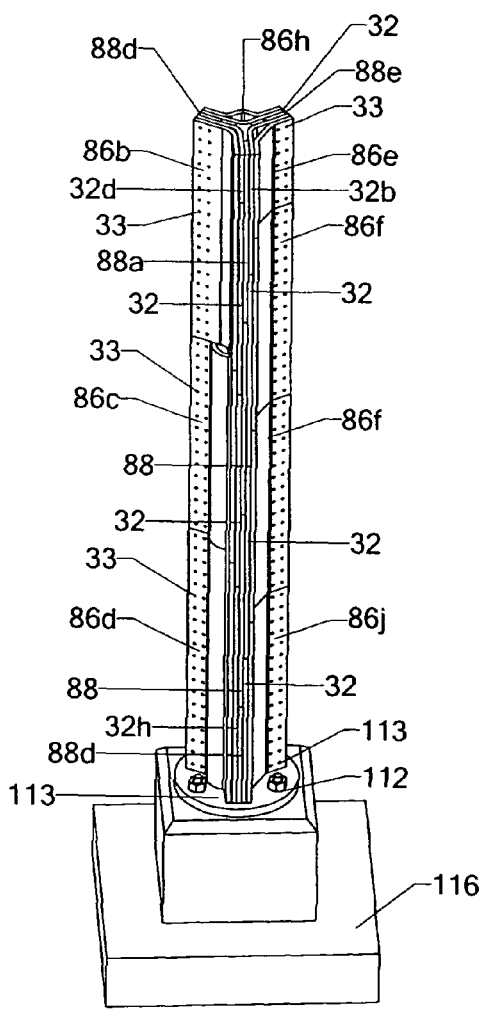
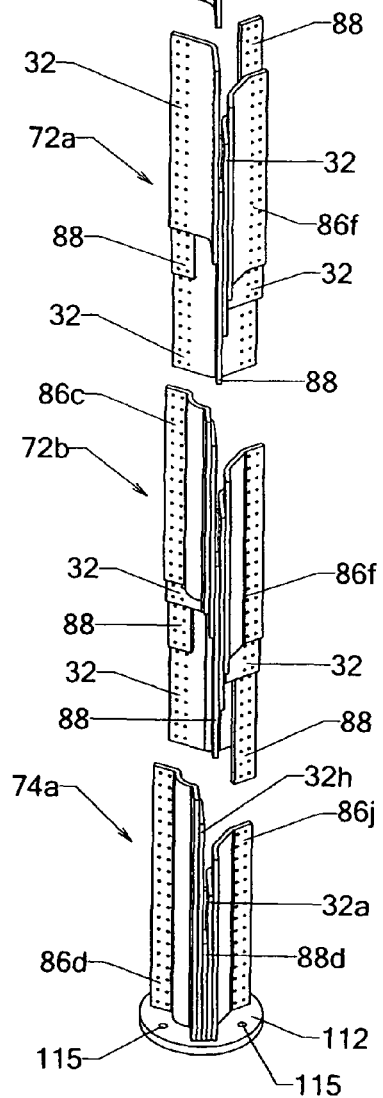
FIG.6D
FIG.6A
FIG.6E

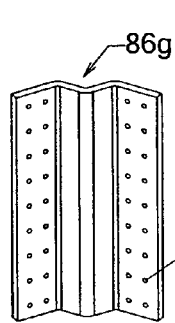
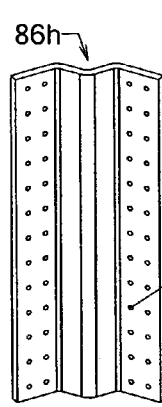
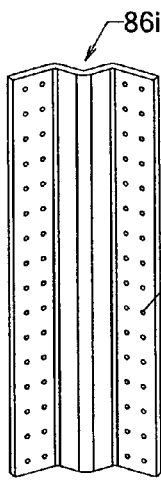
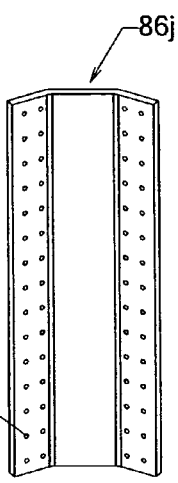
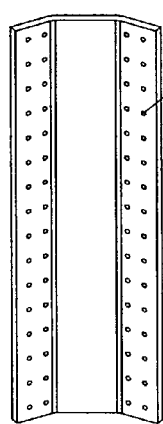
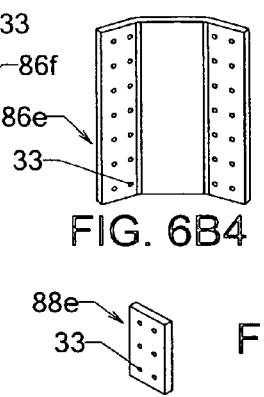
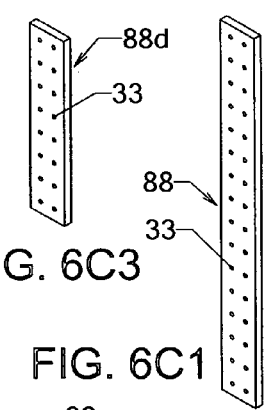
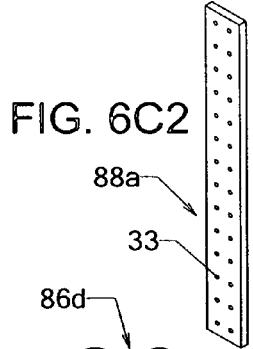
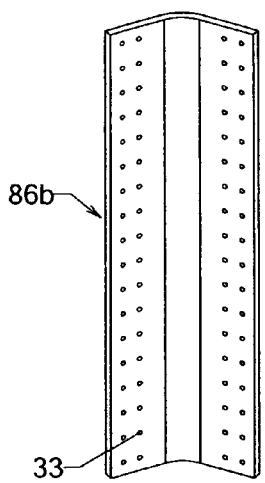
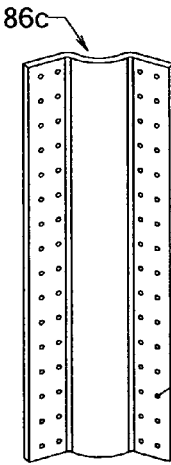
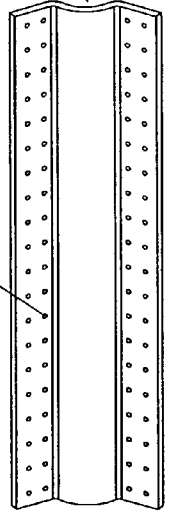
FIG. 6B6  FIG. 6B7  FIG. 6B8  FIG. 6B9
FIG. 6B5  FIG. 6B4  FIG. 6C3  FIG. 6C2
FIG. 6C4  FIG. 6C1
FIG. 6B1  FIG. 6B2  FIG. 6B3

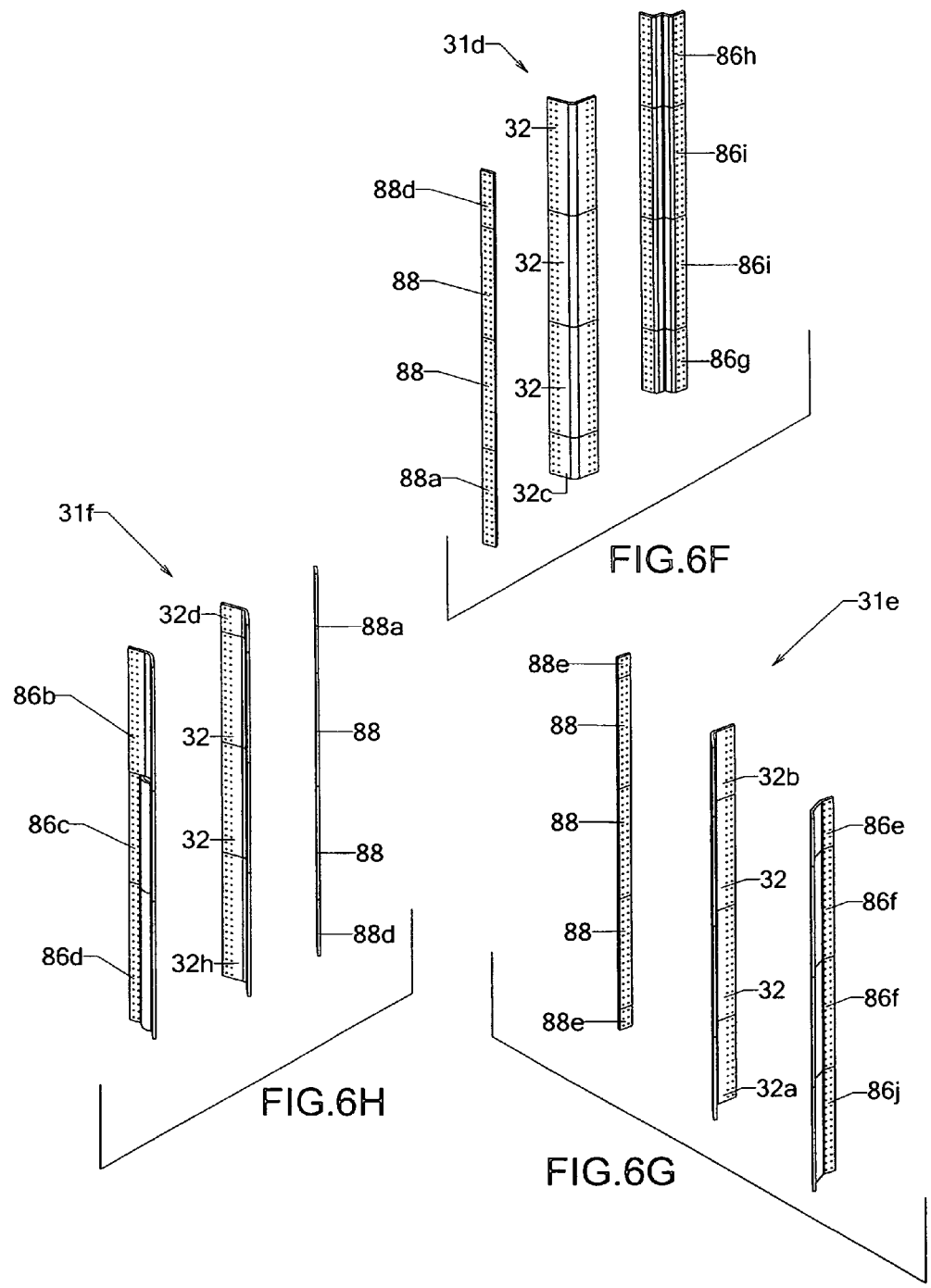

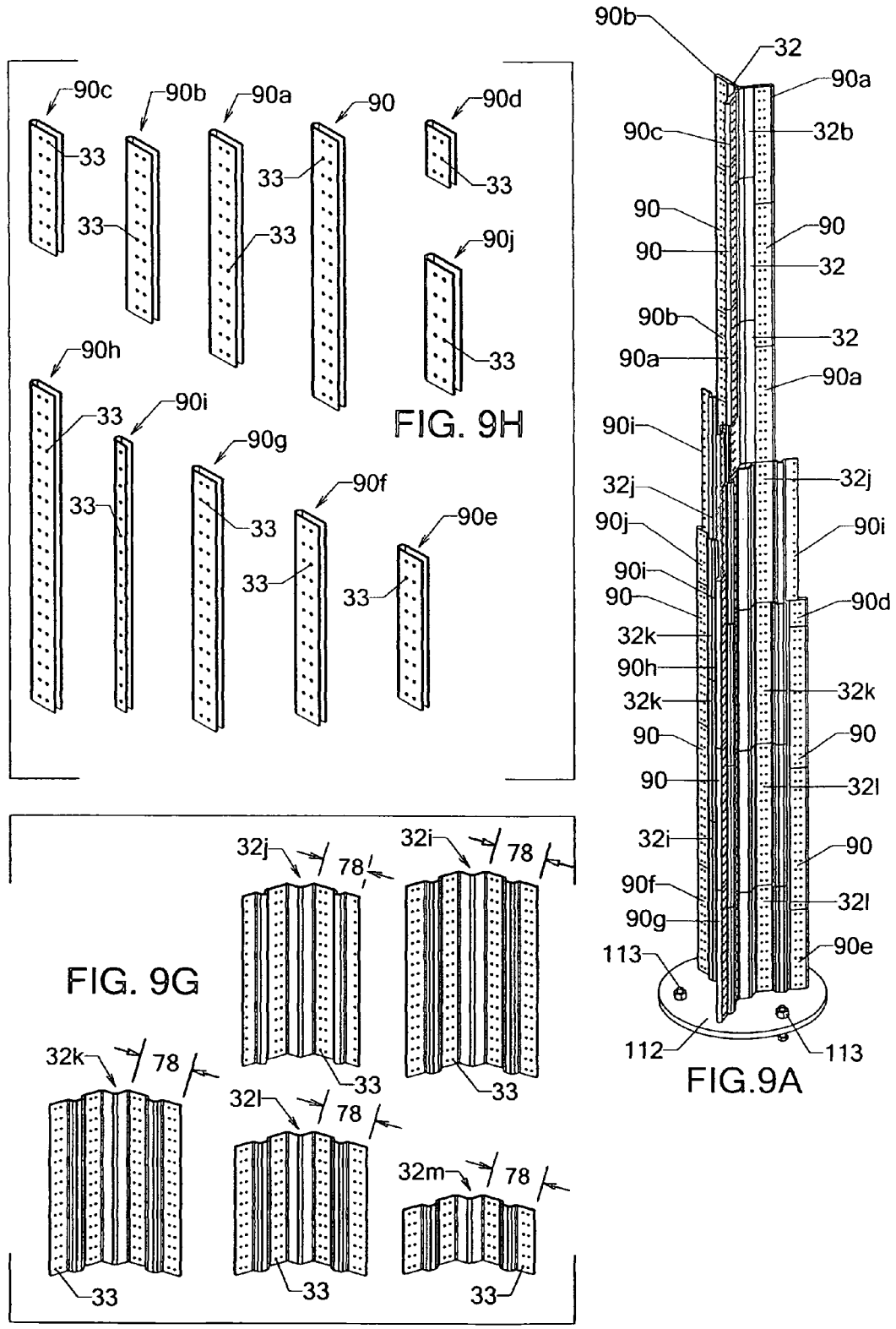

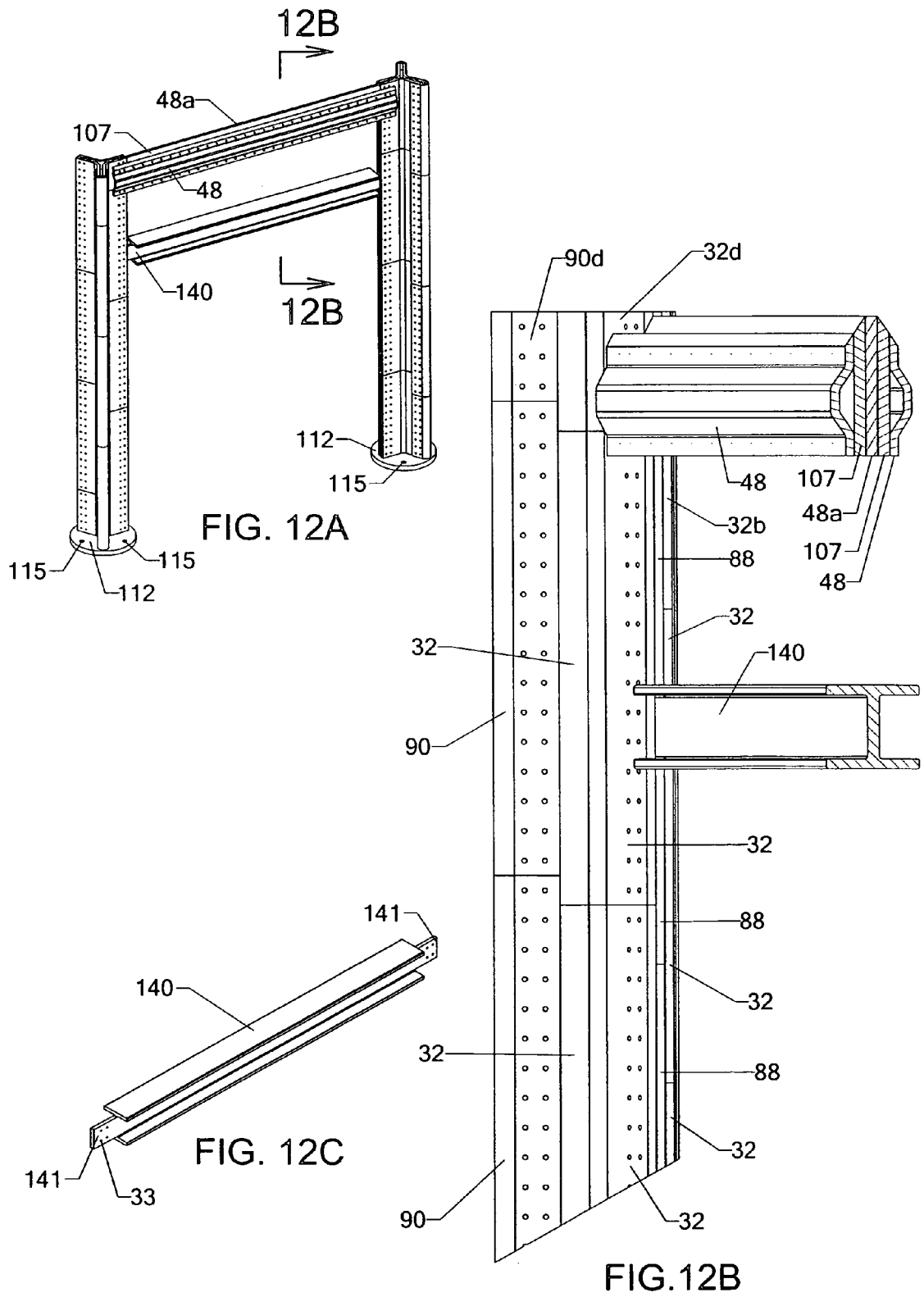

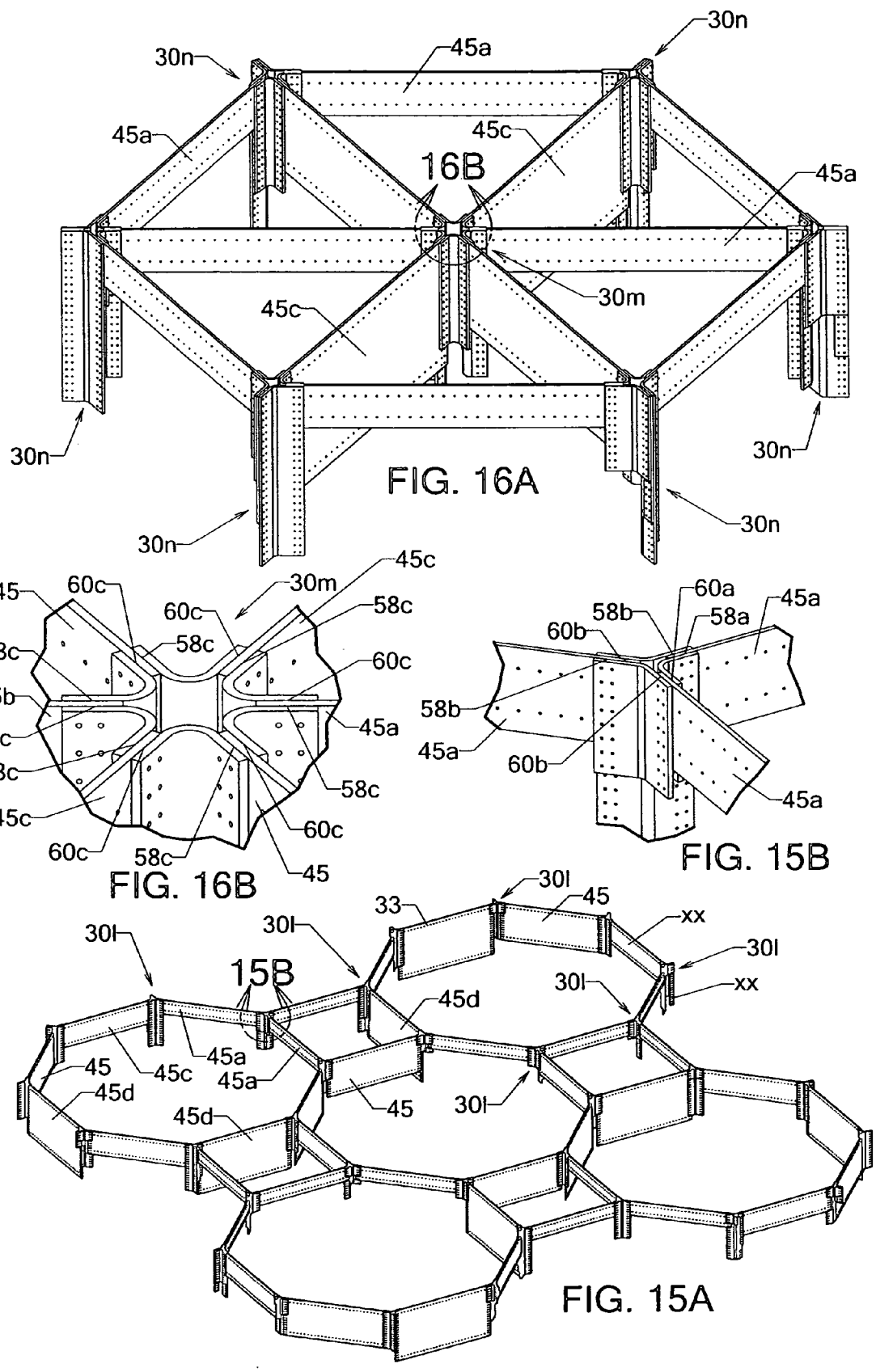

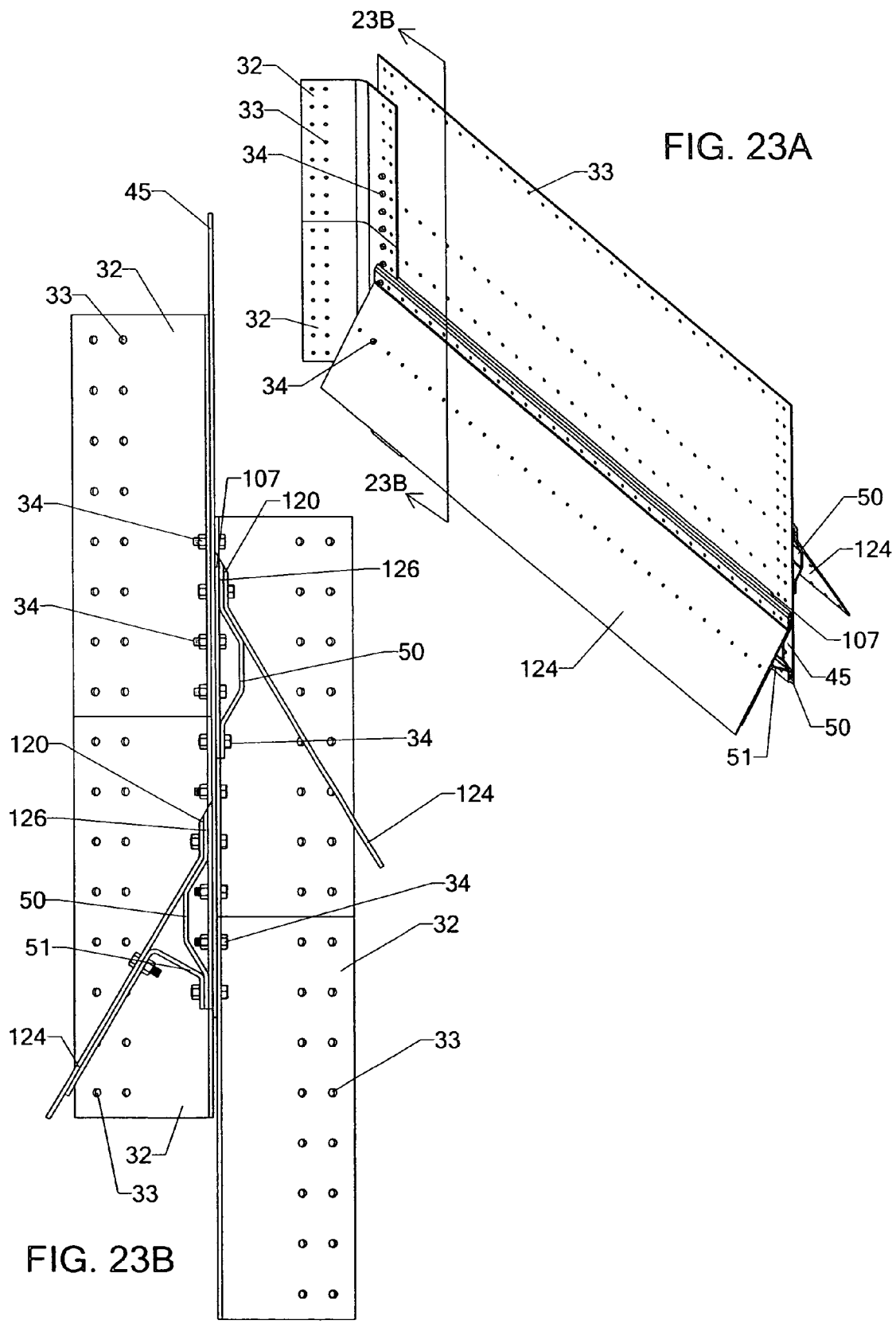

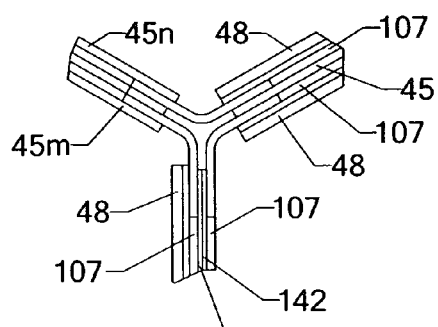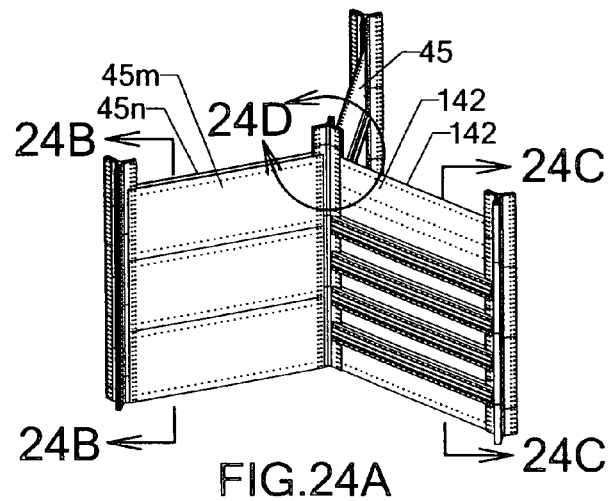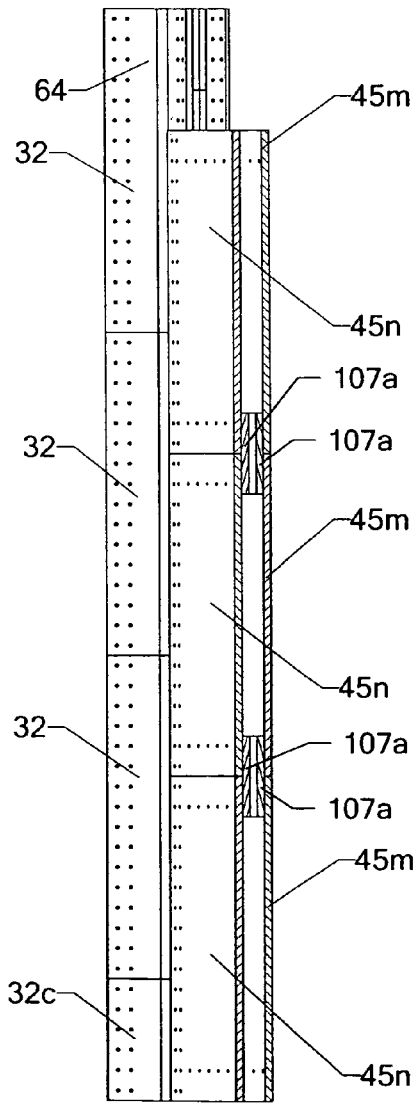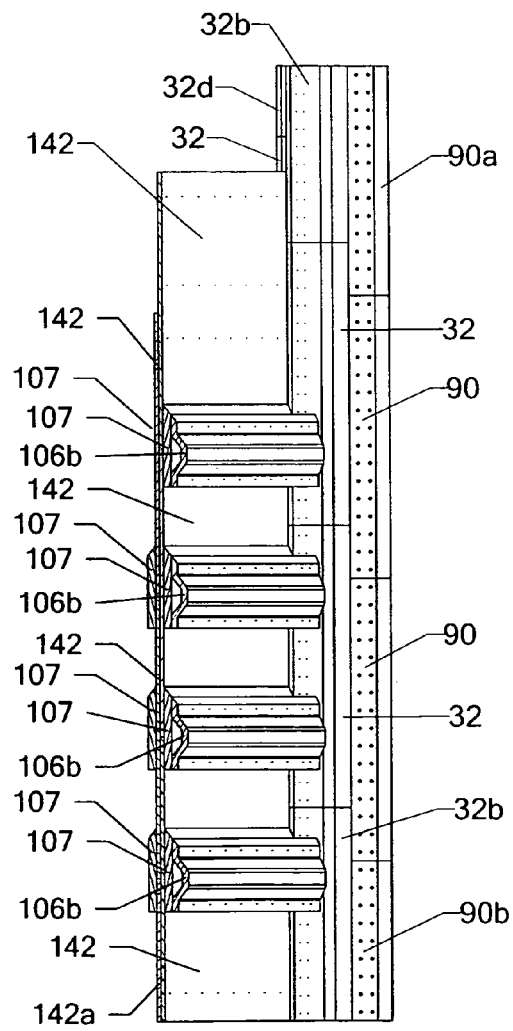
FIG.24D
FIG.24A
FIG.24B
FIG.24C

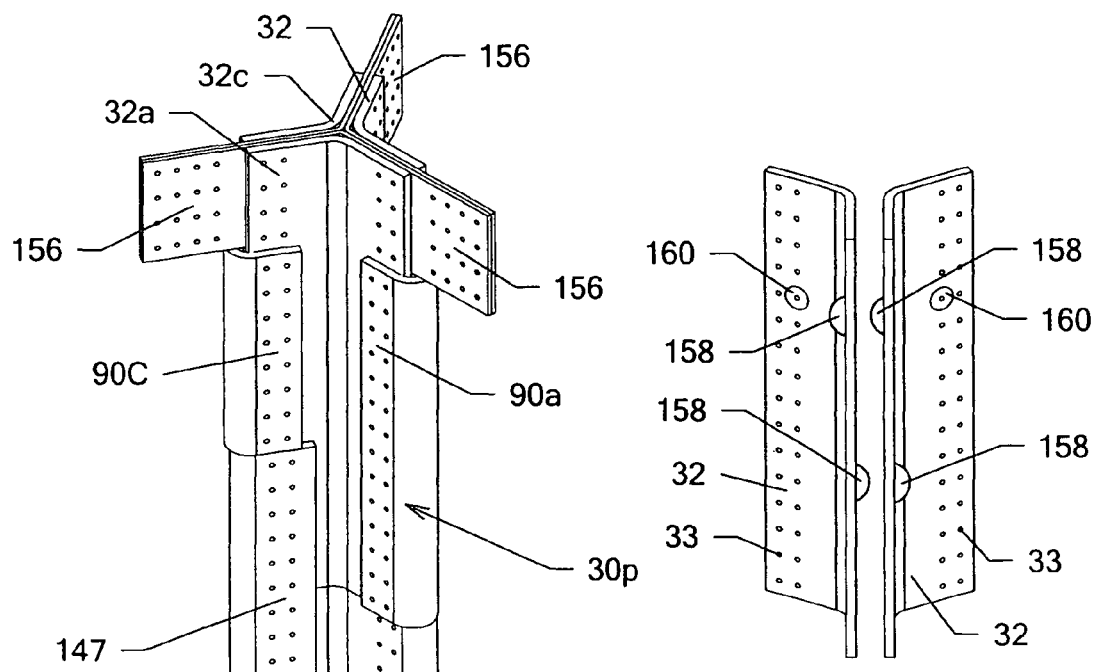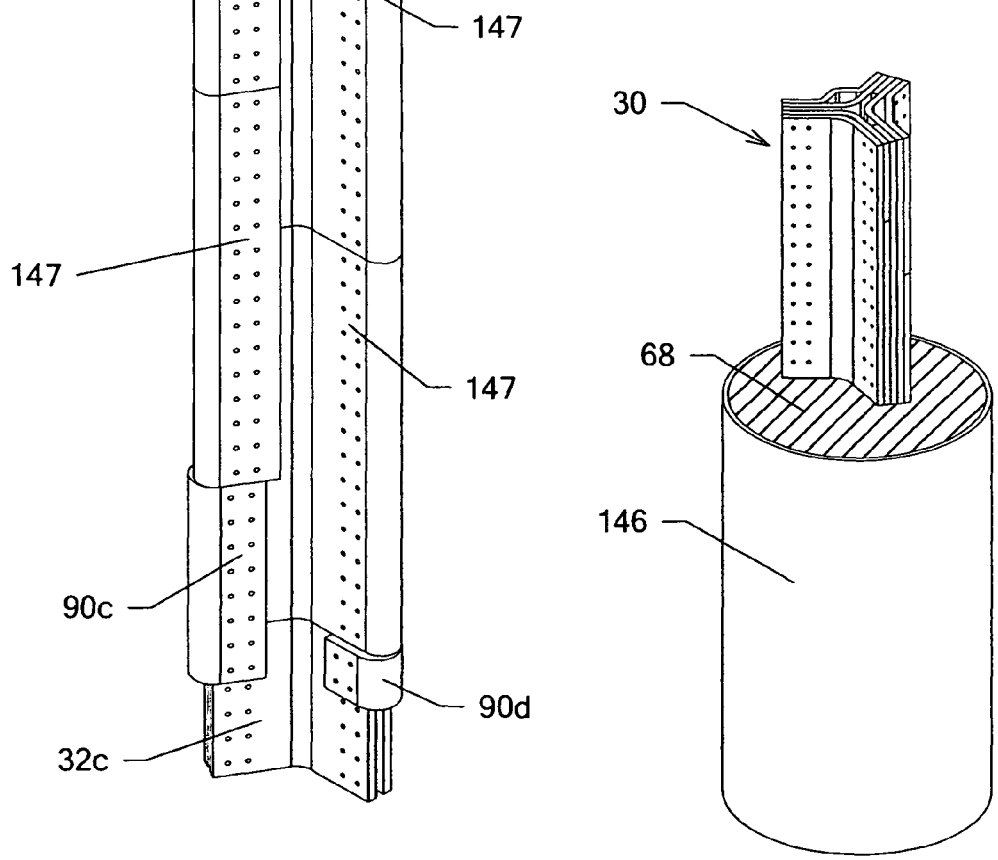
FIG 30C
FIG 29
FIG 28

METHOD OF CONSTRUCTING A MODULAR LOAD-BEARING STRUCTURAL COLUMN

CROSS REFERENCE TO RELATED APPLICATIONS

This application is a divisional application of U.S. patent application Ser. No. 10/765,028, filed Jan. 26, 2004, now U.S. Pat. No. 7,392,624 which claims the benefit of U.S. Provisional Application Ser. No. 60/445,760, filed Feb. 5, 2003.

FEDERALLY SPONSORED RESEARCH

Not Applicable

SEQUENCE LISTING OR PROGRAM

Not Applicable

BACKGROUND OF THE INVENTION

1. Field of the Invention

This invention relates to structures, particularly to structural columns that are integral and load-bearing parts of structures.

2. Prior Art

Certain grains, feed ingredients, seed, and various other organic or inorganic materials in either granular, powdered, liquid, or other particulate form are stored in multiple bins, such as an array of square or polygonal bins. Examples of such bins are shown in U.S. Pat. No. 521,951, to Fallis, 1894; U.S. Pat. No. 3,327,870, to Fairchild, 1967; U.S. Pat. No. 4,218,859, to Sams, 1980; and U.S. Pat. No. 4,893,445, to Hefer et al., 1990. The bins are usually assembled in one of two ways: (1) on their sides, as in the Sams patent, and then lifted on top of a substantial support structure such as an I-beam support structure or some other support structure, using a crane; or (2) the structures are assembled from the bottom up, atop a separate, substantial support structure, where each piece is individually lifted into place, requiring larger cranes as the vertical height increases. The Fallis patent discloses a storage bin that is hexagonal in horizontal cross section, and that has corner plates that join the walls of the bin. However, these corner plates are not load-bearing and do not form structural columns that can extend below the bin to support the entire structure. Consequently, if the bin must be elevated to accommodate a hopper, for example, the structure must be lifted onto a separate support structure. Furthermore, if the structure is tall, workers are exposed to dangerous heights during construction.

In cases where the columns are continuous or integral and consist of modular pieces, as disclosed in the Fairchild patent and U.S. Pat. No. 4,008,553 to Oliver (1977), the bins must still be constructed using cranes if the height of such bins exceeds a certain vertical limit. In addition, as illustrated in FIGS. 1 and 2 (Prior Art), a substantial structural support such as an I-beam frame 310*a* or 310*b* or concrete pillars is usually required, especially if the bins have hoppers. Furthermore, these types of support structures can limit the vertical placement of the hoppers such that top edges 309 of all hoppers usually must be at the same vertical height. Other configurations which allow the tops of hoppers to begin at different vertical heights from each other are very cumbersome and difficult to build using current methods, and so such configurations are seldom used, even though advantages often exist in having tops of hoppers at different vertical heights.

Where columns of bin structures consist of elements that are all one length, such as in U.S. Pat. No. 3,706,169 to Eberhard (1972) and the Sams patent, the vertical height of a structure is limited. If one column can be connected to the top of another column, a dangerous environment where workers are suspended high above the ground to connect pieces is created, and a crane is often required. This is usually the case with current methods of constructing such multi-compartmented storage structures. Crane use is further required when constructing process towers, such as 308*a* and 308*b* in FIGS. 1 and 2 (Prior Art), where distribution and/or processing equipment is located.

The cost of I-beam or concrete support structures and crane use, associated with the construction of multiple square or polygonal bins as described above, may not be limiting for commodities that currently have relatively high value, such as seed and certain feed ingredients, but these costs are very often limiting for low-value commodities, such as cereal grains, corn, or soybeans. The use of multiple polygonal storage bins is often described as segregated storage, because the contents of the bins are segregated based on different characteristics. Segregation can be based on such characteristics as, including but not limited to, the following: (a) ingredient origin, (b) plant variety, (c) protein level, (d) moisture level, (e) quality, (f) particle size, (g) field origin, (h) proximity of growing location to potential contaminant pollen sources, (i) growing conditions, (j) farming practices, for example, organic versus non-organic, (k) foreign matter level, or (l) GMO status.

Despite advantages of segregated storage, which will be described below, those industries related to bulk commodity production have been slow to adopt segregated storage, even with tremendous customer, societal, and governmental pressures to do so. The reluctance to incorporate a segregated-storage approach to bulk commodities is partially due to the relatively high cost of current designs and methods of constructing segregated storage.

The conventional approach for storage of grains, commodities, and ingredients has been to use bulk storage, that is, very large, round grain bins that accommodate contents that are usually of different varieties, from different growers, with different harvest locations or dates, or with different characteristics, for example. Such bulk storage can reduce costs associated with handling, and the large, round grain bins are also relatively inexpensive to purchase and to build, compared to segregated storage options that are currently available. But bulk storage has its disadvantages, such as the inability to trace contents to a precise time and location of manufacture or production, and difficulty in keeping products with different characteristics separate. Other changes in storage needs have occurred over the last decade, such as the introduction of identity preservation and genetic engineering techniques that have produced so-called genetically modified organisms (GMOs). As a result, the storage industry has recognized a need to shift towards segregated storage, where contents can be traced to their origin, and away from bulk storage, which has certain liabilities that may not have existed in the past. This increased need for segregation stems from governmental, societal, and consumer pressures.

The seed industry can be a model for the grain industry, and to some extent, the feed industry. Historically, the seed industry has segregated seeds not only by variety, but also by grower, year, and location of production. In contrast, the grain industry has conventionally stored grain from many points of origin within a single, large bulk grain bin, often co-mingling grains of substantially different quality, with different characteristics, or even of different varieties. Stricter purity requirements are another factor that is forcing the grain industry to re-think its bulk storage practices, especially as governments accept increasingly lower levels of GMO in non-GMO items, and as customers, such as millers, brewers, and other processors, demand better identity preservation to acquire the product with the characteristics that best serves their purposes.

Not only has segregation pressure increased within the grain industry, it has also risen in the animal feed manufacturing industry, especially due to risks associated with food safety. In particular, a great concern has recently arisen with Bovine Spongiform Encephalopathy, also known as Mad Cow Disease. Animals that consume feed that is contaminated with infectious animal by-products can contract the disease. The disease can be transmitted to humans who eat infectious portions of a diseased animal. The disease has now been documented to be in the United States. Complying with government regulations, such as those proposed recently by the European Union that require the ability of all feed ingredients to be traced to their point of origin, is difficult when utilizing large bulk storage. As a result, the feed manufacturing industry also has a need for more multi-compartmentalized bins, not only for the micro-ingredients (that is, feed ingredients that are used in very small proportions, such as vitamins, minerals, and growth enhancers) that have conventionally been stored in multi-compartmentalized bins, but now also for main ingredient storage, which has been handled in a similar manner as other bulk commodity storage. The transformation of the grain industry, and to some extent the feed industry, from a bulk storage mentality to a more refined, segregated storage system is limited in large part by the relatively large cost of segregated storage as it currently exists compared to the cost of bulk storage.

Typically, for multi-bin arrays, support structures, like 310a and 310b, shown in FIGS. 1 and 2 (Prior Art), are built first. These structures generally are a framework of I-beams, concrete pillars, or some other hefty assemblage. Then, individual storage bins are built either on top of the support structure, or in a workshop, or on the ground at the jobsite, and then lifted into place with a crane. Building the storage unit on top of the support structure requires that every piece be lifted up into place, requiring construction workers to continually build or move scaffolding up to increasingly deadly heights as the building progresses. In most cases, cranes are generally used to lift parts or entire bins into place, using skilled ironworkers that are competent to safely perform the work. Use of skilled labor also increases the cost of the construction project compared to jacking and assembling a structure at or near ground level using relatively unskilled labor.

Another limitation to some types of existing polygonal storage structures is transportation costs and size limits associated with bins that are completely assembled or prefabricated in workshops elsewhere. Although lifting prefabricated storage bins onto a support structure requires fewer crane hours than lifting each part into place, lifting a complete silo requires a larger, more costly crane than lifting individual parts. Furthermore, pre-fabricated tanks that are lifted onto a support structure still require that the vertical sides be bolted or welded together by a skilled worker that must traverse the entire vertical length of adjoining walls to bolt, fasten, or weld them together.

The typical, conventional corrugated steel flat bottom silo may be an adequate choice if only a single bin is required. However, if multiple bins are needed, the round grain bin has limitations. For example, a larger footprint (more land area) is needed for multiple round grain bins, compared to the amount of land required for conventional square or hexagonal bin arrays that share common walls. A second limitation of conventional corrugated steel flat bottom round grain bins is that they cannot discharge all of the grain by gravity, unless they are positioned on a concrete hopper, or they include devices such as sweep augers or air sweeps, or manual labor is used. If manual labor is used, strict confined-space-bin-entry safety procedures must be followed. A third limitation of steel round grain bins is the size constraints such bins are subject to under current practices. Even though steel round grain bins can achieve huge diameters, generally up to about 32 meters, difficulties have been experienced in bins with larger diameters. These difficulties, in many cases, are partially due to inadequate stiffener design. A fourth limitation is in distribution spouting, a method of filling bins involving spouts that are typically angled at 45 degrees from vertical, and that are erected above the bins. To achieve the recommended 45-degree spouting angle, a very high head house, which supports the spouting, would need to be built.

Despite these limitations of the round grain bin, a great advantage of it is the use of a relatively safe and inexpensive method of jack-lifting construction, which has not yet been applied to a multi-bin array with shared walls. One such method, illustrated in FIG. 3 (Prior Art) and disclosed in U.S. Pat. No. 6,311,952 to Bainter (2001), involves hydraulic jacks, which are arranged along the perimeter of a roof assembly 301 of the bin. The roof assembly is usually assembled of one or two horizontal levels, or 'rings' 302, of wall panels, and then a roof is built on top of these first rings, while at or near ground level. Jacks 303 are anchored to a foundation stem wall 304 and bolted onto roof assembly 301. The jacks then lift roof assembly 301 so another ring of body sheets can be added below it. Once the next ring is added, the jacks are detached from assembly 301 and reattached to the next lower ring, which is then jack-lifted, and another ring of wall panels is attached. This process is repeated until the bin has reached a desired height. When all body sheet rings have been added, the bin is anchored to a foundation, such as concrete foundation stem wall 304, and jacks 303 are removed.

Such jacking methods, however, have not been used to build a structure comprising an array of polygonal bins, most likely because conventional designs of shared-wall bin arrays are not conducive to jack-lifting. Developing a design that allows jack-lifting would present a considerable savings in construction costs. The method of jack-lifting, as described, does not require an expensive crane to lift every part into place or to lift complete silos onto a structure. The labor does not need to be highly skilled, since the required tasks simply involve assembling sheet metal parts, using wrenches or power tools, working at or near ground level, and using jacks to raise the assembled structure. And a safer work environment is created, which further reduces job-related liabilities. These factors contribute to the low cost of erecting corrugated steel flat bottom round grain bins, and could conceivably be applied to building a structure comprising multiple compartments and multiple levels.

The conventional corrugated steel round grain bin with a hopper bottom can empty all stored particulate by gravity, unlike the flat round bottom grain bin discussed above. However, like its flat bottom cousin, its diameter is limited in size due to structural support considerations. Like the flat bottom round grain bin, the hopper bottom round grain bin uses land space inefficiently if more than one is needed. Furthermore, constructing a hopper bottom round grain bin generally costs significantly more than a flat bottom round grain bin. The increased cost is because a hopper 312 and a support structure 311, as illustrated in FIG. 2 (Prior Art), have to be built independently of the grain bin. Then, the entire grain bin, although having been completely constructed using an economical jack-lifting method, has to be lifted on top of the hopper and support structure with an expensive crane.

The advantage of an array of shared-wall bins (versus multiple round bins) is the efficient use of material and land area, but this advantage is at present overcome by the relatively expensive methods of constructing such an array. If the more cost-efficient method of jack-lifting can be used to construct a shared-wall multi-bin array, then in terms of cost, the advantages of constructing a multi-bin array reasonably approaches or outweighs those of constructing a plurality of round grain bins. Cost would no longer be the limiting factor of installing segregated storage.

3. Objects and Advantages

The present invention addresses these needs and many of the limitations of conventional flat and hopper bottom steel round bins, and of conventional polygonal storage silos, as described above. Accordingly, several objects and advantages of the present invention are:

(a) to provide an improved particulate bulk material storage facility;

(b) to provide a column that can be used to build a multi-compartmented array of polygonal bins with shared walls, using a jack-lifting method, relatively unskilled labor, minimal tools, and neither cranes nor specialized equipment;

(c) to provide a column that can be used to build such a structure as described in (b) above without the need to build a separate, substantial support structure;

(d) to provide a column that, when used in a structure as described in (b), easily allows the top edges of multiple hoppers to be at different vertical heights from each other; and (e) to provide a column that can be used as a stiffener for round steel grain bins.

Additional objects are to provide a structural column with similar modular components that can be adapted to serve in different capacities, such as stiffeners, wall-lengthening columns, connectors, splices, spacers, or other members of vertical columns; that can be manufactured from roll-formed steel fabrication, providing economic advantages over other types of steel or materials, although a wide spectrum of building materials may be used; that can be used to construct regular and irregular polygonal structures such as buildings for human occupancy, parking garages, storage bins, etc.; that can be used to form a structure that can be built within or onto an existing structure; and that can be modified to accommodate a polygonal or round structure with any number of walls or sides.

Other objects are to provide column components that can be connected using a variety of methods, such as nuts and bolts, rivets, adhesives, welding, chemical bonding, spot welding, and the like, to form the column; to provide columns that can have gradations in thickness and width, as dictated by structural requirements; or that may have hollow portions that can be filled with concrete, to add further strength; to provide columns that can be surrounded by concrete forms and encased in concrete to form pillars or piles for supporting bridges, parking garages, and the like; and to provide columns that can create an earthquake resilient support structure when adjoined with horizontal and diagonal cross members.

Further objects are to provide a column that can accommodate additional embodiments such as U-shaped clips that can cover and attach to exposed edges of the column, not only to add aesthetic appeal, but also to provide protection from degrading environmental elements and to increase intrinsic strength of a structure; and to provide a column that can support multi-level construction, in which, for example, the structural column can extend above a first level of compartments to provide the framework for upper level(s), or to provide the framework for a process tower; in which the column(s) can continue below a structure to provide structural support; in which structural columns may be placed adjacent to a main structure to provide support for items such as equipment. In all cases, the column is an integral part of the structure, including the structure's process towers, multi-level bins, and support legs, from top to bottom.

Still another object is to provide a versatile column that can have multiple layers of column components stratified outward from a central, vertical axis, to increase structural integrity and/or to provide locations for horizontal beam connections, where additional outward layers can have similar or different configurations as inner layers.

Additional objects are to provide an efficient means to build permanent or temporary structures, including military barracks, multi-level human occupancy buildings, and heavy equipment maintenance structures that can support heavy-duty hoists, and that can be erected and dismantled relatively rapidly.

Further objects and advantages will become apparent from a consideration of the following description and drawings.

SUMMARY

In accordance with the present invention a structural column comprises a plurality of column components which are arranged in a staggered relationship with each other, such that, wherever practical, horizontal seams, where top and bottom edges of components align, are in substantially different horizontal planes from each other.

DRAWINGS

Figures

FIGS. 5A through 5D show isometric views of a basic column (FIG. 5A), its individual column panels (FIGS. 5B1-5B8), an exploded view of three vertical legs of the column of FIG. 5A (FIG. 5C), and an exploded view of three horizontal arrays of the column of FIG. 5A (FIG. 5D).

FIGS. 6A through 6H show various views of a column similar to the column of FIG. 5A, except that column spacer plates and column splice panels of various conformations are included.

FIG. 9A through 9H show views of a complex column that has U-clips, gradations in widths of column panel sides, and column panels with different configurations, all on the same column.

FIGS. 12A through 12C show various views of an example of an I-beam and a customized beam attaching to columns.

FIGS. 15A and 15B are isometric views of a three-legged column and attached wall panels in which flat sides of two legs are oriented at 135 degrees from each other and flat sides of the third leg are oriented at 90 degrees from each other, to form an octagonal structure or a structure comprising an array of octagonal and square compartments.

FIGS. 16A and 16B are isometric views of a six-legged column and six attached wall panels in which flat sides are oriented at 60 degrees from each other, and a four-legged column in which two legs have flat sides oriented at 120 degrees from each other, and two legs have flat sides oriented at 60 degrees from each other, to form triangular structures.

FIGS. 23A and 23B show close-up and cross sectional views of beveled flanges of hopper panels and hopper support beams, the junction of two hopper panels from adjacent hoppers, at different vertical heights from each other, with underlying hopper support beams, and their attachment to their common column.

FIGS. 24A through 24D show various views of columns adjoining walls with a single wall configuration, a dual-wall configuration, and a multi-ply wall configuration.

FIG. 28 shows an isometric view of a column encased in concrete.

FIG. 29 shows an isometric view of a column made with components that have nesting dimples and nesting boreholes to prevent slippage during construction, and to enhance column strength.

FIGS. 30A, 30B and 30C show views of diagonal beams attached to columns, as well as modified column spacer plates that resemble thin column panels.

Figure 1:
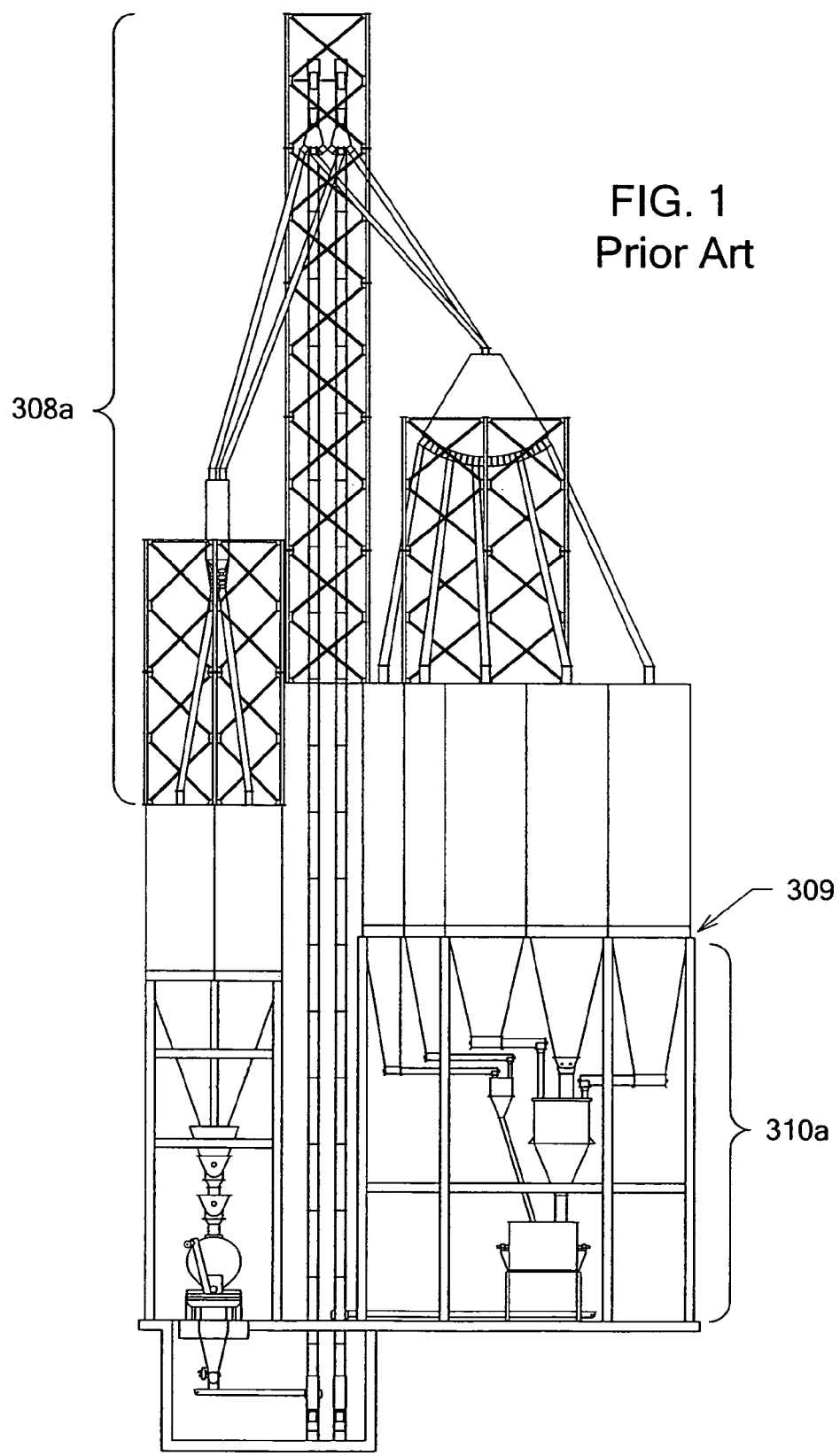
FIG. 1 (Prior Art) shows a front view of a process tower that is usually built as a separate structure on top of another array of square bins, requiring the use of cranes and skilled workers.

DRAWING REFERENCE NUMERALS 30 column
31 column leg
32 column panel
33 panel borehole
34 bolt
35 rivet
45 wall panel
48 horizontal beam
49 horizontal beam support panel
50 hopper support beam
51 hopper support beam
52 top edge of column component
54 bottom edge of column component
56 side edges of column component
58 first flat side of column component
60 second flat side of column component
62 inward-facing surface of column component
64 outward-facing surface of column component
66 top array
68 concrete
70 seam
72 intermediate array
74 bottom array
76 thickness of column component
78 width of flat side of column component
84 vertically-oriented edge
85 ledge
86 column splice panel
88 column spacer plate
90 U-shaped clip
96 exposed side edge
98 horizontally oriented arc of column panel
106 wall splice panel
107 horizontal cross member spacer plate
108 bottom end of wall
112 horizontal base plate
113 foundation anchor bolt
114 horizontal tabs at base of column
115 anchor bolt boreholes
116 foundation
118 hopper
120 top edge of hopper panel
122 bottom aperture of hopper
124 hopper panel
126 hopper support beam flange
134 flat corrugated wall panel
135 curved corrugated wall panel
136 corrugated spacer plate 137 vertical C-beam
138 horizontal C-beam
140 I-beam
142 thin wall panel
144 vertically-oriented flanges
146 column wall
147 column panel with U-shaped edge
148 diagonal beam
150 gaps between top and bottom column component edges
152 column base or cap
154 weld
156 thin column panels
158 nesting dimples
160 nesting boreholes

PRIOR ART 301 roof assembly with one ring of wall panels
302 'ring' of wall panels of a round grain bin
303 jacks
304 foundation stem wall
308 process tower
309 top edges of multiple hoppers
310 support structure
311 support structure
312 hopper

DETAILED DESCRIPTION

Figure 4:
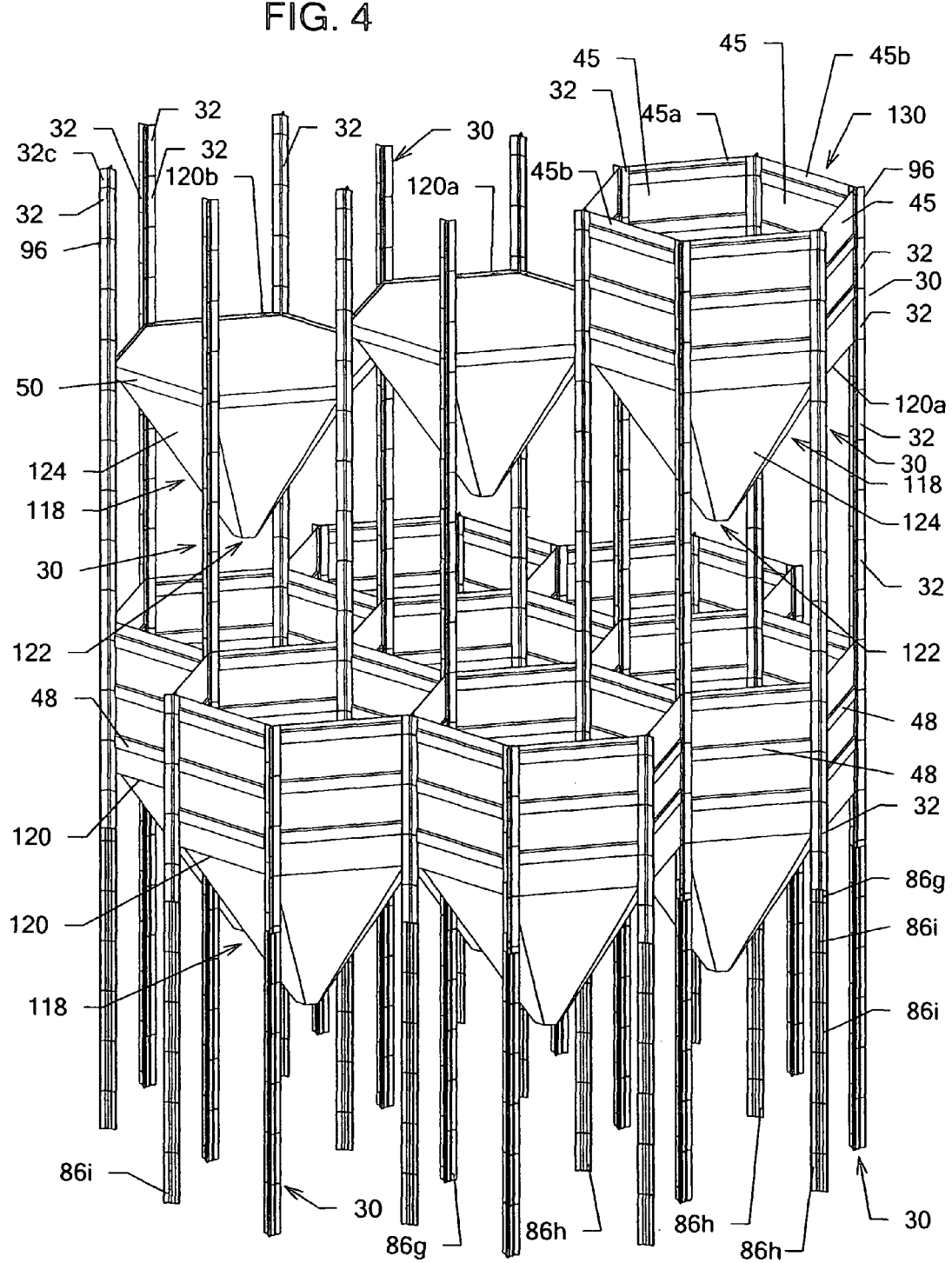
FIG. 4 shows an isometric view of a structure that can be built with a column, according to the invention, with columns extending above the structure to support another level of hopper bins, and columns extending below the structure to support the entire structure. Some bin walls in the second level of bins have been cut away to aid viewing.
Figure 7A:
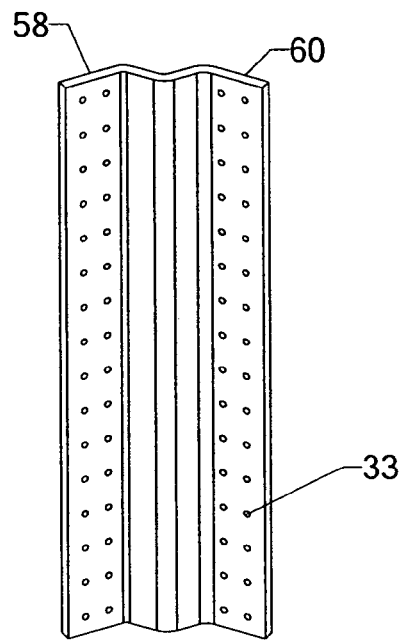
FIGS. 7A through 7D show isometric views of column panels with different configurations.
Figure 7B:
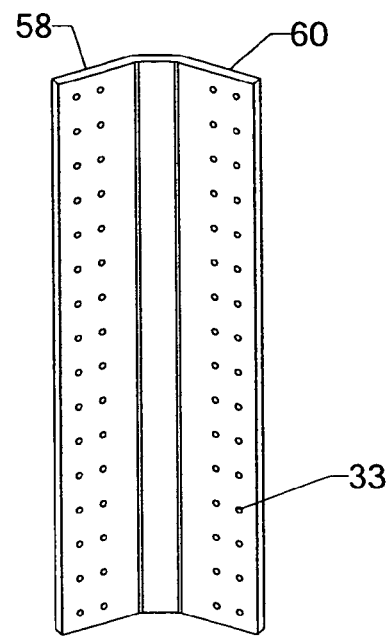
Figure 7C:
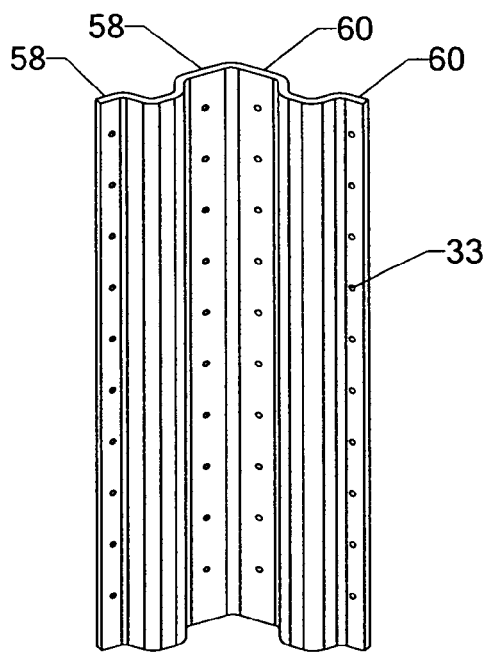
Figure 7D:
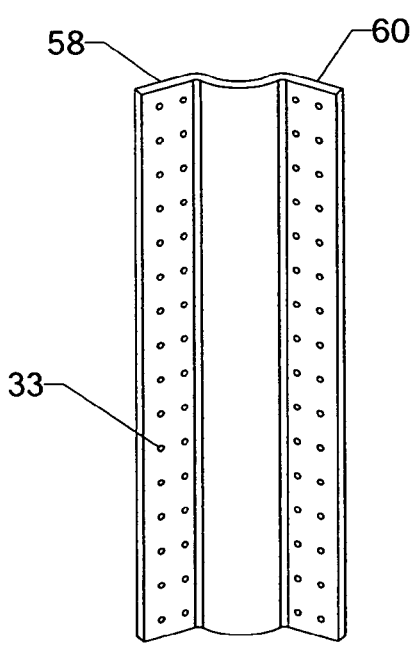

FIG. 4: Example of Structure Using Invention

A preferred embodiment of a structure of this invention is illustrated in FIG. 4. The structure shown is an array of bins and it uses columns according to the invention. Some bins have their upper wall panels broken away to aid viewing. The columns of this structure actually comprise a plurality of structural column panels 32 that are arrayed horizontally about a vertical axis, in a staggered relationship to one another. Column panels 32 are discussed in greater detail later. The structure, as shown, has an upper level of bins with hoppers 118, and a lower level of bins. Hoppers 118 within the upper level of bins have top edges 120a that are at a different vertical height than hopper 118 with top edge 120b. Hopper support beams 50 bear hopper panels 124, and they usually connect to columns 30. Also in FIG. 4, column splice panels 86g, 86h, and 86i, which are similar in configuration to column panels 32 and are laid over column panels 32 to increase column strength, can be seen in the lower portions of columns 30. Column splice panels will be discussed in more detail elsewhere.

As shown in FIG. 4, an advantage of the column is that it can be adapted to produce a wide variety of vertical or generally vertical columns that may be used, for example, in the following manners: (1) to connect horizontal cross members such as wall panels 45, 45a, and 45b, or beams, such as horizontal beams 48 or hopper support beams 50, (2) to form a structural support column 30 that extends below hopper bottom bins, (3) to form a tower to support distribution and process equipment (not shown), or (4) to support an upper level of compartments, as shown. The structure shown in FIG. 4 can also easily accommodate hoppers 118 with top edges 120, 120a, and 120b at different vertical heights from each other, as shown in the upper level of bins; or they may just as easily be at the same height as each other, as shown in the lower level of bins. As also shown in FIG. 4, the use of column panels 32 with the same or similar configuration can be used for connection of wall panels, and they can extend above or below the structure to form tower columns, upper level columns, or support columns. In other words, the plurality of vertically aligned load-bearing column panels 32 extends all the way from the top of the structure to its very bottom where it connects to a foundation, so column panels 32 are integral parts of a structure. All along the length of column 30, column panels 32 can be load-bearing structural components of the structure.

In addition to a storage silo or an array of such silos, a few examples of other structures that can be built with this column include a building for human occupancy, a tower, or support pillars for piers or bridges. As seen in FIG. 4, and as will be discussed elsewhere, the preferred embodiments of the invention are particularly advantageous in, but not limited to, attachment of one or more horizontal cross members, such as beams 48, wall panels 45, 45a, and 45b, or hopper support beams 50, whether they are of an industry standard formation or of a specific shape designed to maximize the characteristics of the building material used or for the structural requirements imposed.

FIGS. 5A Through 5E

Column in its Most Simple Form

FIG. 5A shows a very basic column 30a, similar to the one used throughout FIG. 4, in a preferred embodiment. The column components are adjoined using nuts and hex-head bolts 34 in this example. Seams 70, where top and bottom edges of column components meet, are also seen. Foundation anchor bolts 113 rise up through horizontal tabs 114 to anchor the column to a foundation 116. FIGS. 5B1-5B8, 5C, 5D and 5E are exploded views of components of the column of FIG. 5A that better illustrate its unique staggered feature. The material used to manufacture the column in the example is roll-formed galvanized steel, but other materials can be used, as discussed elsewhere.

Column panels 32 and 32a through 32f are shown individually in FIGS. 5B1 through 5B8. Each column panel has a top edge 52, a bottom edge 54, two side edges 56, a first flat side 58, a second flat side 60, an inward facing surface 62, and an outward facing surface 64. When column panel 32 (FIG. 5B1) has a different length, it is designated by an alphabetic suffix, for example, column panels 32a (FIG. 5B2), 32b (FIG. 5B3), 32c (FIG. 5B4), and so on. Preferably, boreholes 33 are positioned along the flat sides of column panels, and these are arranged so that they align logically with each other and with other components of the column, as are discussed elsewhere, for fastening purposes. Fasteners such as bolts or rivets can be used to adjoin column panels and other components where boreholes line up with each other. Using fasteners such as nuts and bolts or rivets to fasten column components is preferred, but other methods of assembling a structure are possible, and these are discussed elsewhere.

First flat side 58 and second flat side 60 of the basic column panels shown in FIGS. 5B1 through 5B8 are bisected by an angle that runs the vertical length of column. This angle can range from about 45 degrees to about 180 degrees, depending upon the design of the structure. The angle does not need to physically bisect the flat sides. Instead, the flat sides can be oriented at this angle from each other, with a wide variety of conformations in between them. In the example shown in FIGS. 5A through 5E, the angle at which the flat sides are oriented from each other is 120 degrees to accommodate a structure that is hexagonal in horizontal cross section, or a multi-compartmented structure that can resemble a honeycomb in cross section. Such a multi-compartmented structure is one of the most efficient in terms of material used and space required. Column panels in which other types of conformations bisect flat sides, or in which flat sides are oriented at angles other than 120 degrees from each other, are discussed elsewhere.

To envision how the column panels of FIGS. 5B1 through 5B8 are arranged in the column of FIG. 5A, imagine column panels that are vertically aligned to form legs 31 of the column, as shown in the exploded column view in FIG. 5C. In this example, three legs, 31a, 31b, and 31c, comprise a plurality of column panels 32, and 32b through 32g vertically aligning with each other. Legs 31a, 31b, and 31c are then arrayed horizontally about a central axis, so that first flat side 58 of leg 31a meets or nearly meets with second flat side 60 of leg 31b. First flat side 58 of leg 31c aligns with second flat side 60 of leg 31a, and second flat side 60 of leg 31c aligns with first flat side 58 of leg 31b. In this example, the column consists of three column legs, but the number of legs can vary from two to many, as will be discussed elsewhere. As shown in FIGS. 5A and 5C, the column panels are in a staggered relationship with each other, so that seams 70, where top edges 52 and bottom edges 54 (as defined in FIGS. 5B1 through 5B5) of components meet, occur in different horizontal planes from each other throughout the column.

To actually form the column of FIG. 5A, multiple vertically-aligning horizontal arrays, as shown in the exploded view in FIG. 5D, are connected to each other. In this example, each horizontal array has three offset column panels arrayed about a central vertical axis, with inward facing surfaces 62 of the column panels oriented towards the central axis. Preferably, the column has at least a top horizontal array 66 and a bottom horizontal array 74, and it may have any number of intermediate arrays 72. The column of FIG. 5A has one intermediate array, but the number can vary from zero, to many (such as in the structure of FIG. 4). Viewing the horizontal arrays in FIG. 5D, rather than the vertical array of column legs 31a, 31b, and 31c of FIG. 5C, is more conducive to understanding how the stagger is initially set up and how the column can be constructed using a jack-lifting method, like the one described earlier. A horizontal array, along with corresponding arrays of other columns and attached components in the structure, can be thought of as a 'ring', as in round grain bin jack-construction described earlier, or, more precisely, as a stratum, of the structure.

To establish the unique preferably staggered feature of column panels within the column, column panels in top horizontal array 66 are of different lengths from each other, to purposely set up a stagger of bottom edges of column panels in top horizontal array 66 (FIG. 5D). The stagger will continue all the way down the columns, such that seams 70 occur in different horizontal planes from each other along the vertical length of column 30a. Adjacent columns or all columns can also have staggered relationships that are different from each other and from other columns, such that seams 70 are in different generally horizontal planes from one another in adjacent columns or in corresponding locations of all other columns used in a structure, to increase strength of a complete structure. When column panels are used alone, without additional embodiments that will be described elsewhere, staggering the column panels enhances column strength and allows a column to be load-bearing throughout its length.

In general, column panels 32 of intermediate horizontal arrays 72 are preferably all the same length, to preserve the stagger established by the different-length column panels of top horizontal array 66 all the way down the columns. The column panels of bottom horizontal array 74 are preferably of various lengths, similar to top horizontal array 66, to ensure that bottom edges meet evenly at a foundation. Column panels of intermediate arrays 72 do not need to be of equal vertical lengths to maintain a harmonious staggering effect across the complete structure. However, intermediate column panels of equal length rather than variable length means fewer disparate parts to manufacture, inventory, and assemble. Furthermore, fewer total parts can be manufactured if standard and intermediate column panels are as long as possible, vertically, within practical limits. If a jack-lifting method is used, the vertical length of the longest panels will usually be restricted to up to about 3 meters, and preferably between 1.2 meters and 2.5 meters, although components used to create staggered relationships can be much shorter or longer, such as between about 15 cm and about 5 m, or more. Greater vertical column panel length will increase column strength. The staggering and column panels of different lengths are also provided so that adjacent columns preferably do not have common seams 70 at the same elevation while ensuring that columns finish with even tops and bottoms, when desired. Thickness 76 of the column panels, as defined in FIGS. 5B1-5B5, can be uniform throughout the column, or it may vary, as will be discussed elsewhere.

During construction, horizontal arrays interconnect with one another, as more clearly shown in FIG. 5D. Column panels 32 are shown in intermediate horizontal array 72 as they would connect to horizontal arrays above and below them. In the example of FIG. 5D, column panels 32 and 32b connect with two other column panels 32 that extend above a third column panel 32 in horizontal array 72. column panels 32e and 32f within horizontal array 74 connect with column panels 32 that descend from horizontal array 72. Generally, at least one column panel on each end extends vertically beyond the others within array 72 for connection to column panels in next upper or next lower horizontal arrays. In this example, top array 66 and bottom array 74 are the next upper and next lower array, respectively. However, a column may have any number of intermediate arrays, and each top, bottom, and intermediate array can have any number of column panels, as dictated by a structure's design and the established staggered relationship.

Jack-Lifting Construction

Figure 2:
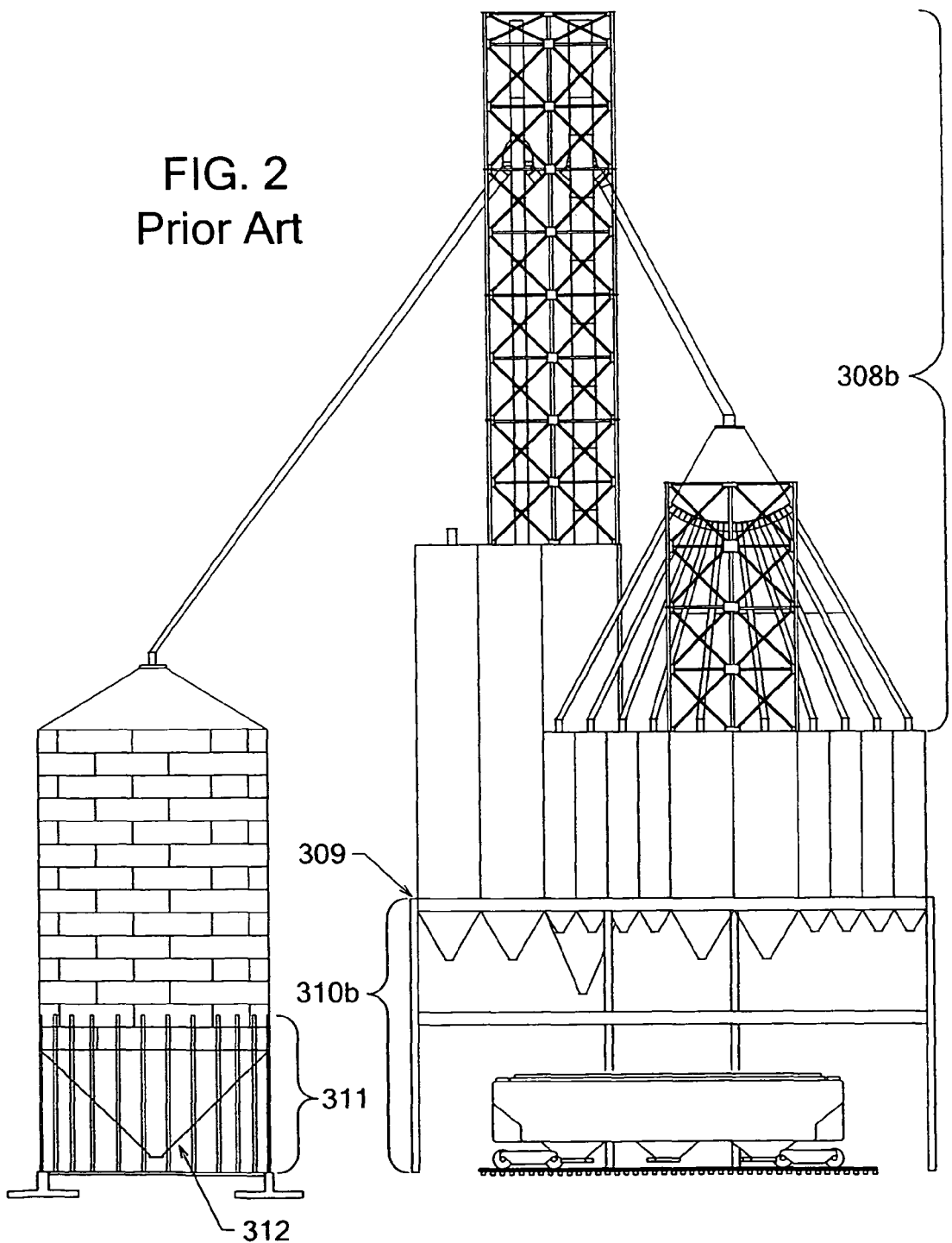
FIG. 2 (Prior Art) shows a front view of support structures for a hopper bottom round grain bin and an array of polygonal shared-wall bins.
Figure 3:
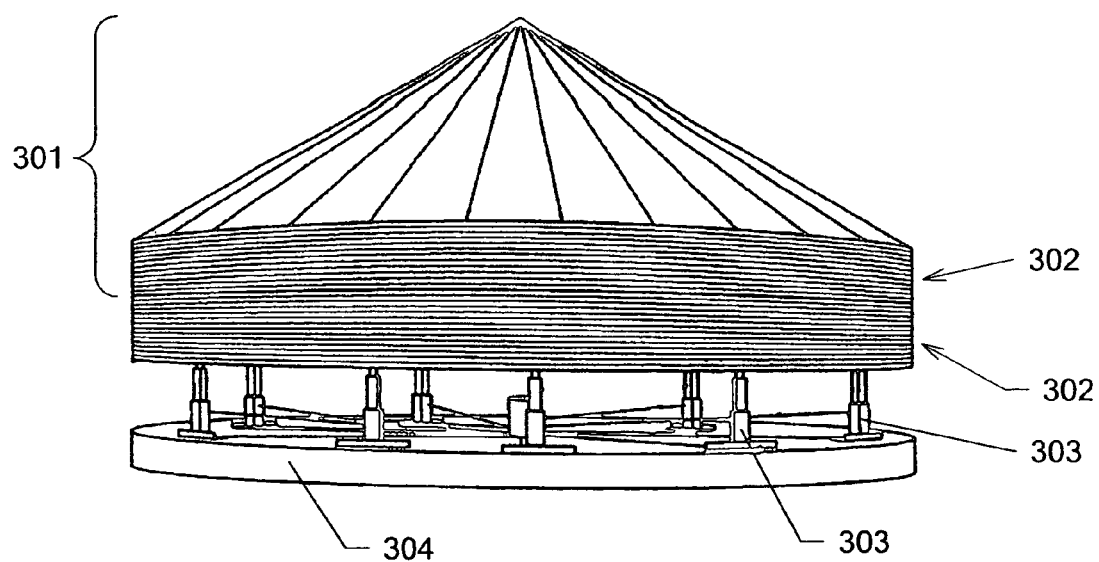
FIG. 3 (Prior Art) shows a front view of a method of jack-lifting a round grain bin.

In the preferred embodiment illustrated in FIG. 4, a jack-lifting method, such as the one described previously and shown in FIG. 3 (Prior Art) can be used, if modified appropriately by one skilled in the art, to construct the structure. Hydraulic, electric, manual, or screw-powered jacks can be used. A horizontal ring, in this case, comprises multiple column panels and other structural elements that are not necessarily circular in horizontal cross-section. Consequently, the horizontal arrays are thought of as strata, rather than 'rings'. The top edges of the components are not necessarily in the same horizontal plane, due to the preferable stagger that is established among column components, yet they can still be considered as part of the same generally horizontal stratum. Using a jacking method like the one described earlier, the process generally involves the following steps: (1) the very top horizontal stratum of the structure is assembled first, at or near ground level; the top horizontal stratum can consist of any number of configurations, such as the top stratum of a process tower similar to towers 308a and 308b, as seen in FIGS. 1 and 2, or the top stratum of an upper level of compartments as shown in FIG. 4. A roof, if desired, is built on top of this first stratum, and any equipment that will be at or near the top can be installed, while this first assembly is still at or near ground level; (2) jacks are then attached to the bottom of the top horizontal stratum to lift it to provide room underneath to add an intermediate horizontal stratum; (3) the process of lifting and removing and re-attaching jacks is repeated until a predetermined vertical height is achieved; and (4) the bottom horizontal array is attached, the jacks are removed, and the structure is anchored to a foundation.

Thus, every part of a structure, such as a roof, equipment, process tower, upper level, lower levels, and support columns, can each be constructed and assembled at or near ground level and finally anchored to a foundation, without the use of expensive cranes, skilled labor, or complicated tools, while allowing workers to work in relative safety at or near ground level.

Column panels 32, such as those seen in FIGS. 4 and 5A are preferably sized and adapted for connection to each other, to wall panels 45, to horizontal beams 48, to other support connections, or any combination of these, in a manner that is conducive to the method of jack-lifting construction. As a result, length of column panels is generally less than 3 meters and preferably between 1.2 and 2.5 meters, in order to be assembled with jacks. Much longer and much shorter column panels, such as between about 15 cm and about 5 m, or more, can be used to establish the staggered relationship. The preferred thicknesses 76 of the column panels (as defined in FIGS. 5B1-5B8) can vary, and can be less than 1 cm to about 5 cm, and the thickness can vary along the column. Widths 78 of flat sides 58 and 60 of column panels, as defined in FIGS. 5B1-5B5, can also vary, as discussed elsewhere, depending upon the structural requirements imposed upon the panel, and these factors can be determined by one skilled in the art. Typically, width 78 will generally be about 5 to 20 cm, but it can be much wider, up to about a meter or more.

If a crane construction method is used to assemble structures made with the column, then the dimensions of column components can be much larger. For example, thickness 76 can be as large as 10 cm or more, widths 78 can be as wide as 0.6 m or more, and vertical lengths of column panels can be about 18 m or more. Actual dimensions are limited by, for example, the size of crane used, or the materials used for manufacturing the column components. The versatility of the column allows it to be able to accommodate either jack construction or crane construction. The advantages of jack-lifting construction, such as providing a safer work environment, elimination of crane expenses, and the ability to use relatively unskilled labor, makes a jack-lifting method the preferred method of construction.

Additional Embodiments

FIGS. 6A Through 6H: Increasing Column Strength with Column Splice Panels and Column Spacer Plates FIG. 6A shows an isometric view of a column with additional column components that add strength to the column, and FIG. 6D shows its top view. Although column panels are preferably staggered in relationship to one another to increase column strength, as discussed earlier, the column may still require additional structural reinforcement. To further increase column strength, additional column components, such as column splice panels 86b through 86j that are used in the column of FIG. 6A (shown individually in FIGS. 6B1 through 6B9) are used to overlap seams where underlying column components (column panels in this case) are vertically adjoined. Such components add additional outward stratifications, or layers, to the column, and such layers enhance column strength. Column splice panels can be thought of as slightly modified column panels, the modification usually being a slightly adjusted angle at which flat sides are oriented from each other, when necessary, so that the column splice panel will nest neatly over underlying column components, such as column panels or other column splice panels.

In general, column splice panels can have similar or different configurations as column panels, and they preferably cover seams 70 created by vertically adjacent column panels or other underlying column components. In FIG. 6B1, column splice panel 86b is shown, and it is similar in configuration to column panels 32 and 32a through 32g shown in FIGS. 5B1-5B5. FIGS. 6B2 through 6B9 show column splice panels, 86c through 86j, that have different configurations from column splice panel 86b. Boreholes 33 that run along the length of the flat sides of the column splice panel will line up evenly with boreholes 33 of underlying column components for fastening purposes. Column splice panels with different lengths and/or configurations are followed by an alphabetical suffix (e.g., 86b, 86c, 86d, etc.).

Column spacer plates such as column spacer plates 88, 88a, 88d, and 88e, as seen individually in FIGS. 6C1, 6C2, 6C3, and C4, respectively, also add strength to the column, and they are typically used wherever a gap must be taken up, such as to keep a uniform spread between the column panels below or above where wall panels end. The lengths can vary from those shown. For further structural strength, side edges of spacer plates that are oriented toward the central axis of the column can be field welded to each other or to a rod that can be placed at the vertical axis of the column (not shown). Top and bottom edges of column spacer plates also align, to in effect add an additional layer to the column. When a column spacer plate 88 has a different length, it is followed by an alphabetical suffix (e.g., 88a, 88b, 88c, etc.).

FIG. 6E shows an exploded view of the horizontal arrays of the column in FIG. 6A. It demonstrates how the column panels, column splice panels, and column spacer plates form a top horizontal array 66a, two intermediate horizontal arrays 72a and 72b, and a bottom horizontal array 74a, in this example.

FIGS. 6F is an exploded view of one of the three legs that form the column of FIG. 6A. FIGS. 6G and 6H are the exploded views of the other two legs. These views aid in seeing how column splice panels and column spacer plates within the column of FIG. 6A, shown individually in FIGS. 6B1-6B9 and 6C1-6C4, are used in the column. FIGS. 6F, 6G, and 6H. FIGS. 6F-6H also clearly show the staggered relationships among the components. As can be seen, each leg comprises three layers, or stratifications, of column components.

Such embodiments as column splice panels and column spacer plates add vertically-oriented outer layers to the column (FIGS. 6F, 6G, and 6H), and thus contribute to the strength of the column. The number of such layers can vary from one additional layer to many, depending on the structural requirements. Thickness 76 (defined previously in FIGS. 5B1-5B5) of the column can in effect be made thicker by adding one or more layers of column splice panels, column spacer plates, or other column components, or by manufacturing thicker column components, to further increase column strength.

Column splice panels and column spacer plates also may vary in height to establish staggered relationships, similar to that described for column panels, preferably such that no seam occurs in the same horizontal plane as any other seam throughout the column. If such a stagger is not practical, then preferably no seam occurs in the same horizontal plane as any other seam within the same vertically-oriented layer of the column. In general, however, only seams in adjacent layers (that is, the next outer layer or the immediate underlying layer) need be in different horizontal planes from each other (not shown).

FIGS. 7A Through 7D and 8A Through 8D

Examples of Other Column Component Configurations

Vertical corrugations or shapes can run the length of column panels or column splice panels. These corrugations or shapes further increase column strength. They can also provide vertically-oriented sides to which beams can be attached. Examples of how the shape and number of such vertical corrugations can vary is shown more clearly in FIGS. 7A through 7D. The column panels shown in FIGS. 7A, 7B, 7C, and 7D have three angles, two angles, nine angles, and two angles intersected by an arc, respectively, between first flat sides 58 and second flat sides 60 of column components. In general, regardless of the configuration, first flat sides 58 of column components should meet in parallel, or nearly parallel, with second flat sides 60 of adjacent column components, even if the configuration of the adjacent column component is different from the first (not shown). First flat side 58 of one column panel preferably parallels or nearly parallels second flat side 60 of a column panel that is adjacent to it within the same horizontal array, as the examples in FIGS. 8A through 8D show. In the examples shown, boreholes 33 run along flat sides 58 and 60.

Figure 8A:
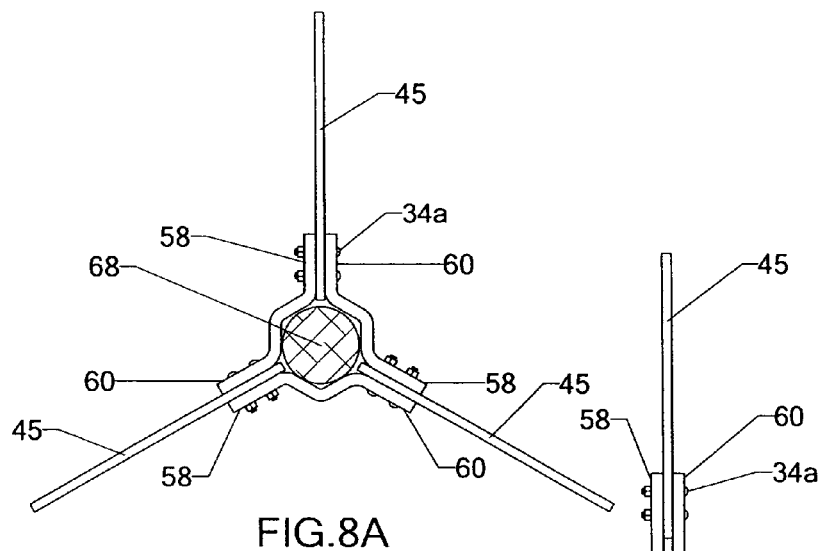
FIGS. 8A through 8D show the top views of how the column panel configurations shown in FIGS. 7A through 7D appear when they form columns and are attached to horizontal cross members, such as wall panels.
Figure 8B:
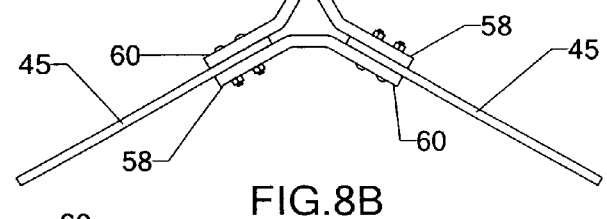
Figure 8C:
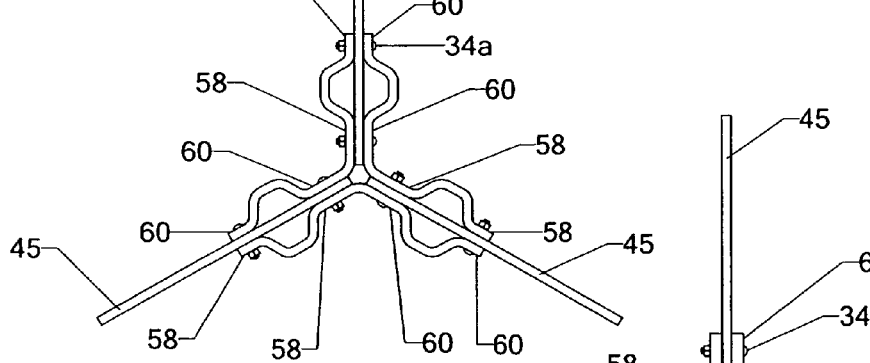
Figure 8D:
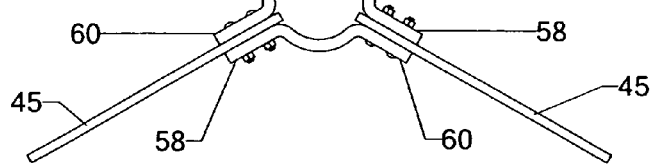

FIGS. 8A through 8D shows the top views of how the column panels shown in FIGS. 7A through 7D appear when they are used to form columns. In the examples, wall panels 45 are sandwiched between column panels, and first flat sides 58 of column panels align with second flat sides 60 of adjacent column panels within columns. Bolts 34a adjoin column components with wall panels 45. Sizable hollow portions are sometimes formed along the central vertical axis or along the flat sides of the column panels. These hollow portions can be filled with concrete 68, as shown in FIG. 8A, or some other castable material, to add even further column strength.

FIGS. 9A Through 9H

Figure 9C:
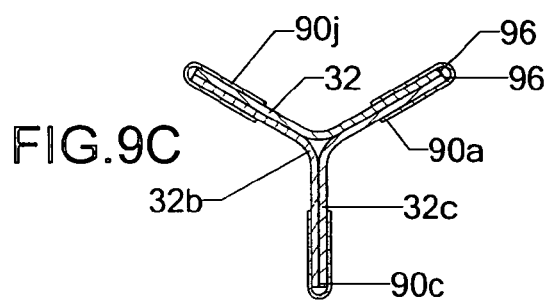

Further Strengthening the Column with U-Clips, or with Gradations in Width of Flat Sides Generally, the column panels throughout a column are preferably similar to each other in the magnitude of the angle at which flat sides are oriented from each other. They are also preferably similar in their general shape and surface contour, as this makes manufacture of the panels more economical and assembly easier to manage. However, in some instances, column components can vary in configuration or in other ways, as shown in FIG. 9A, which shows an isometric view of a complex column that includes basic column panels, like those seen in FIGS. 5A and 6A (discussed previously), as well as more complex column panels, similar to those seen in FIGS. 7A-7D (previously discussed). FIG. 9B is a side view of the column of FIG. 9A, and FIGS. 9C, 9D, 9E, and 9F are various horizontal cross-section views taken from FIG. 9B. FIG. 9G shows, individually, more complex column panels 32i, 32j, 32k, 32l, and 32m that are used in the column of FIG. 9A. Basic column panels 32 and 32b that are used in the column of FIG. 9A are shown in FIG. 9A only. FIG. 9H shows U-clips 90 and 90a through 90j that are used in the column of FIG. 9A.

In FIG. 9G, width of flat sides 78 of column panels varies from each other. For example, column panel 32i has narrower width 78 than column panels 32j, 32k, 32l, and 32m. Column panel 32j has narrower width 78 and less prominent corrugations than column panels 32i, 32j, 32k, 32l, and 32m. Width 78 of column panels 32i, 32j, 32k, 32l, and 32m have corrugations and wider flat sides than column panels 32 and 32b. All of these variations of column panel 32 can coincide within the same column, as the column of FIG. 9A demonstrates. Similar variations can also be applied to column splice panels (not shown).

Figure 9D:
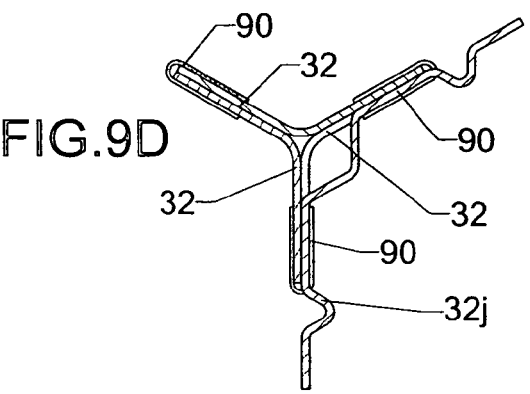
Figure 9E:
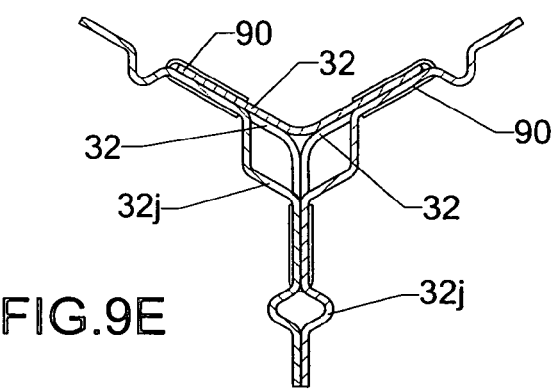
Figure 9F:
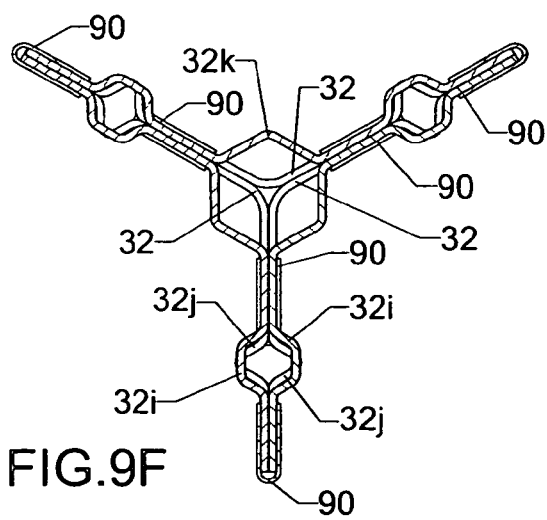
Figure 9B:
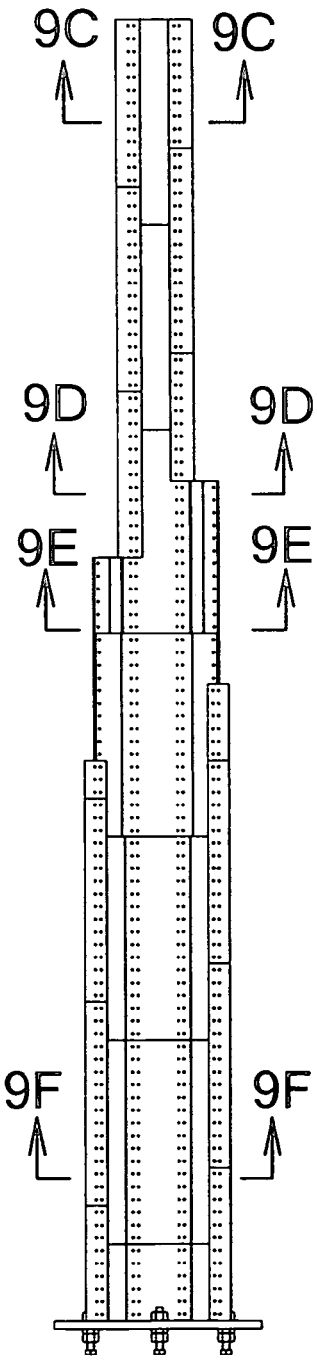

Horizontal cross-sectional views at different vertical heights of the column side view, as seen in FIG. 9B, are shown in FIGS. 9C through 9F. FIG. 9C shows the horizontal cross section along the line 9C-9C in FIG. 9B. At this point, the basic column panels are without corrugations and are narrower in side width than column panels in lower arrays. FIG. 9D shows the cross section view along the line 9D-9D in FIG. 9B, and FIG. 9E shows the cross section view along the line 9E-9E in FIG. 9B. As can be seen, the complexity of the column gradually increases as one descends the column in cross-section view. Additional column panels with more pronounced vertical corrugations are seen in FIG. 9F which shows the cross section along the line 9F-9F in the bottom array of FIG. 9B. In general, the isometric view of the column, in FIG. 9A, exemplifies how column panels with narrower flat sides can be used at and near the top of a structure and column panels with wider flat sides and more pronounced vertical corrugations can be used at and near the bottom of the structure, or wherever increased strength is required. Thickness 76 (as previously described in FIGS. 5B1-5B5 and 6C1) can also vary. The column can accommodate thinner panels at or near the top (not shown), and thicker column panels at or near the bottom (not shown). In general, the column can accommodate column components with differences in thickness 76 (not shown), width 78, and configuration, all within the same column.

Elongated U-shaped clips 90 and 90a through 90j that are used in the column of FIG. 9A are shown individually in FIG. 9H. Such U-clips are used to cover exposed side edges 96 where column panels adjoin, examples of which can be seen in FIGS. 9A through 9F. In FIG. 9H, the different U-clip configurations are followed by an alphabetic suffix (e.g., 90a, 90b, 90c, etc.). These U-clips, used in the column of FIG. 9A, vary in their length or width. U-clips such as these not only add structural strength, but they also provide an aesthetically-appealing appearance and protection from destructive environmental elements such as dust and rain. Generally, U-clip 90 is attached around exposed side edges 96 of a column, with spacer plate 88 sandwiched in between column panels when dictated by the structure design, to provide a cap over several otherwise weather-exposed layers of column component side edges. In addition, clip 90 provides additional structural support by preventing column stratifications from splitting. U-clips, like other column components, are also preferably arranged in a staggered relationship to avoid a common horizontal seam at any point among column components along the length of the column, whenever practical. Though a staggered relationship is preferable, such a relationship is not required for U-clips and spacer plates.

FIGS. 10A and 10B, 11A, and 11B

Wall Panels, Wall Splice Panels, Wall Spacer Plates

Figure 10A:
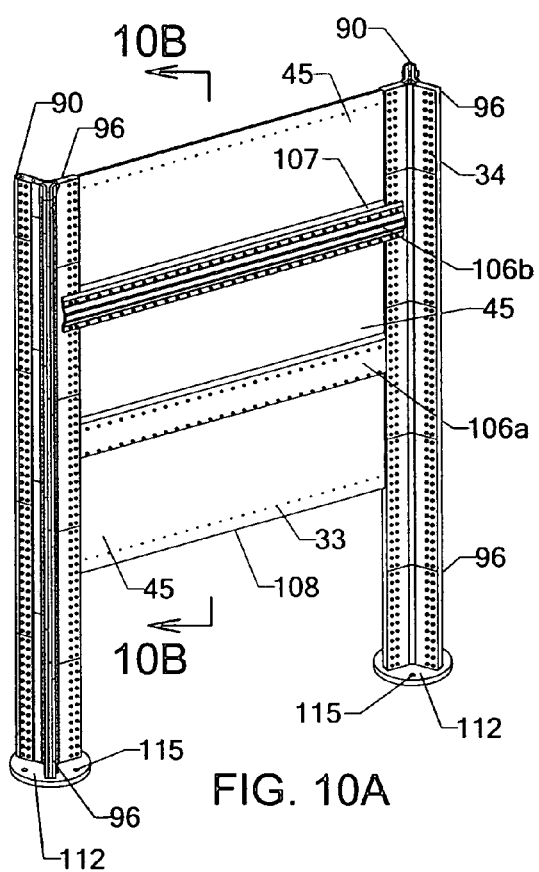
FIGS. 10A and 10B show two views of how basic wall panels, U-clips, spacer plates, and different configurations of wall panel splices can attach to columns.

Wall panels 45 as shown in FIG. 10A preferably is rectangular, where top and bottom edges are the longer sides, and the two side edges are the shorter sides are where columns are attached. Three wall panels 45 align vertically in FIG. 10A to form a wall. Boreholes 33 preferably are arranged near all edges for fastening means. For certain structures, a wall panel side edge is preferably sandwiched between two flat sides of column panels, as illustrated in FIG. 10A, so that each wall panel is, in effect, attached to inside surfaces of the column panels, and compartments thus created share single walls. Edges of wall panels vertically align with one another to form walls, and where edges meet, a small separation (not shown) can be incorporated, to allow for expansion and contraction. Other arrangements of wall panels, such as those that form dual-walls or multi-ply walls, are discussed elsewhere. Column spacer plates 88a and 88d are of similar thickness to wall panels at the lower portion of a wall, and they are preferably placed between flat sides 58 and 60 of column panels that comprise the structural support legs, or where wall panels end, as more clearly shown in the close-up view in FIG. 10B.

Figures 11A, 11B, 11C:
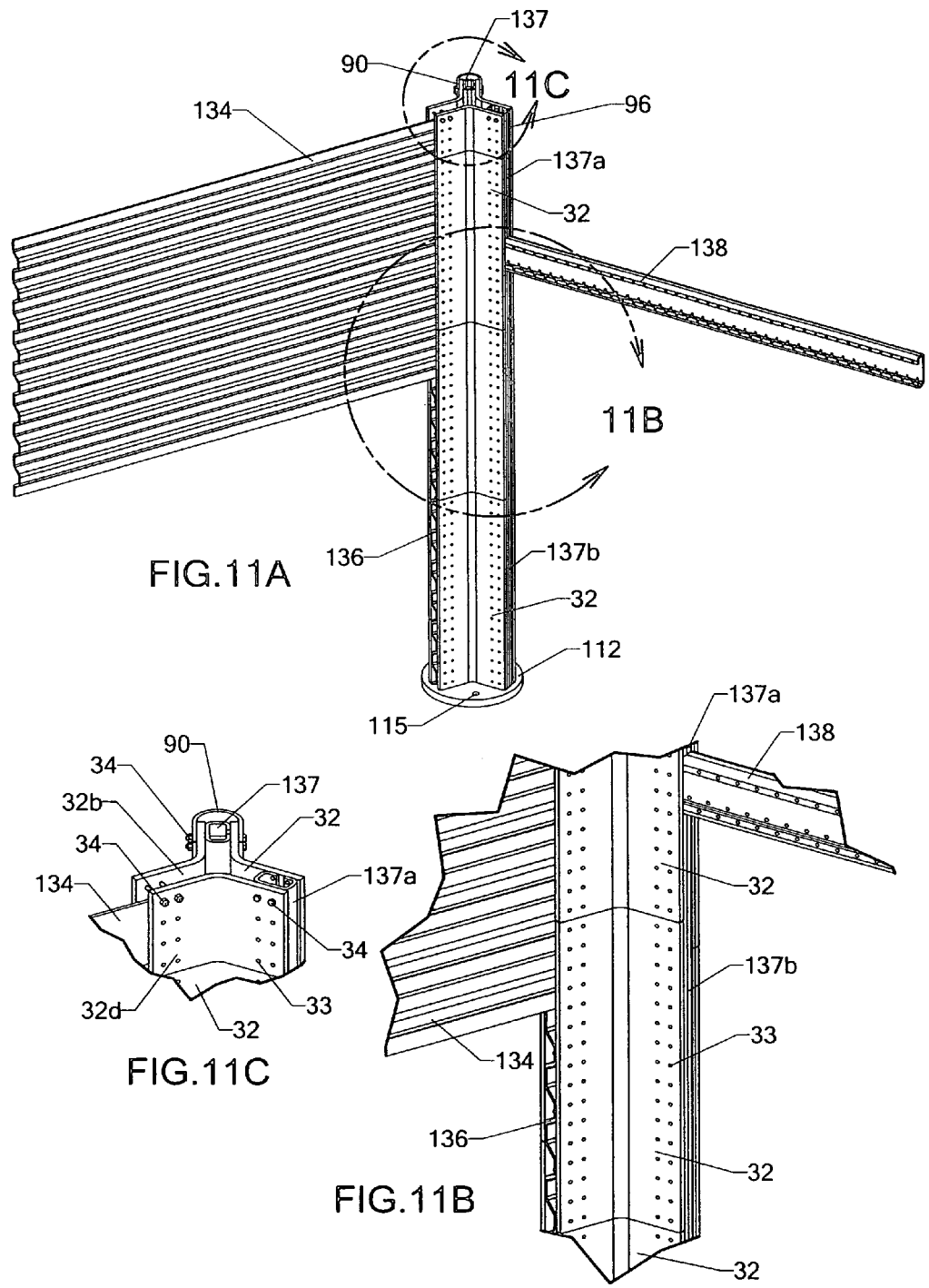
FIGS. 11A through 11C show various isometric views of a corrugated wall panel and a C-beam sandwiched between flat sides of a column.

The column can also accommodate wall panels that are corrugated, as shown in FIG. 11A, which shows a corrugated wall panel and a C-beam connecting to a column. A corrugated wall panel 134 is shown more clearly in the close-up in FIG. 11B, where it is sandwiched between flat sides of column panels. Below the wall panel where the wall ends, best shown in the close-up of FIG. 11B, the gap between column panels is taken up by a corrugated column spacer plate 136, but other column spacer configurations, as discussed in the next section, could be used. The corrugated wall panel could alternatively be attached to outward-facing surfaces of a column. Thus, the versatility of the column allows it to accommodate a wide variety of wall panel placements and configurations.

Figure 10B:
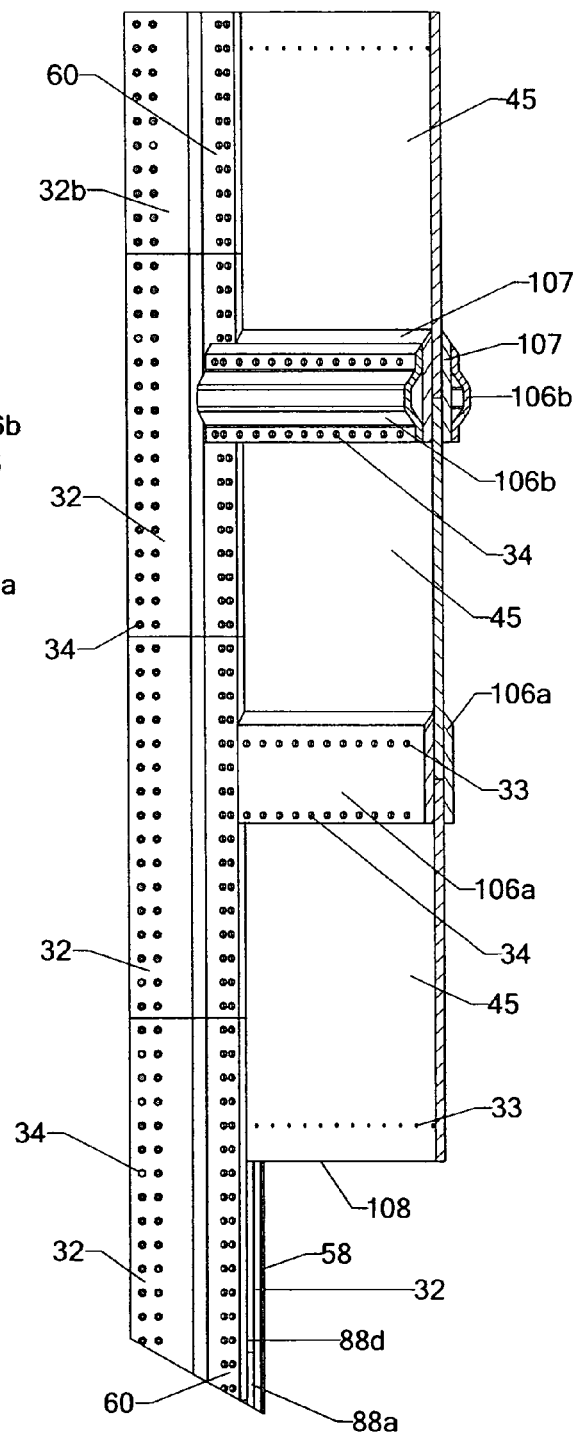

In FIGS. 10A and 10B, wall splice panels 106a and 106b are similar to horizontal beams 48, except they are used to cover horizontal seams created where top and bottom edges of wall panels vertically align. Wall splice panels 106a and 106b can be built in a variety of shapes and configurations, such as, but not limited to, the following: (a) a flat wall splice panel, such as wall splice panel 106a (FIGS. 10A and 10B); (b) a wall splice panel, like wall splice panel 106b, with vertical flanges on ends of half hexagon or center segmented hexagon (FIGS. 10A and 10B); (c) a wall splice panel that begins with a vertical flange that attaches to the bottom of an upper wall panel, makes a downward angle, bends back to the top of the vertically-aligning lower wall panel, and flanges down to be connected with fasteners to the lower wall panel (not shown); or (d) a wall splice panel with vertical flanges on ends of protruding triangle (not shown).

Wall splice panels preferably begin and end their connections on the outward-facing surfaces of the column panels that are attached to the sides of the wall panels, as shown with wall splice panel 106b in FIGS. 10A and 10B. To take up the resulting gap between wall panel 45 and wall splice panel 106b, wall spacer plate 107 (similar to wall splice panel described in (a) above) is sandwiched between the vertical flanges of the horizontal wall splice panels and the wall panels. Two separate wall spacer plates may be used, one for each of the vertical flanges of wall splice panel 106b (not shown). Or, one spacer plate 107 (as shown) can traverse from the upper vertical flange to the bottom flange. If one horizontal wall spacer plate is utilized, it also could have horizontal corrugations, which would be manufactured such that they nest within the contours of the wall splice panel, to further increase the strength of the wall. Alternatively, wall splice panel 106a, which is similar to wall spacer plate 107, as detailed in FIG. 10B, may cover the seam without attaching to column panels.

As shown in the close-up in FIG. 10B, column spacer plates 88a and 88d are used wherever a gap must be taken up in the column, such as to keep a uniform spread between the column panels below or above where wall panels end 108. Another circumstance where column spacer plates may be needed is along exposed side edges 96 of column panels (FIG. 10A). Exposed side edges 96 generally occur around the outside perimeter of a structure, as seen in FIG. 4, or wherever a wall panel or other horizontal cross member is not sandwiched between column panels, as seen in FIGS. 10A and 11A.

FIGS. 11A, 11B, 11C, and 12A Through 13D

Horizontal Beams

As shown in FIG. 11A and in the close-up views of FIGS. 11B and 11C, vertically-oriented C-beams 137, 137a, and 137b can also be used to take up gaps between flat sides of column panels, especially if thick or corrugated wall panels, or thick beams, such as C-beam 138, are used. C-beam 137 takes up a gap along the full vertical length of the column. C-beam 137a takes up a gap above horizontally-oriented C-beam 138 that is sandwiched between column panels, and C-beam 137b takes up a gap below C-beam 138.

The column and its components already discussed provide a method of conveniently connecting standard or customized horizontal beams, to support, for example, equipment and access mezzanine platforms. As shown in FIG. 12A, beams 48, 48a, and 140 can connect directly to column components. In the enlarged cross-sectional view of FIG. 12B, taken along the line of 12B-12B in FIG. 12A, a modified I-beam 140 is sandwiched between column panels, and beams 48 attach directly to column panels 32, 32b, and 32d. I-beam 140 has tabs 141 at each side end, shown in detail in FIG. 12C, that are sandwiched between column panels. Beam 48 in FIG. 12B attaches to outward surfaces of the column, and horizontal spacer plate 107 underlies beam 48, to take up the gap between the beam and another beam 48a that is sandwiched between column panels.

Figures 13A, 13D:
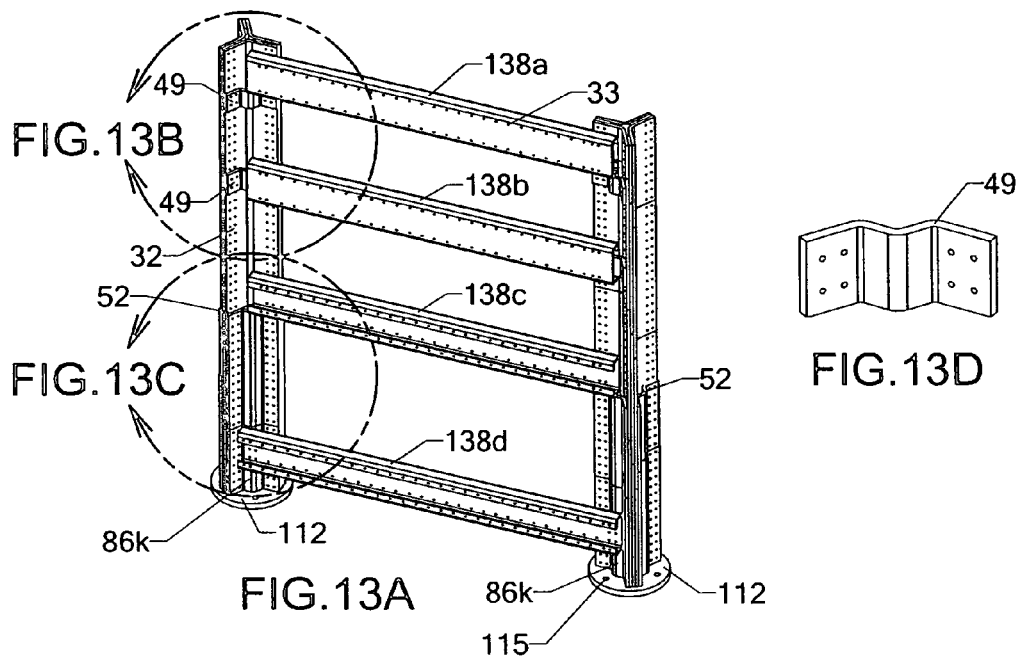
FIGS. 13A through 13C shows an isometric view and close-up views of C-beams attaching to column components.
FIG. 13D shows a detail of a beam support panel as seen in FIGS. 13A through 13C.
Figures 13B, 13C:
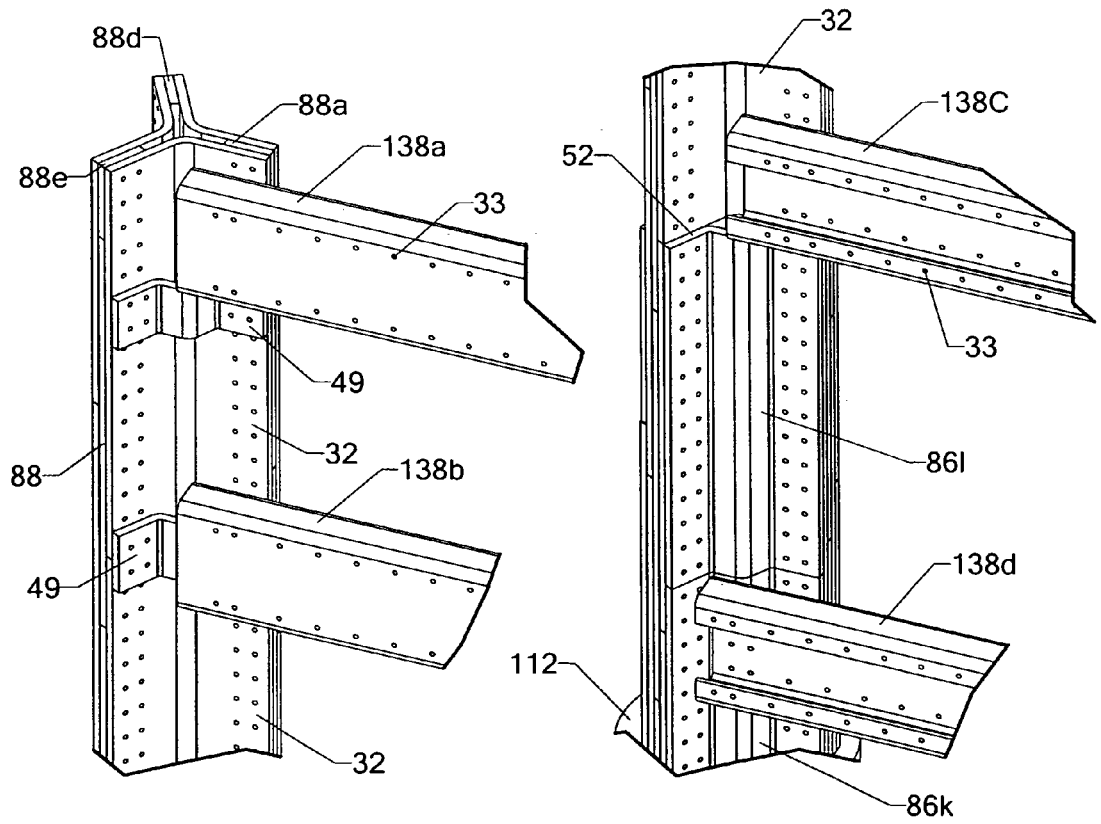

In FIG. 13A, C-beams 138a, 138b, 138c, and 138d are shown connecting to columns in various ways. FIGS. 13B and 13C are close-ups from FIG. 13A. As FIG. 13B shows, C-beams 138a and 138b are supported by beam support panels 49. In FIG. 13C, C-beam 138d attaches directly to column splice panel 86k, and C-beam 138c rests on the top edge 52 of column splice panel 86l. A beam support panel is shown in detail in FIG. 13D. It can resemble column panels or column splice panels, except it is generally shorter in vertical length and functions as a beam support panel.

Generally, the column can accommodate standard beam configurations, such as I-beams 140 and C-beams 138, or customized horizontal beams, such as beams 48 and 48a. The beams can attach to outward-facing surfaces of the column or they can be sandwiched between inward-facing surfaces of column components.

FIGS. 14, 15A-15B, and 16A-16B

The Shape of the Structure Dictates Orientation Angle

The angle at which flat sides of column components are oriented from each other is dictated by the shape of the structure to be built. The column panels which have been described and shown thus far have flat sides that are oriented 120 degrees from each other. Such column panels form a column comprising three column legs. An array of such columns, when wall panels or beams of uniform horizontal length are attached, will form a structure that has one or more compartments that are substantially hexagonal in cross section. A structure with multiple hexagonal compartments resembles a honeycomb in horizontal cross section. Such a configuration is preferred when a multi-compartmented structure is desired, since it most efficiently uses materials and space. However, the column can accommodate structures with other geometric horizontal cross sections, such as regular or irregular polygonal shapes or even structures that are substantially round in cross section.

The column panels need not be restricted to having flat sides oriented at 120 degrees from each other or to form a three-legged column. The orientation of flat sides to each other depends on the desired angle formed where two or more wall panels or beams meet or nearly meet. The angle at which flat sides are oriented to each other will typically be of a magnitude from about 45 degrees to about 180 degrees. The side edges of wall panels 45 or horizontal beams 48 may meet or nearly meet at an angle appropriate for the number of side walls of a single polygonal structure or an array of polygonal structures.

Figure 14:
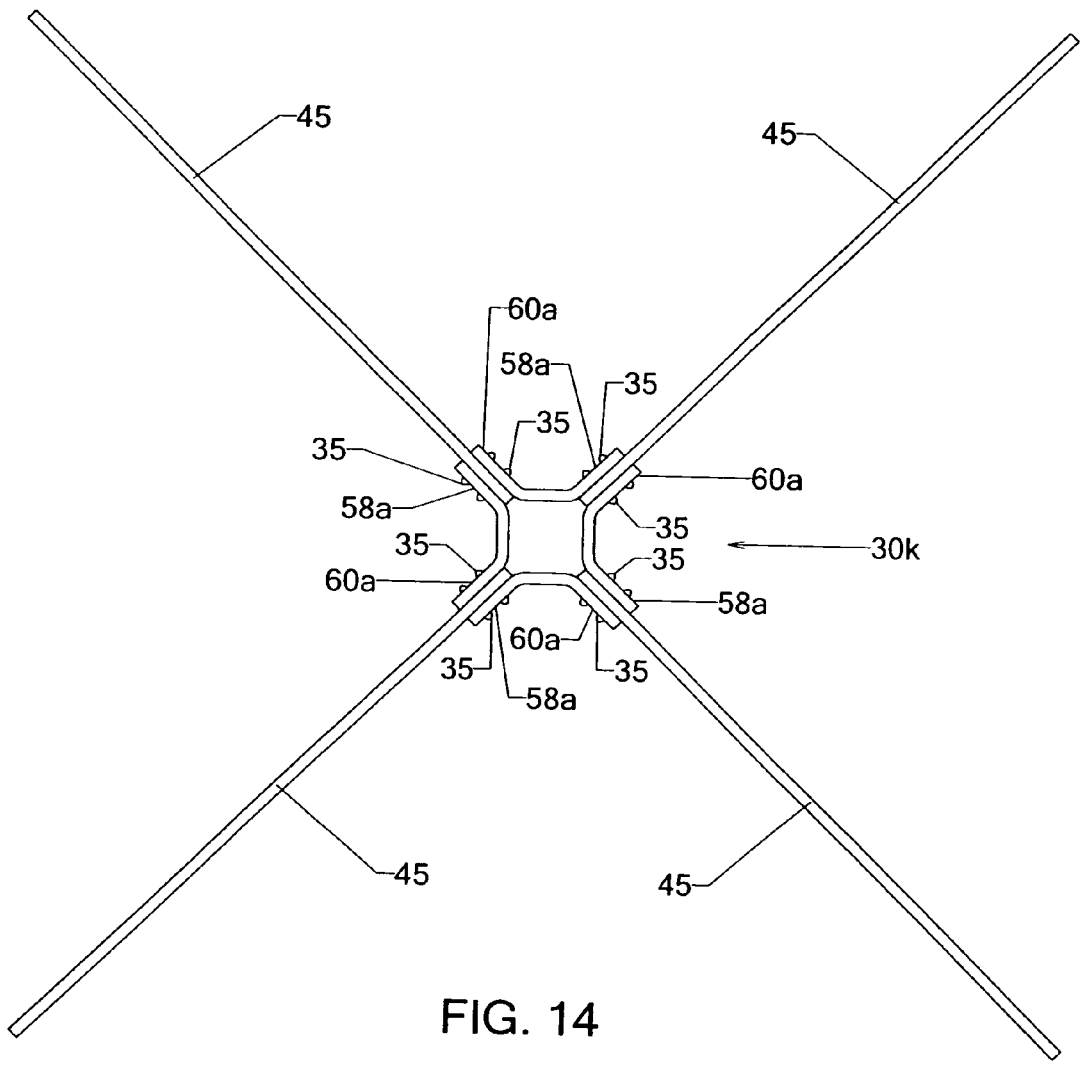
FIG. 14 is the top view of a four-legged column, in which flat sides are oriented at 90 degrees from each other, with four wall panels attached to form square or rectangular structures.

FIGS. 14, 15A-15B, and 16A-16B show a few examples of columns comprising column panels that have flat sides oriented at angles other than 120 degrees from each other. These figures show only a portion, such as the top stratum, of sample structures that can be built with such columns. FIG. 14 shows a top view of a four-legged column 30k with four attached wall panels 45 in which first flat sides 58a are oriented 90 degrees from second flat sides 60a. Such a column can be used to form a single square or rectangular structure, or a structure with multiple square and/or rectangular compartments having a variation of two, three, or four sides meeting at an angle of 90 degrees. A three-legged column 30l depicted in the partial structure in FIG. 15A and its close-up view in FIG. 15B comprises two legs with column panels having first flat sides 58b oriented 135 degrees from their second flat sides 60b, and a third leg with column panels having flat sides 58a oriented 90 degrees from their second flat sides 60a. Such columns form an octagonal structure, or a structure with multiple octagonal and square compartments (the top stratum of such a multi-compartmented structure is shown in FIG. 15A), in which two sides meet at 135 degrees (in the case of a single octagonal bin, for example), or a combination of two or three sides meet at an angle of 135 degrees or 90 degrees (in the case of a cluster of octagonal and square bins, for example). A six-legged column 30m, as depicted in the center of the partial structure shown in FIG. 16A, comprises column panels with first flat sides 58c oriented 60 degrees from second flat sides 60c, as seen more clearly in the close-up view of FIG. 16B. Such a column can be used to form a single-compartmented triangular structure, or a structure with multiple triangular compartments (the top stratum of such a structure is shown in FIG. 16A). The example in FIG. 16A also shows a four-legged column 30n, in which two legs have column panels whose flat sides are oriented at 60 degrees from each other, and two legs have column panels whose flat sides are oriented 120 degrees from each other. Columns 30m and 30n can be used in conjunction to form hexagonal and triangular compartments within the same structure.

The versatility of the column in general allows many configurations to co-exist within the same structure. One structure can have a variety of differently-shaped polygonal compartments. Furthermore, a structure need not have regular polygonal shapes like those described above. The configuration of the column can accommodate irregular polygonal shapes as well, where horizontal wall length is not necessarily equilateral, simply by adjusting the angle at which flat sides are oriented from each other. One of the many benefits of the column is it can have a wide spectrum of configurations, even within a single structure.

FIGS. 17A, 17B, and 18 Through 22

Extending the Horizontal Length Or Enhancing the Strength of Walls or Sides of a Structure Generally, in a preferred embodiment, column panels in the region of bin walls or other partitions serve multiple functions, such as: (1) corner columns of wall panels 45 that meet at or near corners, (2) vertical stiffener columns for strengthening or reinforcing a structure, or (3) wall-extending columns for joining two wall panels that align with each other along their vertical side edges to horizontally lengthen the wall or side of a structure, or (4) any combination of the above.

Figure 17A:
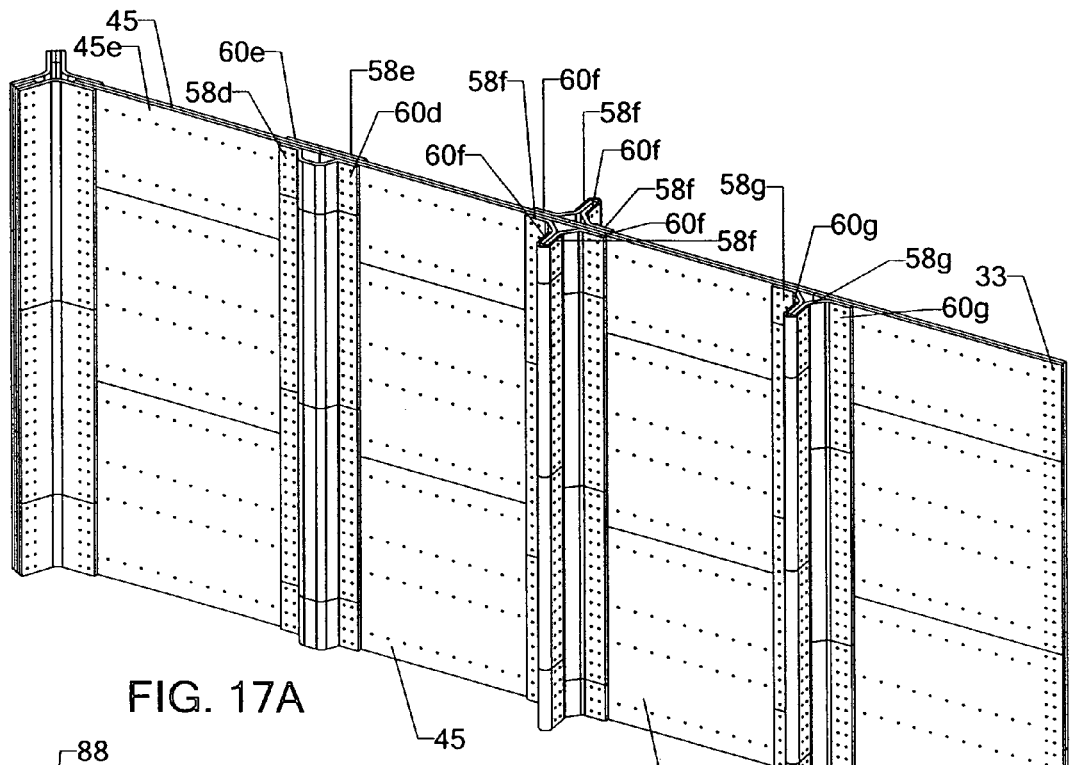
FIGS. 17A and 17B show various views of examples of columns made with column panels whose flat sides are oriented 180 degrees or 90 degrees from each other, forming two-legged columns or four-legged columns that serve as stiffeners or wall-extending columns.
Figure 17B:
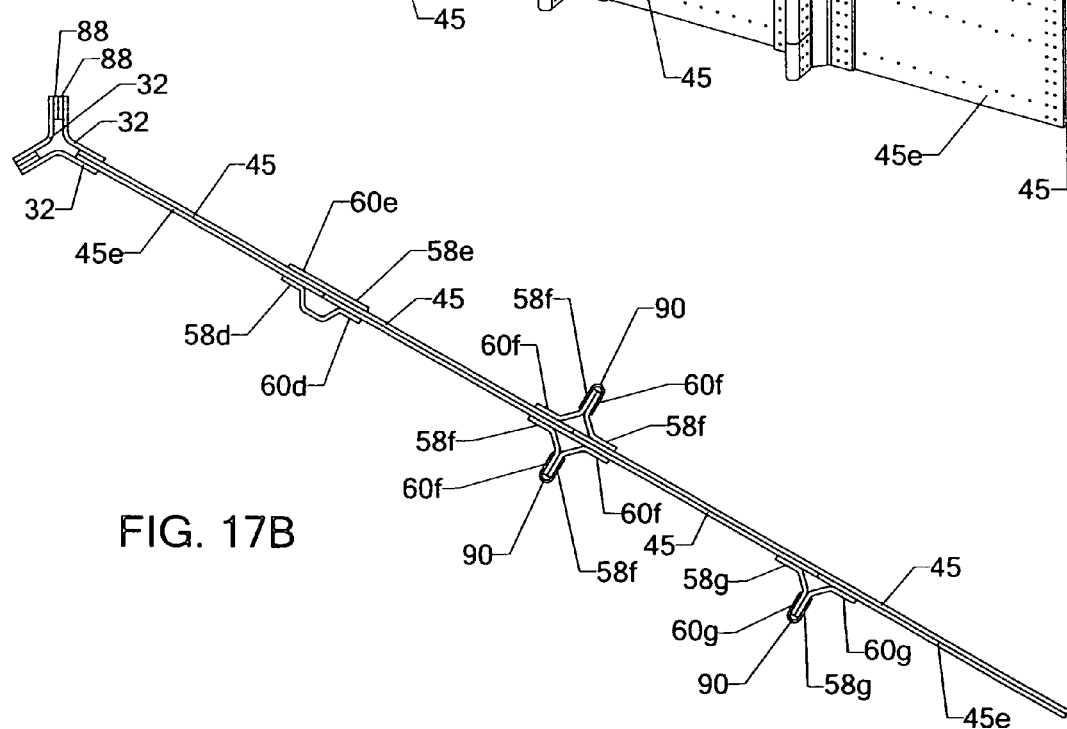
Figure 18:
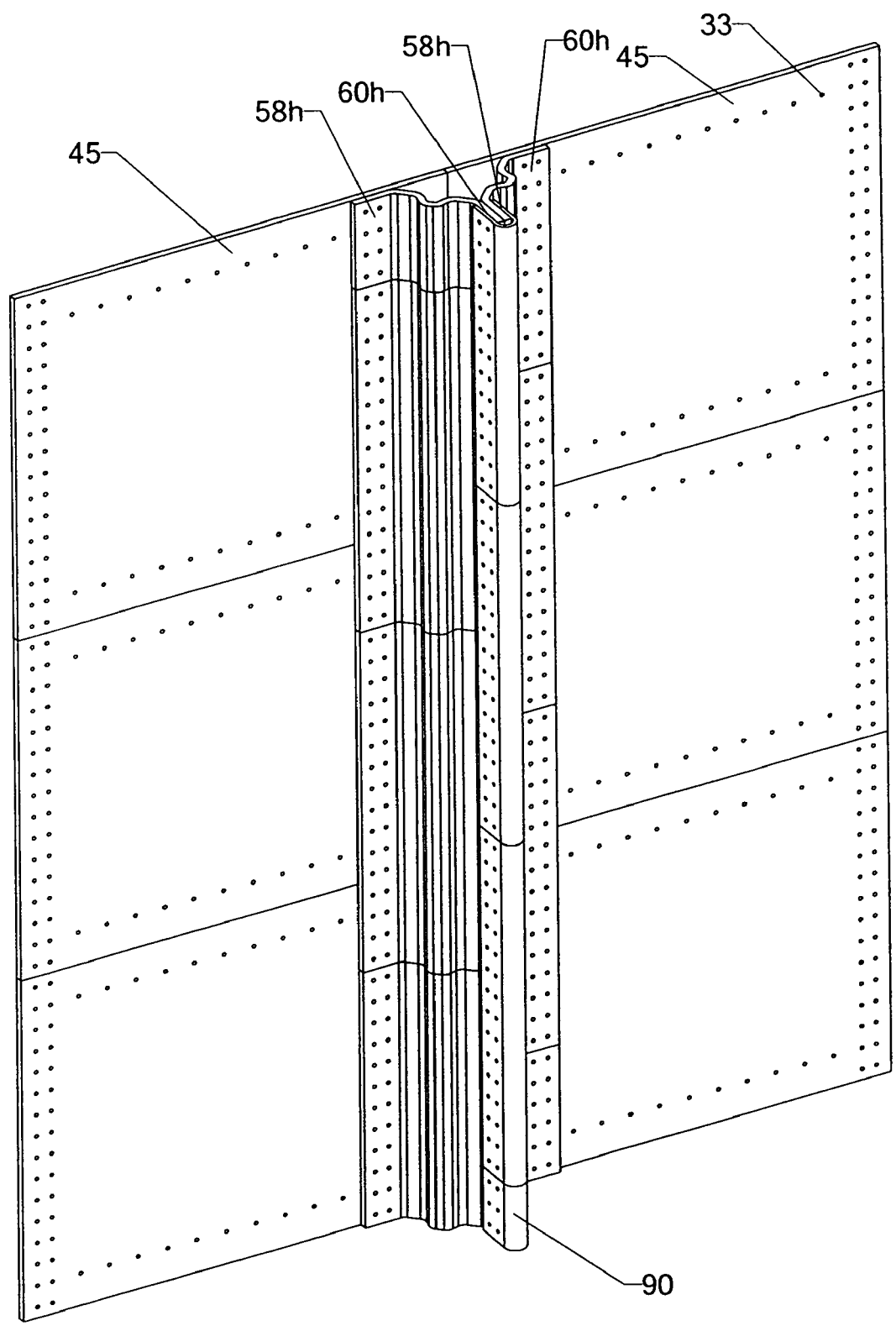
FIG. 18 shows an isometric view of a column with two legs, similar to one shown in FIG. 17A, except with more pronounced corrugations, and the column is extending the horizontal length of a single-layer wall.

Column panels configured such as those shown, in an isometric view in FIG. 17A and in a top view in FIG. 17B, are preferably used in stiffener columns to enhance wall strength, or as wall-extending columns to extend the horizontal length of walls or sides. Such column panels may have any number of configurations. FIGS. 17A and 17B show a multi-ply wall (discussed in detail elsewhere) with three examples of column types that can be used as stiffener columns or wall-extending columns. Such columns typically have flat sides oriented at about 180 degrees from each other, or that in a plurality form flat sides that are oriented at 180 degrees from each other. One example, shown best in the top view of FIG. 17B, of a two-legged column configuration has one leg with first flat side 58d and second flat side 60d oriented at 180 degrees from each other, with a corrugation between. A second leg of this column has flat sides 58e and 60e, also oriented at 180 degrees from each other, but with no corrugation between them. An example of a four-legged column, as seen in FIGS. 17A and 17B, has flat sides 58f and 60f oriented at 90 degrees from each other. This type of column is similar to that shown in FIG. 14, except the flat sides that are perpendicular to the wall have U-clips 90 surrounding the exposed side edges where wall panels are not attached. U-clips are not required, but they enhance strength and add another layer of protection for the underlying column components. Another two-legged column, as shown in FIG. 17B, has flat sides 58g and 60g of column panels oriented at 90 degrees from each other. This type of column is also effective as a stiffener column or wall extending column. FIG. 18 shows yet another example of a two-legged column in which flat sides 58h and 60h are oriented 90 degrees from each other, with a more pronounced corrugation in between. This column adjoins two walls, each having a single layer of wall panels.

FIGS. 17A, 17B, and 18 shows column panels with first flat sides oriented at 180 degrees, or nearly so, from their second flat sides, either as a single column panel or when a plurality are adjoined accordingly. Column panels such as these serve effectively as components of wall-extending columns or stiffeners. The columns, in the example shown, have two or four column legs, rather than the three or more column legs dictated by other polygonal structures. In general, columns have at least two column legs, and they can have as many as six or more column legs.

Figure 19:
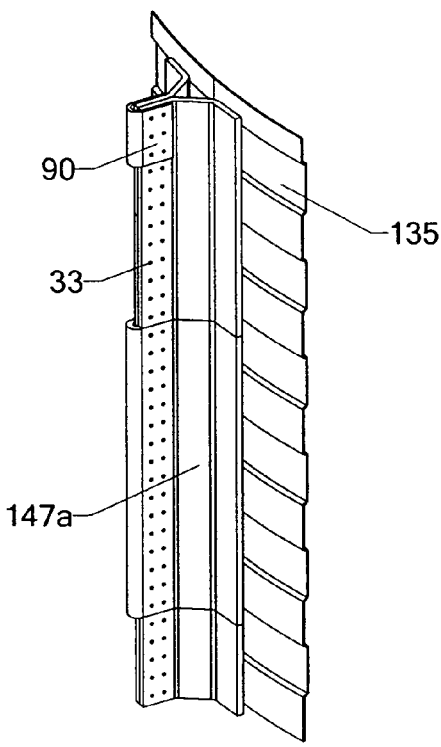
FIG. 19 shows a close-up cut-away isometric view of a column with two legs that form a stiffener column, whose flat sides are oriented about 90 degrees from each other.
Figure 20:
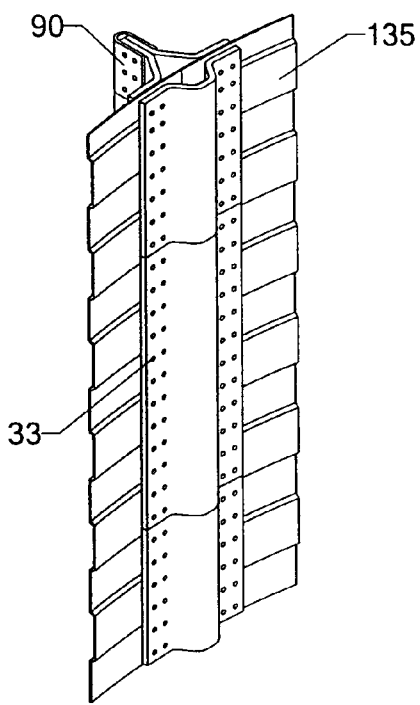
FIG. 20 shows a close-up cut-away isometric view of a stiffener column made with three legs, for a round structure, in which two of the legs have flat sides oriented roughly 90 degrees or slightly more from each other, and the third leg has flat sides oriented approximately 180 degrees from each other or slightly less, to accommodate the curvature of the wall panels.
Figure 21:
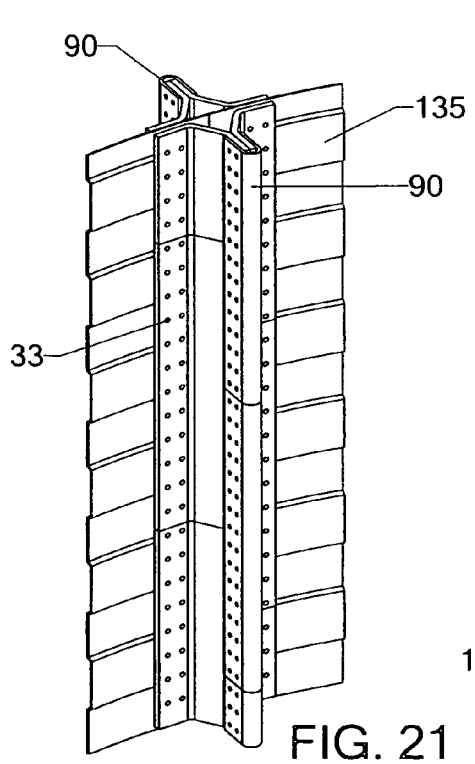
FIG. 21 shows a close-up cut-away isometric view of a stiffener column made with four legs, for a round structure, in which flat sides are oriented about 90 degrees from each other.
Figure 22:
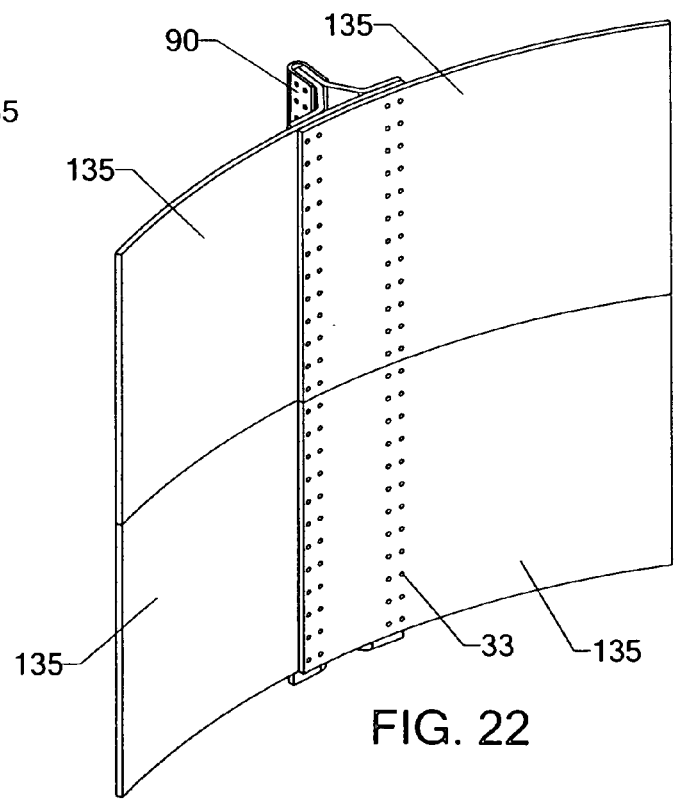
FIG. 22 shows a two-legged stiffener column serving as a lap splice column to connect overlapping curved wall panels.

For structures that have a round or nearly round horizontal cross section, such as round grain bins, column panels serve effectively as stiffener column components. FIGS. 19 through 22 shows examples of columns serving as stiffener columns for a round grain bin. The flat sides can be further bent slightly to an angle that accommodates the contour of the curved wall panels, when necessary. In FIG. 19, an example of a two-legged column, with the exposed side edge covered with U-clip 90, is shown attached to a curved corrugated wall panel 135. Column panel with U-shaped edge 147a, as will be discussed elsewhere, is also shown as part of the column. The two column legs join to each other and to the outside wall surface in this example. FIG. 20 shows an example of a three-legged stiffener column, in which the column of FIG. 19 is enhanced with a third column leg, with flat sides oriented at about 180 degrees from each other and a corrugation in between. FIG. 21 shows a four-legged stiffener column, in which column legs are attached on both wall surfaces to form an even stronger column than that shown in FIG. 19. FIG. 22 shows an example of a stiffener column that also serves as a lap splice to connect two overlapping wall panels. As in other columns, first flat sides of stiffener column legs align with second flat sides of column legs, to allow fastening, as discussed elsewhere.

FIGS. 23A and 23B

Hoppers

The column can easily accommodate hoppers 118, like those shown in FIG. 4 and previously discussed. A close-up cut-away view of two hoppers 118, similar to those seen in FIG. 4, is shown in the isometric view of FIG. 23A and in the cross-sectional view in FIG. 23B. In FIGS. 23A and 23B, hopper panel top edges 120 are at different vertical heights from each other. Hopper support beams 50 and 51 connect directly to column components and support hopper panels 124, which also can connect directly to column components. In this example, hopper panel top edges 120 are at different heights from each other, but the column can just as easily accommodate hoppers having the same or similar vertical heights as each other. An advantage of this column is its ability to easily accommodate hoppers at various vertical heights within a structure.

FIGS. 10B, 12B, 23A, 23B

Beveled Edges of Components

If certain components of the structure, such as column splice panels, wall splice panels, or horizontal beams have ledges on their top edges that are thick enough to create a surface on which a potential contaminant such as a grain kernel or other particle could lodge, then it is preferable to bevel that edge so there will not be a ledge. If beveling is not practical, such as if a material other than metal is used, then the component can be manufactured out of a material such as ultra-high-weight polyurethane to have a sloped edge. If the material is a plastic or composite material, the component can be molded into the proper configuration.

One type of ledge can occur where the top edge of wall splice panel meets with a wall panel or wall spacer plate. Beveling of wall splice panels 106a and 106b and wall spacer plate 107 is shown more clearly in FIG. 10B, previously discussed. Another ledge can occur where horizontal beams connect to column panels. FIG. 12B (previously discussed) shows beveled beam 48 and spacer plate 107 to resolve this problem. As shown in FIGS. 23A and 23B (previously discussed), other ledges can occur where multiple layers of terminating components meet, such as those where hopper support beam flange 126 mates with top edge of hopper panel 120.

FIGS. 5A, 5B6-5B8, 6A, and 26

Method to Anchor Column to Foundation

Tabs 114 with anchor bolt boreholes 115, as shown in FIGS. 5B6-5B8 (previously discussed), can be bent horizontally from the lowest column panels of the column so that anchor bolt boreholes 115 for fastening are vertically oriented, and foundation anchor bolts 113 can pass up through boreholes 115 for fastening the column to a foundation 116, as shown in the column of FIG. 5A (previously discussed). Although one advantage of the staggered column is that a structure can be built without, or with minimal, field or shop welding of parts, welding some components can sometimes be advantageous. For example, a horizontal base plate 112 (FIG. 6A, previously discussed) with vertical anchor bolt boreholes 115 can be welded to the bottom of the column and aligned so that foundation anchor bolts 113 pass through boreholes 115. This approach allows larger base plates to be used, which may be important for heavier loads.

Figure 26:
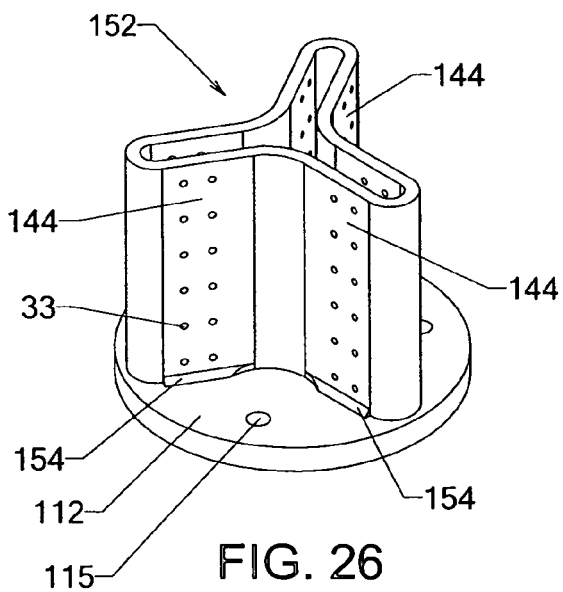
FIG. 26 shows an isometric view of a welded anchor base plate with vertical flanges, or, when inverted, a column cap.

In FIG. 26, a column base 152 for a column is shown. To avoid field welding, vertically-oriented flanges 144, as shown in FIG. 26, can be shop-welded to horizontal base plate 112 that has vertically-oriented anchor bolt boreholes 115. The flanges, which are joined to base plate 112 by welds 154, can be fabricated with horizontally-oriented boreholes 33 for fastening directly to column components in the lower portion of a column. A combination of the methods for anchoring as described above can also be incorporated.

FIGS. 6A and 26

Roof Support, Equipment Support, Laser-Leveling Platforms

A horizontal plate, like base plate 112 in FIG. 6A, can be welded to the tops of columns, to provide a platform on which roof components or equipment can be attached. Or, an embodiment similar to that shown in FIG. 26 (previously discussed) can be inverted, to become a column cap, and attached to the tops of columns to provide such platforms. Such embodiments at the tops of columns can be used to provide a support for roof components or equipment. They can also be used as laser-leveling platforms on top of columns for use during the jack-lifting construction process, since maintaining a level structure is critical throughout jack-lifting construction.

FIGS. 5A, 8A-8D, 10B, 14, and 23B

Fastening Column Panels and Other Components

As shown in the details of the figures previously discussed, preferably boreholes 33 are regularly spaced along column and structure components so that they align when components are brought together. Preferably, components are connected together using nuts and bolts, rivets, or other fastening means. To attach column components to each other, to wall panels, to wall splices, or to horizontal beams, panel boreholes 33 may be drilled or otherwise formed along the flat sides of the column panels, and near edges of wall panels and other components. Fasteners such as rivets or nuts and bolts can be used to assemble the components. The best fastener for the application should be chosen. FIGS. 5A, 8A through 8D, 10B, and 23B show hex-head bolts 34 or round-head bolts 34a passing through boreholes 33 and connecting components. However, rivets 35, as shown in FIG. 14, are generally preferable to nuts and bolts. Although rivets are not normally re-usable, they generally provide less of a ledge to hold up particles of product. Rivets generally allow better cleanout when discharging product from a bin, in that potential sources of cross contamination do not lodge on the smooth, rounded heads of rivets. In some instances, rivets provide greater structural strength and a faster method of fastening the components than nuts and bolts.

Alternatively, other methods of fastening the embodiments of the column include the use of welding, adhesives, other chemical or heat bonding methods. In these cases, boreholes would be unneeded. Adhesives can be used to adhere components that have been molded or machined from composite or plastic materials using the same configuration of component shape (without the boreholes) and construction methods as a bolt-fastened structure. The disadvantage to structures that are welded, glued, heat bonded, or chemically bonded is that they are permanent in nature. Disassembly or future modification would be difficult for such structures. Storage silos and structures of a smaller nature could also be assembled with screws or nails if the stored product is conducive to these alternative fastening devices.

Column components, structure components, and the embodiments already discussed can be welded together using the same configuration of components and method of jack-lifting construction described. When welding is chosen as the method of fastening components of the invention, a material such as galvanized steel is not recommended for use, since welding destroys the galvanized finish. As a result, all welds must be completed and cleaned, prior to the structure being painted. Painting tall silos that are relatively narrow in diameter is dangerous, both from working-height and respiratory standpoints. Another disadvantage of welding is the fumes that occur in enclosed spaces. Therefore, adequate provisions must be made to ventilate a structure during welding for worker respiratory safety. Preferably, attaching means other than welding will be the predominant method of construction.

Alternative Embodiments

FIGS. 4, 15A, and 16A: Staggered Wall Panels

Wall panels 45, 45a, and 45b are shown in FIG. 4, wall panels 45, 45a, 45c, and 45d are shown in FIG. 15A, and wall panels 45, 45a, 45b, and 45c are shown in FIG. 16A (all figures previously discussed), and they, like column components, can have a staggered relationship with respect to each other. For example, in one wall of the structure shown in FIG. 4, wall panels 45a and 45b that are shorter in vertical length than standard wall panel 45 are placed at the top and/or bottom locations of walls, to establish the staggered relationship. Adjacent walls, as shown in FIG. 4, comprise only standard wall panels 45 throughout its length, such that horizontal seams 70 where top and bottom edges of wall panels meet in one wall are in different horizontal planes as seams 70 in adjacent walls. Common horizontal seams 70 between adjacent walls will thus be avoided, to further contribute to the strength of the structure as a whole. Other wall staggering systems can be applied as well, such as those seen in FIGS. 15A and 16A, in which the top stratum of two different structures are shown. Wall panels 45, 45a, 45b, 45c, and/or 45d are attached to the top horizontal strata of the structures to establish a staggered relationship. Wall panels 45 are then typically added in additional intermediate horizontal strata to maintain the staggered relationship.

FIGS. 11A Through 11C

Corrugated Wall Panels

FIG. 11A shows a portion of a wall, previously discussed, in which corrugated wall panel 134 is sandwiched between column panels. FIG. 11B shows a close-up view of the wall in FIG. 11A, and FIG. 11C shows a top view of the wall portion of FIG. 11A. Wall panels that are corrugated horizontally, as shown, or vertically (not shown) can be used with this column, without dramatic modification. Spacer blocks (not shown) may need to be installed in corrugations where wall panels and column panels meet, to prevent over-tightening. One skilled in the art may devise other methods of preventing over-tightening in this situation. Corrugated wall panels are more cost effective than smooth wall panels, since thinner steel can be used to achieve the same desired structural strength as thicker flat wall panels. However, slanted corrugations provide ledges on which fine particulates (dust) can rest, thus increasing explosion and cross-contamination risks. An advantage of this column is that it can accommodate flat or corrugated wall panels, even within the same structure.

FIGS. 17B, and 24A Through 24D

Dual Walls and Multi-Ply Walls

The columns as described can easily accommodate shared walls, dual walls, multi-ply walls, or any combination of these throughout a structure. Although using dual walls or multi-ply walls may lose the cost advantages of single, shared walls, there are circumstances where such walls are preferred. For example, either multi-ply or dual-wall configurations are desirable if a bin stores an ingredient that corrodes the wall panel. Multi-ply walls, such as the two-ply walls shown more clearly in FIGS. 17B and 24C, are particularly desirable where increased wall strength is needed. Dual-wall configurations, such as that best shown in the close-up in FIG. 24B, are especially advantageous where a gap between walls is desired, such as in a building for human occupancy, in which the space created between two walls can accommodate wires, plumbing, insulation, conduit, and the like.

FIG. 24A shows examples of a single, dual-, and two-ply wall layout, all on the same column. An advantage of the column is that it can accommodate more than one type of wall simultaneously. FIG. 24B is the vertical cross-sectional view of a dual-wall example from FIG. 24A. FIG. 24C is a vertical cross-sectional view of a two-ply wall example from FIG. 24A. In the example of the dual-wall configuration in FIG. 24B, wall panel 45m is attached to the outward-facing surface 64 of second flat side 60 of one column leg, and another wall panel 45n is attached to the outward-facing surface of first flat side of the adjacent column leg, thus creating a gap between the two walls. If column panels are 2.5 cm thick, the gap can be as narrow as 5 cm if no spacer plate is sandwiched between flat sides of column panels. The gap can be much wider than 5 cm if a spacer plate, one or more layers of column splice panels, or both, are attached to the column before wall panels are attached. A dual wall such as this can be incorporated into any compartment within a multi-compartmented structure, without affecting the neighboring compartment arrangements, even after the structure has been built.

Multi-ply walls are those that comprise more than one layer of wall. Unlike dual wall configurations, however, multi-ply walls have virtually no gap between wall panels. FIG. 24C shows an example of a two-ply wall, where two sub-walls comprising thin wall panels 142, are laid together. The resulting two-ply wall in the example has the same or nearly the same thickness as wall panel 45 and the single-wall example of FIG. 24A, which is shown in better detail in FIG. 24D. To further enhance wall and structure strength, thin wall panels 142 in the two-ply example are staggered in their relationship to one another so the tops of the wall panels within one sub-wall butt up to the middle of their partner wall panels in the other sub-wall. Multi-ply walls are usually sandwiched between inward-facing surfaces of the flat sides of column legs, rather than attaching on the outward surfaces of column panels. However, the versatility of the column allows multi-ply walls to be attached to outward-facing surfaces as well. Alternatively, the wall panels of sub-walls can be of virtually any thickness, as dictated by the structural requirements and the limits of manufacturing. A multi-ply wall can have greater structural strength than a single-wall configuration, depending on wall panel thickness. Further strength is achieved by staggering wall panels within the multi-ply wall, such that horizontal seams in sub-walls are in different horizontal planes from any other sub-wall seams within the wall. Even further strength is achieved if vertically-oriented seams, where side edges of wall panels meet, are in different vertical planes from one another throughout the multi-ply wall.

A wide variety of multi-ply and dual-wall configurations can be achieved with this versatile column. One great advantage of this column is that it can accommodate a wide variety of wall configurations on the same column and throughout the structure, without notably modifying the column panel or other components.

FIG. 25

Retro-Fitting Existing Structures; Adding Siding

Figure 25:
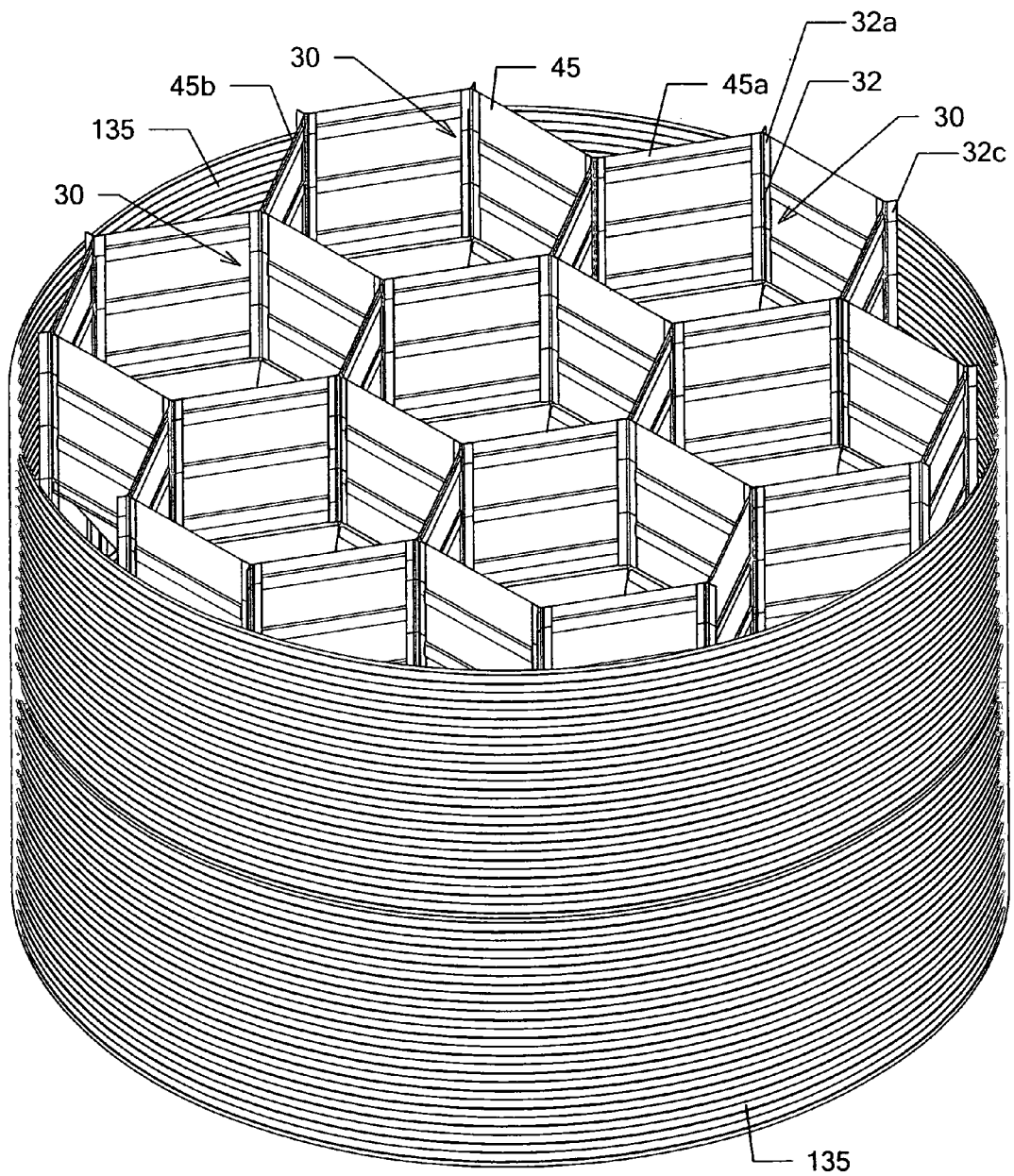
FIG. 25 shows an isometric view of how the column may be used to retro-fit a multi-compartmented structure within an existing round grain bin, with the top cut away to aid viewing.

One practical application for this column is the installation (retrofitting) of polygonal segregated storage bins, made with this column, inside an existing round grain bin or other under-roof structure. The United States has over 8 billion bushels of commercial grain storage, mainly comprising large storage bins. The industry now dictates smaller segregated lots of storage, as stated. A benefit of this column is the ability to install multi-compartmented storage in an existing grain storage structure so the overhead distribution conveyors, catwalks, support towers, etc can continue to be used to deliver or recover grain and retain the intrinsic value of the facility. In some of these "silo retrofit" embodiments, several wall panels of the existing grain bin may be removed for internal construction access. The existing concrete foundation of the grain bin, less perimeter stem wall and footing, may be removed for a new stem wall, footing, and floor foundation to be cast in place, if necessary. Another method of constructing the foundation is to utilize auger cast-in-place pilings, in which a large drill auger is used to drill a hole to a suitable depth, a cage of rebar is placed in the hole, and concrete is poured into the hole. This last method eliminates the need to remove the existing concrete floor. A concrete friction piling can be auger-cast in place for each support structure column. An example of a structure using this column that has been retrofit within an existing circular grain bin with curved corrugated wall panels 135 is shown in FIG. 25. Columns 30 comprising column panels 32, 32a, and 32c connect wall panels 45, 45a, and 45b. The top of the round grain bin wall has been cut away to aid viewing. Many arrangements are possible, but for illustration purposes, the example shows a structure comprised of an array of hexagonal bins.

Retro-fitting existing structures may be advantageous in certain circumstances. For example, retrofitting allows owners to convert bulk storage to segregated storage, while keeping most of the existing infrastructure (such as conveying systems) and providing an ideal protective environment. Other processors may desire an assembly of segregated storage built with these columns to be built within a warehouse or other type of building. Due to the ability of the columns and their associated structure to be jack-lifted, retro-fitting a wide variety of buildings or structures is entirely feasible and particularly advantageous, especially when a protected environment is desired.

A siding (not shown) can also be attached to a structure, specifically to the exposed side edges of the structure's perimeter columns and to wall panels, wall splices, column splice panels or other members that are located along the outside perimeter. Siding can make a structure resemble a round grain bin, like that shown in FIG. 25, or it can follow the footprint of a polygonal structure. Adding siding enhances the appearance and adds a protective layer.

Figure 27B:
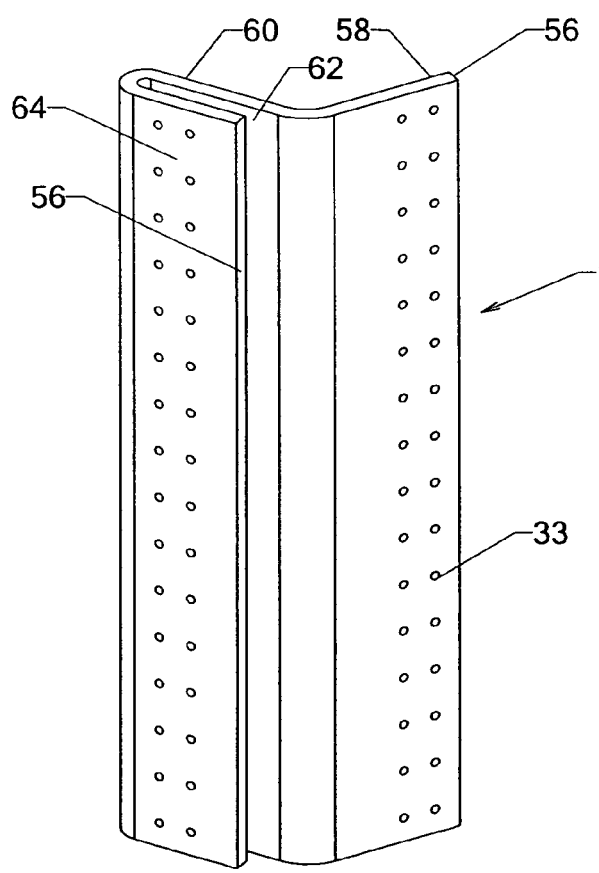
FIGS. 27A and 27B show isometric views of a column that includes column panels with U-shaped edges.
Figure 27A:
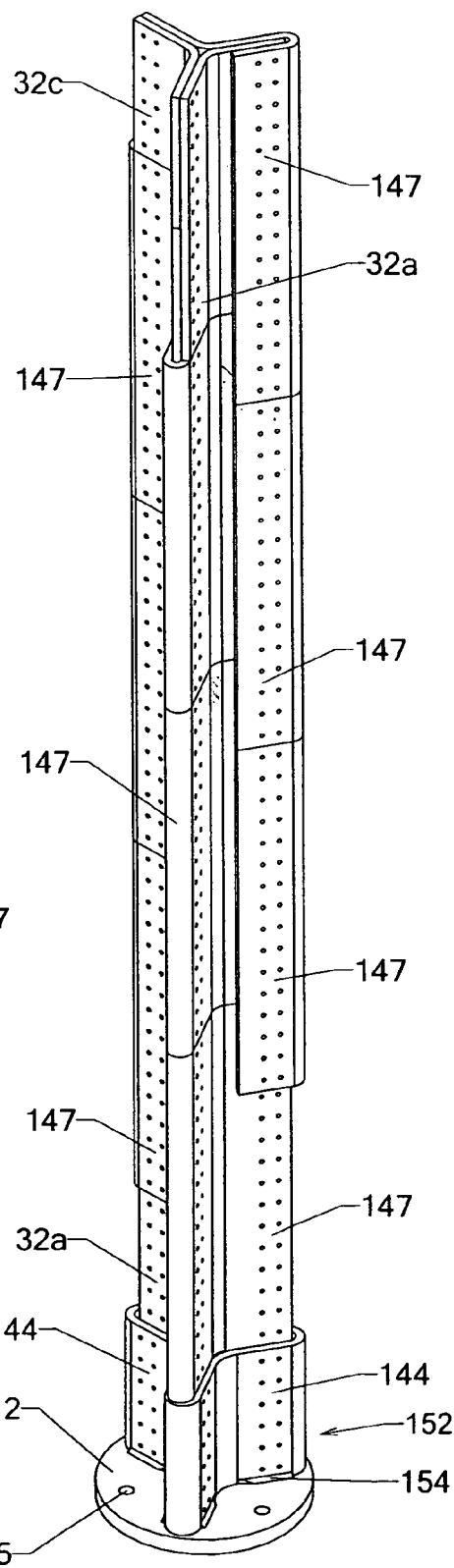

FIGS. 27A and 27B

Column Panels with U-Shaped Edges

FIG. 27A shows a column that includes column panels with U-shaped edge 147 and column base 152. FIG. 27B shows column panel with U-shaped edge 147 alone. In FIG. 27A, the column also comprises column panels 32, 32b, and 32d through 32g as described previously from FIGS. 5B1-5B5. When manufacturing column panels or column splice panels, at least one of their two side edges 56 can be extended and curved back towards the center of the column to form column panel with U-shaped edge 147. Column panel with U-shaped edge 147 thus serves the same purpose as previously discussed U-shaped clip 90 seen in FIGS. 9A, 10A, and 11A. Column panels with U-shaped edge 147, like that seen in the column of FIG. 27A and individually in FIG. 27B, can be used whenever wall panels, beams, or other structural components do not need to be sandwiched between column components, or wherever U-shaped clip 90 would otherwise be used. Column splice panels can also be modified in a similar manner. The advantages of this modification are the resulting enhanced strength, and the fact that separate, U-shaped clips can be omitted from the construction process.

FIG. 28

Encasing Column in Concrete

An outer, substantially circular column wall 146 can be attached all the way around a column (not shown). This feature preferably is applied to the columns that are serving as legs of the structure, to enhance column strength, to protect the exposed side edges, and to add an aesthetically-appealing element to the structure.

As shown in FIG. 28, a pillar or a pile can be made with this column by encircling a column 30 with a concrete form, such as concrete form 146. The void formed between the circular encasement and the column itself is then filled with concrete 68, or some other castable material, to enhance the strength of the column. The concrete form can be flush to the top of the column (not shown), or a portion of the top of the column can extend beyond the concrete, as shown in FIG. 28. Such a column can be used to support bridges or piers, or as part of structures such as parking garages.

FIG. 29

Nesting Dimples or Boreholes

As shown in FIG. 29, further column strength can be achieved by manufacturing generally horizontally-oriented nesting dimples 158, and/or nesting boreholes 160 into column components. Such embodiments not only enhance column strength, but they also ease construction by preventing slippage of components during construction. High-friction surfaces and/or magnets (not shown) can also be used to ease construction by preventing component slippage during assembly, and to enhance column strength.

FIGS. 30A-30C

Column Panels with Extending Sides; Diagonal Beams

Figure 30A:
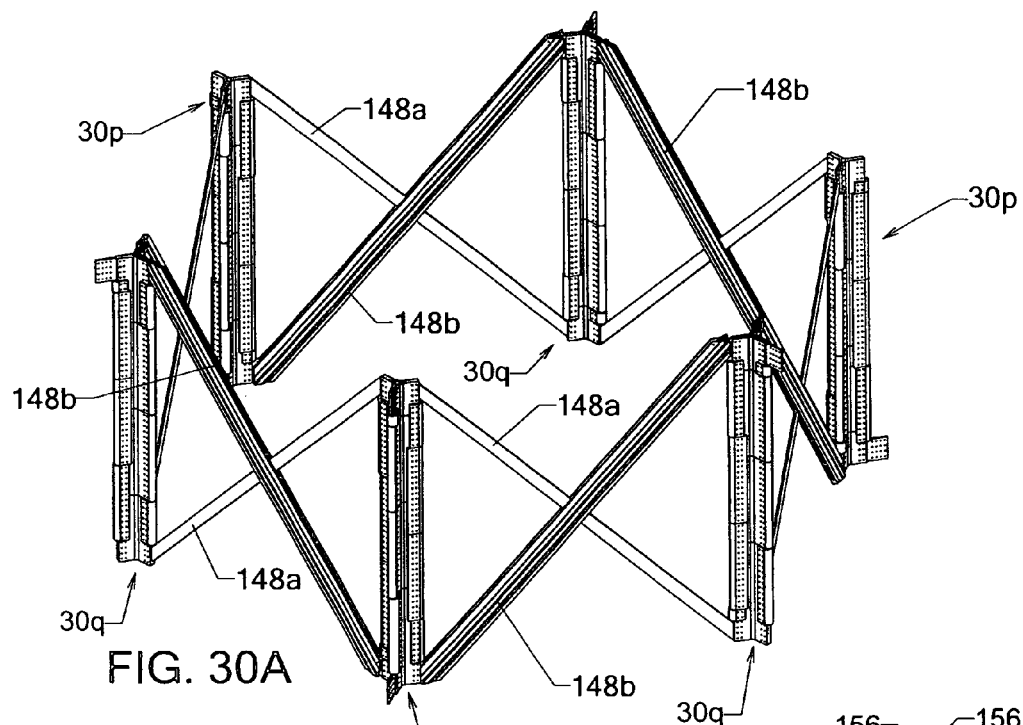
Figure 30B:
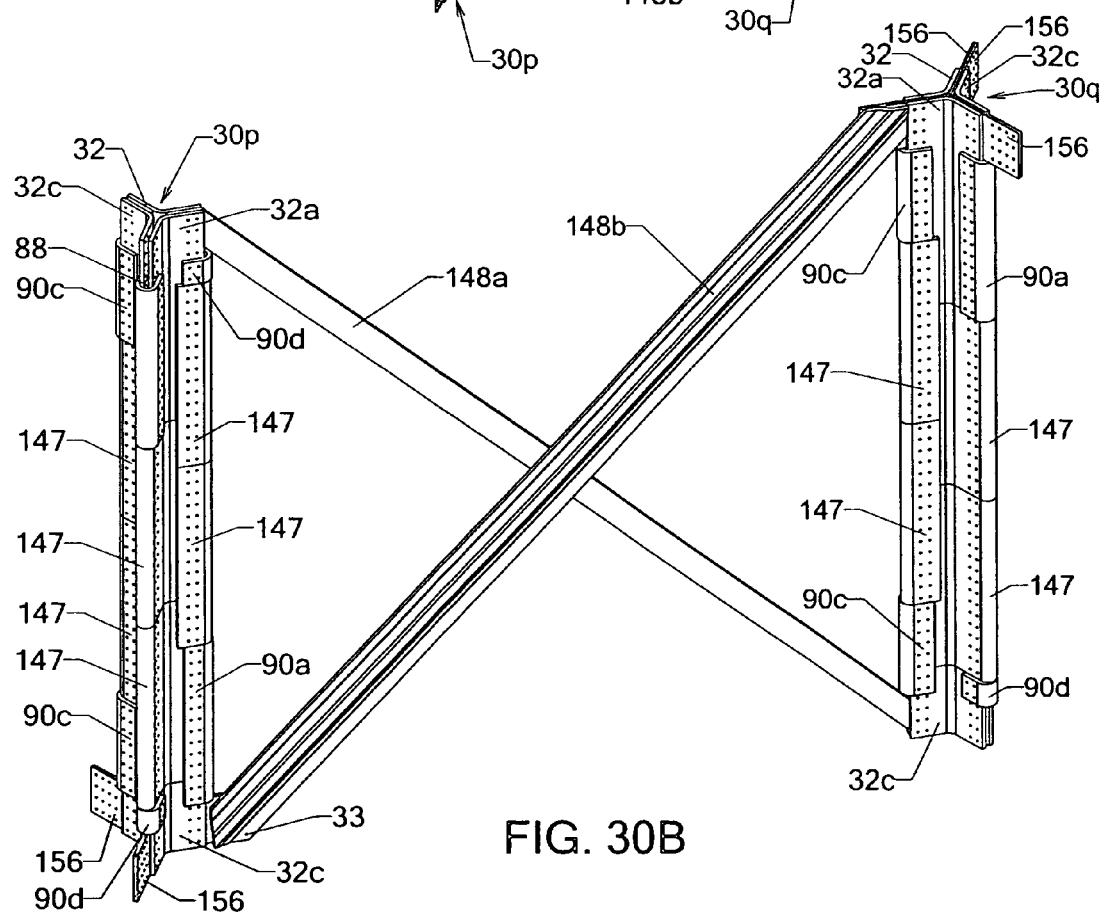

FIG. 30A shows an isometric view of a partial structure in which diagonal beams are attached to columns. As seen more clearly in FIG. 30B, which shows an enlarged portion of the structure in FIG. 30A, ends of diagonal beam 148a are sandwiched between column panels 32, 32a, and 32c of column 30p and column 30q. Ends of diagonal beam 148b attach to thin column panels 156 that resemble column panel 32 in configuration, but function more as a type of modified spacer plate. As seen more clearly in FIG. 30C, thin column panels 156 have side edges that extend beyond side edges of overlying column panels 32, 32a, and 32c. These extended side edges provide locations for beam or wall attachment.

FIGS. 30A, 6A, 8A Through 8D, 10A, 11A, 12A, and 13A

An Earthquake Resilient Structure

The column components can be used to form a structure suitable for areas prone to earthquakes (high seismic zones). The strength of the structure can be enhanced by wall panels or wall splice panels of various configurations. Further structural strength can be achieved by additional horizontal beams or by utilizing diagonal beams 148a and 148b, as shown in FIG. 30A, or by incorporating additional layers of column splice panels of various configurations, or any combination of the above.

Even further strength is obtained when small gaps, or separations, between vertically aligning column components (where seams 70 normally occur) are incorporated into the column. Separations between vertically-aligning column components allow for expansion and contraction, and provide more tolerance to twisting, horizontal, and vertical forces, such as may be experienced in earthquakes, more efficiently than columns having tightly abutting column components. The size of these separations can be determined by those skilled in the art, and they can vary along the column, but generally the separation will rarely be greater than the thickness of the column component.

Multiple layers of column panels, column splice panels, column spacer plates, other structural and column components, or any combination of the above, with flat sides 58 and 60 either attached directly to underlying components, as in FIG. 6A (discussed previously), or with additional components such as wall panels 45 or spacer plates 88 sandwiched between them, as in FIGS. 6A, 8A through 8D, 10A, 11A, 12A, and 13A (all discussed previously), can create a structure that will accommodate bending and twisting momentum while supporting heavy loads. Only one additional layer of column splice panels is shown in FIG. 6A, but any number of additional column splice panels or other column components, such as spacer plates, can be stratified outwardly, within practicality, and attached to outward-facing surfaces of underlying column components.

Consideration of Molded Components and Other Materials from Which Components can be Manufactured The column and structure components are very well suited to being manufactured from coil steel and fabricated with a continuous roll-forming machine. This material and fabrication method is relatively economical compared to other materials of manufacture. However, the components can be manufactured from other materials, as the need dictates. For example, column panels, wall panels, horizontal beams, hopper beams, other support beams, hopper panels, splice panels, and spacer plates can be manufactured using plastics, composites, or other material that can be molded or cast. Molding or casting of the column panels will allow structural corrugations, ridges, and gussets to be fabricated that might not otherwise be achieved with roll forming of steel. Beveled/tapered edges and other shapes that might be conducive to different applications can be incorporated into the component's design with the flexibility of molding and casting of components.

Examples of other materials that can be used to manufacture column and the associated structure components include the following: (1) stainless steel, which may be preferred in the food industry, (2) wood, which may be practical for fertilizer storage facilities, or (3) fiber-glass or chemical composites, which can be used in food or chemical industries. The material used to fabricate the components is dictated by the structural and functional requirements of the structure to be built. These requirements are then generally weighed against the economic constraints of the project. The inherent versatility of the column, as described, allows it to accommodate column components manufactured from a wide variety of materials, and to build a wide variety of structures, for a wide variety uses.

Storing Liquids and Other Challenging Ingredients

In addition to storing bulk free-flowing and semi-free-flowing ingredients, a polygonal storage bin or bins that are constructed with this column can store liquids. This column provides a method of building a sealed silo that can contain caustic, alkaloid, acid tic, human food-grade liquids, and the like, without leakage. However, the components and fastening methods must be of the proper compositions and properties to withstand the product being stored. Such silos can be made liquid-tight by using a variety of methods, such as coating compartment interiors to seal them to hold liquid, installing gaskets between components, or installing bladder(s) within bin(s) (not shown). Coating the interior walls or installing bladder(s) during construction that uses a jacking process, rather than adding these embodiments after the bins are fully erected, provides further cost savings.

Crane Construction

Rather than jack-lifting a structure, crane construction can be used to build a structure using the column, either by lifting an assembled structure or part of a structure into place, or by building the structure starting with the bottom horizontal stratum and ending with the top one. In this last scenario, an advantage that crane construction has over jack-lifting is that the column panels can be manufactured to have much longer vertical lengths, such as about 18 m, and more substantial thickness, such as about 10 cm. The longer and thicker the column panel is, the greater is its structural contribution. With the use of cranes, super structures, such as skyscrapers, multi-level human occupancy buildings, and parking garages, can be built with this structural column. The components are simply larger than those manufactured for assembling using most jack-lifting methods.

CONCLUSION, RAMIFICATIONS, AND SCOPE

One may understand from this disclosure that the columns can be used to construct a multi-compartmented structure with shared walls of various customizable configurations in a manner that uses material and space efficiently and that allows jack-lifting as the method of construction. Cost in materials and in construction are therefore reduced, compared to the conventional method of building such structures. The load-bearing column can be adapted for many types of structures for many types of uses, from grain storage to human occupancy to pillars that can be used to support bridges. The staggered feature allows flexibility in the method of construction, specifically jack-lifting, but also including the consideration of welded or molded components, as well as construction using cranes. The column design accommodates gradations within the column, such as thicker, wider components at or near the bottom of the column and thinner, narrower components at or near the top of the column. The staggering system can also be applied to other column components, such as column spacer plates, column splice panels, and wall panels, to further prevent weak points in the columns. The column components can be adapted to have different angle orientations to accommodate buildings with different shapes. Column components can be layered outwardly to further enhance column strength. The column and its components can be used to connect standard wall panels and standard horizontal beams, such as I-beams and C-beams, or customized wall panels and beams, or a combination of beam types. And the column components can be easily manufactured from coil steel and fabricated with a continuous roll-forming machine, providing even further cost savings in manufacture. The column is versatile, adaptable, and an integral part of a structure.

Although the description above contains many specificities, these should not be construed as limiting the scope of the invention but as merely providing illustrations of some of the presently-preferred embodiments of this invention. Other variations are possible, such as manufacturing components using wood, plastics, resins, composites, or other moldable or castable material; manufacturing components with additional embodiments to prevent slippage during construction and to enhance structural strength, such as adding nesting dimples or indentations, nesting boreholes, high-friction surfaces, and/or magnets, etc.; column panels and splice panels with flat sides oriented at angles greater than 180 degrees; components fastened with bonding materials, such as epoxies, chemical adhesives, glue, and/or nails; column components manufactured on a larger scale, such as having about 12-meter or greater vertical lengths, to accommodate crane construction of sky-scrapers or other super structures; etc. Thus, the scope of the invention should be determined by the appended claims and their legal equivalents, rather than by the examples given.

I claim:

1. A method of assembling a structural column, comprising:
   (1) a plurality of column panels, each said column panel comprising a top edge, a bottom edge, a first flat side, a second flat side, an inward-facing surface and an outward-facing surface,
   (2) assembling said plurality of column panels to form a first horizontal array about a central vertically oriented axis, with said first flat side of at least one of said column panels being oriented at an angle less than 180 degrees from said second flat side of same said column panel, said inward-facing surface of said first flat side of one said column panel attaching to said inward-facing surface of said second flat side of an adjacent said column panel, and at least two said bottom edges of said column panels within said first horizontal array are of substantially different vertical lengths from one another such that said bottom edges of at least two said column panels within said first horizontal array are offset in different horizontal planes from each other,
   (3) attaching at least one lifting device to foundation of structural column and to said first horizontal array for the purpose of raising said first horizontal array upwards a vertical distance,
   (4) operating said lifting device to raise said first horizontal array to a sufficient vertical distance upwards to allow assembling of a second horizontal array below said first horizontal array,
   (5) assembling a plurality of said column panels to form said second horizontal array below said first horizontal array, such that said second horizontal array is arrayed about the same central vertically oriented axis as said first horizontal array and is comprised of additional said column panels, wherein top edges of said column panels of said second horizontal array abut or are in close proximity to lower edges of said column panels of first horizontal array, with at least one of said column panels of said second horizontal array having said first flat side oriented at an obtuse angle from said second flat side, said first and said second flat sides of at least one said column panel in said first horizontal array being attached to part of said second and said first flat sides, respectively, of said column panels in said second horizontal array, and
   (6) removing said lifting device from said first horizontal array,
   whereby said structural column is assembled with at least one column panel in said first horizontal array being such that its bottom edge is in a substantially different horizontal plane than at least one other said column panel within said first horizontal array, and said lifting device raising said first horizontal array a sufficient vertical distance to allow assembly of said second horizontal array to said first horizontal array, thereby a structural column is assembled with at least one offset between said column panels in said first and said second horizontal arrays, using a lifting device.

2. A method of assembling a structural column, comprising:
   (1) a plurality of column panels, each said column panel comprising a top edge, a bottom edge, a first flat side, a second flat side, an inward-facing surface and an outward-facing surface,
   (2) assembling said plurality of column panels to form a top horizontal array about a central vertically oriented axis, with said first flat side of at least one of said column panels being oriented at an angle less than 180 degrees from said second flat side of same said column panel, said inward-facing surface of said first flat side of one said column panel attaching to said inward-facing surface of said second flat side of an adjacent said column panel, and at least two said bottom edges of said column panels within said top horizontal array are of substantially different vertical lengths from one another such that bottom edges of at least two said column panels within said top horizontal array are offset in different horizontal planes from each other, (3) attaching at least one lifting device to foundation of structural column and to said top horizontal array for the purpose of raising said top horizontal array upwards a vertical distance, (4) operating said lifting device to raise said top horizontal array to a sufficient vertical distance upwards to allow assembling of an intermediate horizontal array below said top horizontal array, (5) assembling a plurality of said column panels to form said intermediate horizontal array below said top horizontal array, such that said intermediate horizontal array is arrayed about the same central vertically oriented axis as said top horizontal array and is comprised of additional said column panels, wherein top edges of said column panels of said intermediate horizontal array abut or are in close proximity to bottom edges of said column panels of top horizontal array, with at least one of said column panels of said intermediate horizontal array having said first flat side oriented at an angle less than 180 degrees from said second flat side, said first and said second flat sides of at least one said column panel in said top horizontal array being attached to part of said second and said first flat sides, respectively, of said column panels in said intermediate horizontal array, (6) removing lifting device from said top horizontal array and attaching to said column panels in said intermediate array, (7) decide if additional said intermediate arrays are to be added to said structural column, if no additional intermediate arrays are to be assembled then proceed to step 11, if additional said intermediate arrays are to be assembled proceed to and repeat steps 8, 9, and 10 until a sufficient number said intermediate arrays are assembled then proceed to step 11, (8) operating said lifting device to raise said intermediate array to a sufficient vertical distance upwards to allow assembling of a lower intermediate horizontal array below said intermediate array whereas said intermediate array always being the last array assembled and said lower intermediate array being the array being assembled, (9) assembling a plurality of said column panels to form said lower intermediate horizontal array below said intermediate array, wherein top edges of said column panels of said lower intermediate horizontal array abut or are in close proximity to bottom edges of said column panels of said intermediate array, with at least one of said column panels of said lower intermediate horizontal array having said first flat side oriented at an angle less than 180 degrees from said second flat side, said first and said second flat sides of at least one said column panel in said intermediate array being attached to part of said second and said first flat sides, respectively, of said column panels in said lower intermediate horizontal array,

(10) removing lifting device from said intermediate array and attaching to said column panels in said lower intermediate array,

(11) operating said lifting device to raise said lower intermediate array to a sufficient vertical distance upwards to allow assembling of said bottom horizontal array below said lower intermediate array,

(12) assembling a plurality of said column panels to form said bottom horizontal array below said intermediate array, wherein top edges of said column panels of said bottom horizontal array abut or are in close proximity to bottom edges of said column panels of said bottom array, with at least one of said column panels of said bottom array having said first flat side oriented at an obtuse angle from said second flat side, said first and said second flat sides of at least one said column panel in said intermediate array being attached to part of said second and said first flat sides, respectively, of said column panels in said bottom horizontal array, and

(13) removing lifting device from said bottom array, whereby each of said top horizontal array, one or more said intermediate horizontal arrays, and said bottom horizontal array can be individually assembled with said column panels, then lifted with said lifting device so the next adjoining horizontal array can be assembled, and the steps repeated until said structural column is assembled to a desired vertical height, thereby a structural column is assembled with at least one offset between said column panels in said top and said intermediate horizontal arrays, with at least one offset between said column panels in each of said intermediate arrays, and with at least one offset between said column panels in said intermediate array and said bottom array, using a lifting device.

3. The method of claim 2 wherein said first flat side oriented at an angle of less than 180 degrees from said second flat side is instead oriented at about a 120 degree angle from said second flat side.

Whereby said first, intermediate, and bottom horizontal arrays are comprised of said column panels whose first flat side is 120 degrees apart from said second flat side.

4. The method of claim 2 wherein said plurality of column panels in said first, intermediate, and bottom horizontal arrays is instead comprised of three said column panels in each of said first, intermediate, and bottom horizontal arrays.

Whereby said top, intermediate, and bottom horizontal arrays are individually comprised of three said column panels.

5. The method of claim 2, further including assembling a plurality of column components on to said structural column, said column components including at least one column splice panel in addition to said column panels, said column splice panel having a top edge, a bottom edge, a first flat side, and a second flat side, said first and second flat sides oriented from each other by an angle similar to said angle of said column panels, said first and said second flat sides of said column splice panel being attached to said outward facing surfaces of said first and said second flat sides of at least two underlying vertically-aligning column components, respectively, said column splice panel overlapping said seam where top and bottom edges of said underlying vertically-aligning column components meet, Whereby assembling said column splice panel serves as a splice to cover said seam of underlying column components, and forms an outer layer to at least one underlying adjacent layer of column components, thereby strengthening said column.

6. The method of claim 2, further including assembling a column spacer plate comprising at least one outer-side edge that is sandwiched between said first flat side of one said column panel and second flat side of a second said column panel to enhance the strength of said column, Whereby at least one said column spacer plate is assembled between at least two of said column panels to enhance strength.

7. The method of claim 2, further including assembling at least one elongated U-shaped clip that surrounds and attaches to exposed side edges where column panels adjoin,
   Whereby a column component resembling an elongated U-shaped is attached to said structural column during assembly.

8. The method of claim 2 wherein said column panels have a gradation in thickness, such that thicker said column panels are generally in lower horizontal arrays and thinner components are generally in upper horizontal arrays,
   Whereby said structural column is assembled with said column panels that have a variation of thickness.

9. The method of claim 2 wherein said column panels have gradations in width of said first flat sides and/or said second flat side such that said column panels with wider flat sides are generally in lower horizontal arrays and said column panels with narrower flat sides are generally in upper horizontal arrays,
   Whereby said structural column is assembled with said column panels that have a variation of widths.

10. The method of claim 2, further including assembling a plurality of said structural columns to form a structure, said structure having a geometric shape in horizontal cross section, said structure is assembled from at least one wall panel and/or horizontal cross member that attaches directly to said column panels of a first said structural column and of a second said structural column, thus forming a wall between said first and said second structural columns,
    Whereby said structure with a horizontal cross section shape can be assembled by attaching at least one wall panel and/or horizontal cross member directly to said structural column panels of at least two said structural columns.

11. The method of claim 10 wherein said wall panels are substantially rectangular in shape, and comprise a top edge, a bottom edge, and two side edges, and said wall panels aligning with one another vertically to form a wall, or partition, said wall beginning and ending at predetermined vertical heights along said structural column,
    Whereby a structure with a horizontal cross section shape with a wall can be assembled by vertically aligning wall panels that are attached to said structural panels of at least two of said structural columns.

12. The method of claim 11 wherein said wall panels have at least two substantially different vertical lengths, and assembled so as to create a stagger of substantially horizontally-oriented seams between wall panels, such that no seam, where top and bottom edges of wall panels meet, is in the same horizontal plane as seams from an adjacent wall,
    Whereby a structure with a horizontal cross section shape can be assembled so said seem created by adjacent said top and said bottom edges of wall panels is not in same horizontal plane as seams from an adjacent wall.

13. The method of claim 11 wherein said wall panels have at least two substantially different horizontal lengths, and assembled so as to create a stagger of substantially vertically-oriented seams where side edges of wall panels meet, such that no said vertically-oriented seam is in the same vertical plane as a seam from an adjacent wall panel,
    Whereby a structure with a horizontal cross section shape can be assembled so said vertically-oriented seam created by adjacent said side edges of wall panels is not in same vertical plane as a seam from an adjacent wall panel.

14. The method of claim 10, further including assembling a hopper comprising hopper support beams that support a hopper panel, said hopper panel being sloped downward at a predetermined angle generally ranging from about 30 to about 60 degrees from a vertical plane, said hopper support beam and said hopper panel arrayed about a central axis typically close to center of said structure to form a hopper, said hopper comprising a top edge and a lower aperture, said top edge being attached to said hopper support beams,
    Whereby a structure with a hopper can be constructed by assembling an array of said hopper support beams and said hopper panels and attaching them directly to said column panels of at least two said structural columns.

15. The method of claim 14, further including assembling a plurality of hoppers,
    Whereby a structure with multiple hoppers can be constructed by assembling an array of said hopper support beams and said hopper panels and attaching them directly to said column panels of at least two said structural columns.

16. The method of claim 10, further including diagonally-oriented beams, said diagonal beams attaching to at least two of said structural columns,
    Whereby a structure can be assembled by attaching at least two diagonal beams to at least two said structural columns.

17. The method of claim 10 wherein said wall panels have an arced horizontal cross shape to form a round structure, at least two said structural columns being assembled in an array along the arc of said wall panels and attached to said wall panels thereby serving as both stiffeners and structural support columns,
    Whereby a round structure can be assembled by attaching said at least two structural columns to said wall panels having an arced horizontal cross structure.

18. The method of claim 10 wherein assembling at least one of said horizontal cross members attaches to at least two said structural columns to form a structural load-bearing tower,
    Whereby said structural load-bearing tower can be assembled by attaching at least one said horizontal cross member to at least two said structural columns.

19. The method of claim 2 wherein said structural column can be assembled, using said lifting device, within an existing structure, thereby utilizing existing infrastructure,
    Whereby said structural column can be assembled within an existing structure.

20. The method of claim 2, further including assembling an anchoring means attached to the base of said structural column,
    Whereby said structural column is assembled with said anchoring means to said base of said structural column.

21. The method of claim 20, wherein said anchoring means includes a base plate that is attached with fastening means substantially horizontally to the very bottom of said structural column, said base plate having vertically oriented boreholes through which anchor bolts from a foundation may pass,
    Whereby said structural column has said base plate assembled to bottom of said structural column and fastened to a foundation with anchor bolts.

* * * * *